(12) United States Patent
Kobashi et al.

(10) Patent No.: US 7,934,154 B2
(45) Date of Patent: Apr. 26, 2011

(54) DOCUMENT PROCESSING APPARATUS, DOCUMENT PROCESSING METHOD, AND DOCUMENT PROCESSING PROGRAM

(75) Inventors: Kazufumi Kobashi, Yokohama (JP); Kenta Hara, Kawasaki (JP); Jun Makino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1288 days.

(21) Appl. No.: 11/043,057

(22) Filed: Jan. 27, 2005

(65) Prior Publication Data
US 2005/0172221 A1 Aug. 4, 2005

(30) Foreign Application Priority Data

Jan. 30, 2004 (JP) ................. 2004-024587

(51) Int. Cl.
*G06F 17/00* (2006.01)
(52) U.S. Cl. ......... 715/243; 715/246; 715/253; 715/273
(58) Field of Classification Search .............. 715/243, 715/273, 246, 253
See application file for complete search history.

(56) References Cited

U.S. PATENT DOCUMENTS

| | | | | |
|---|---|---|---|---|
| 5,845,303 | A * | 12/1998 | Templeman | 715/255 |
| 6,380,954 | B1 * | 4/2002 | Gunther | 715/764 |
| 6,596,032 | B2 * | 7/2003 | Nojima et al. | 715/247 |
| 6,826,727 | B1 * | 11/2004 | Mohr et al. | 715/235 |
| 7,200,810 | B2 * | 4/2007 | Nitta et al. | 715/238 |
| 7,647,553 | B2 * | 1/2010 | Mogilevsky et al. | 715/247 |
| 2003/0050893 | A1 * | 3/2003 | Hirabayashi | 705/52 |
| 2003/0172355 | A1 * | 9/2003 | Ponce et al. | 715/517 |
| 2004/0225961 | A1 * | 11/2004 | Ohashi et al. | 715/517 |

FOREIGN PATENT DOCUMENTS

| | | |
|---|---|---|
| JP | 7-129658 | 5/1995 |
| JP | 11-110529 | 4/1999 |
| JP | 2000-48216 | 2/2000 |
| JP | 2002-297572 | 10/2002 |
| WO | WO 98/08176 A | 2/1998 |
| WO | WO 01/29695 A | 4/2001 |
| WO | WO 01/39019 A | 5/2001 |
| WO | WO 01/59696 A | 8/2001 |

OTHER PUBLICATIONS

Holthuizen, R. et al.: "VarDaP Project: VarDaPE Software User Manual", pp. 1-22 (Feb. 22, 2000).

Mooji, A. et al.: "VarDaP Project: User Requirements Document", pp. 1-13 (Jan. 19, 2000).

* cited by examiner

*Primary Examiner* — Stephen S Hong
*Assistant Examiner* — Matthew J Ludwig
(74) *Attorney, Agent, or Firm* — Fitzpatrick, Cella, Harper & Scinto

(57) ABSTRACT

A document processing apparatus according to the present invention capable of changing a layout dynamically in accordance with data to be laid out, comprises
- a template holding unit which holds a template having a region for which an extraction condition is set to extract the data to be laid out from a database and lay out the data;
- an acquisition unit which acquires, from the database, the data to be laid out, which satisfies the extraction condition set for the region in the template held by said template holding unit; and
- a layout unit which lays out, in the region, at least one of the data to be laid out, which are acquired by said acquisition unit.

9 Claims, 37 Drawing Sheets

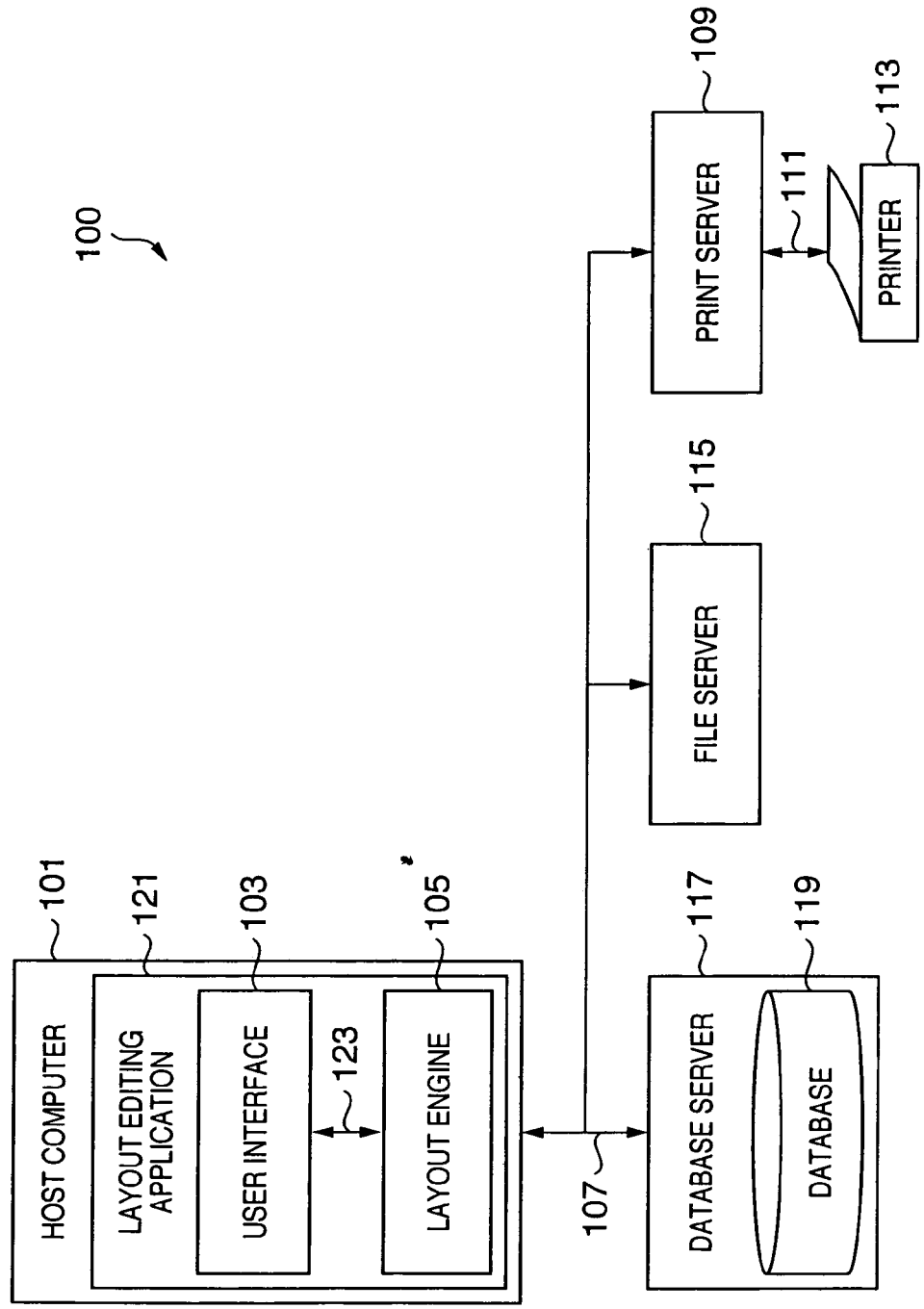

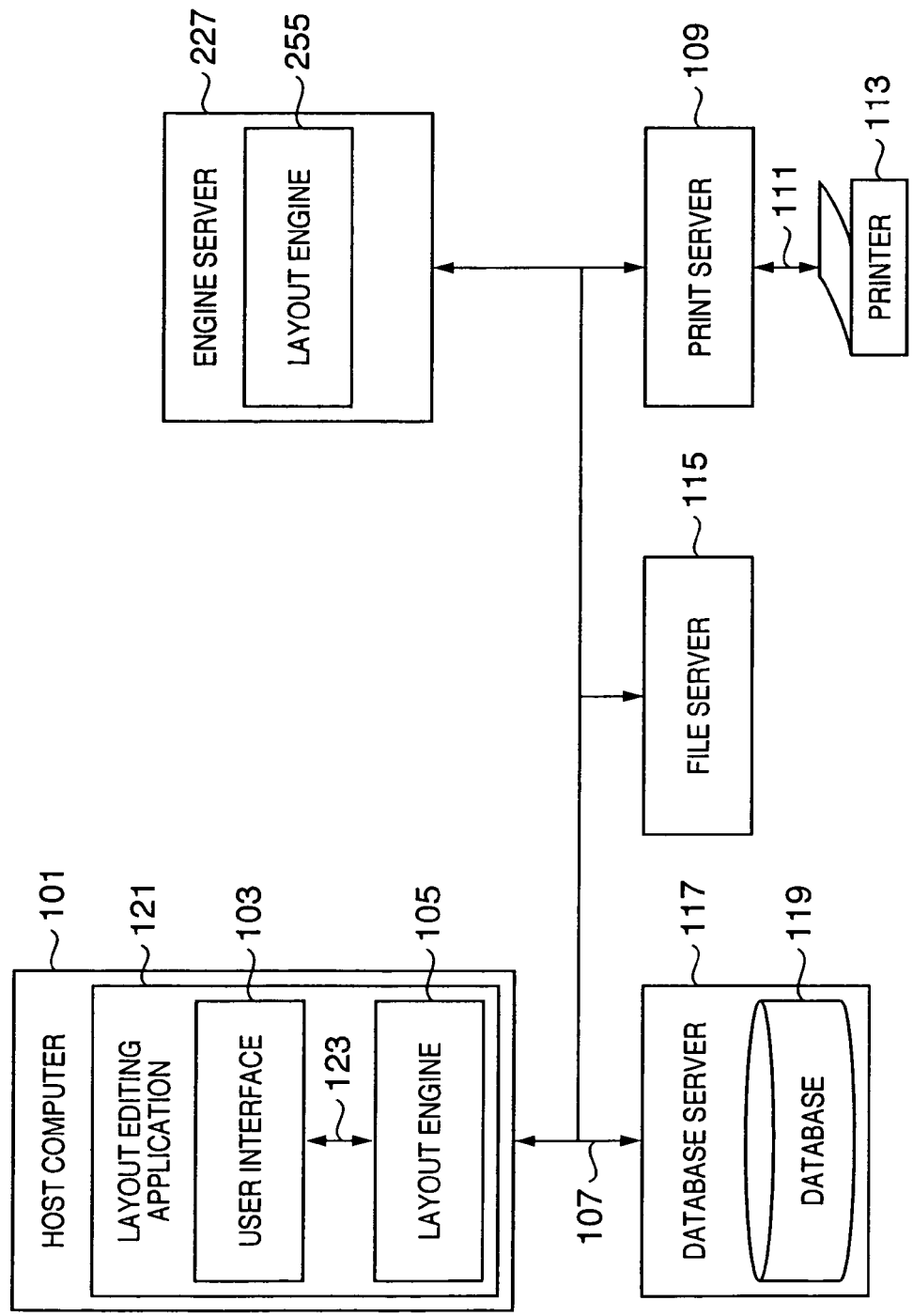

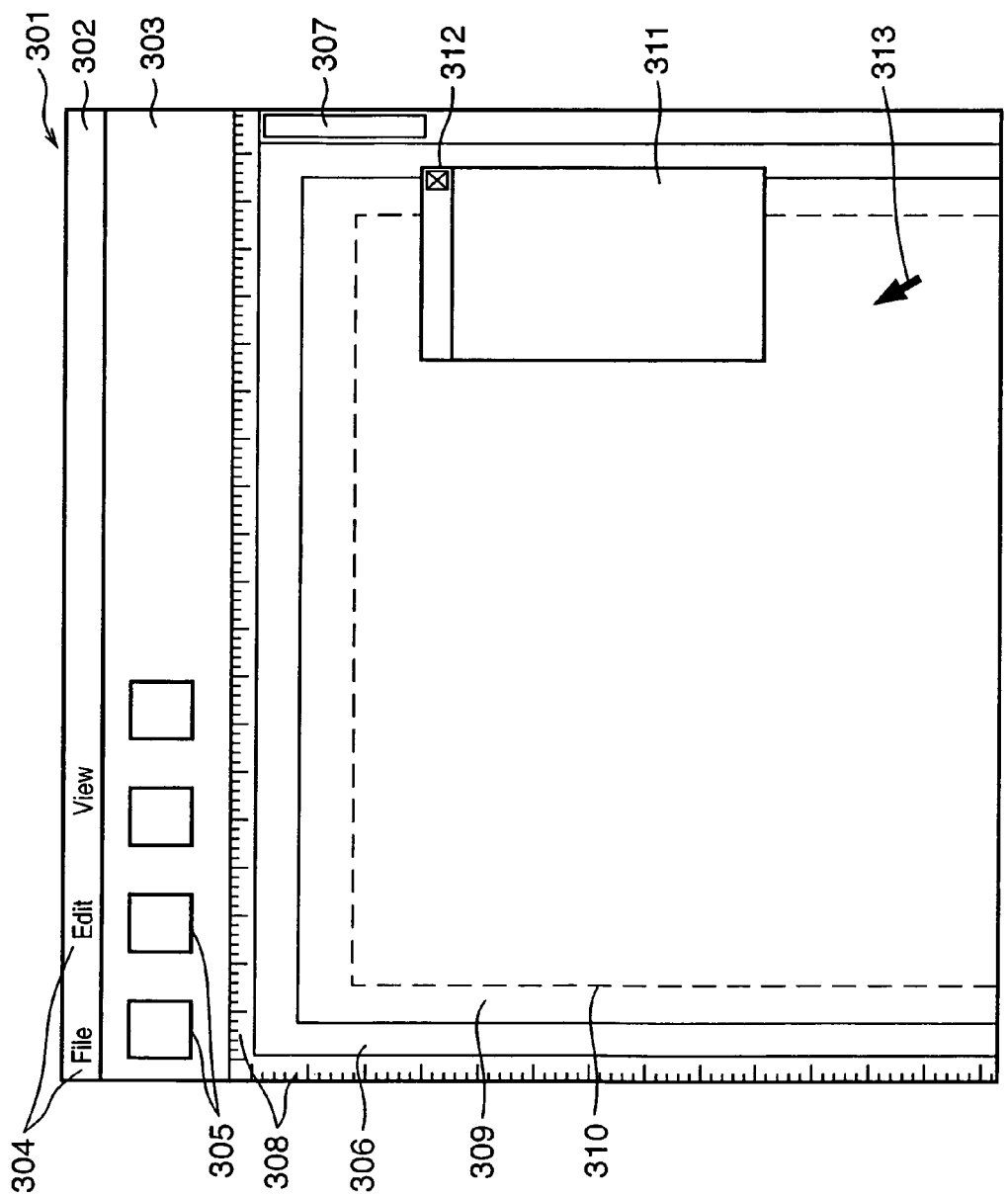

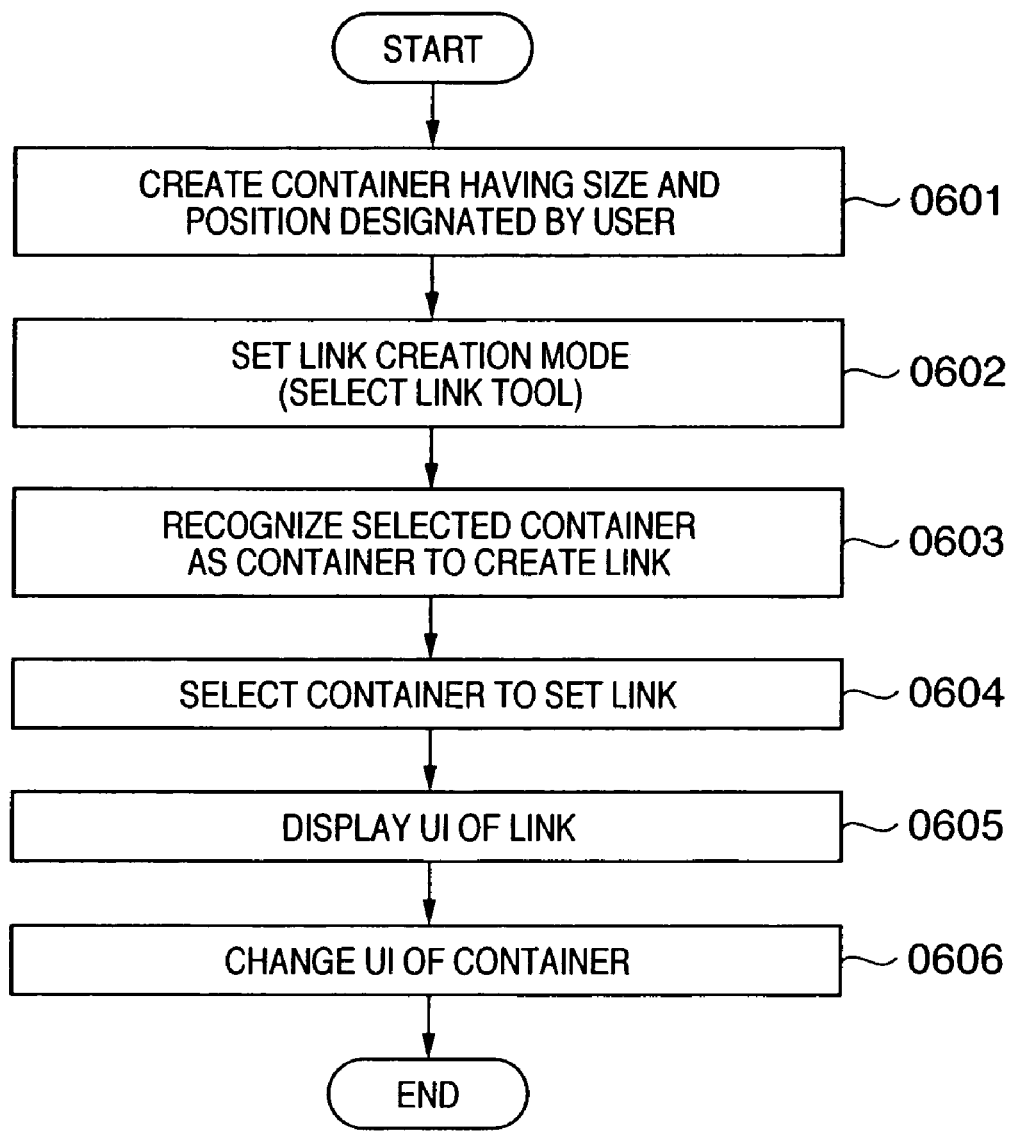

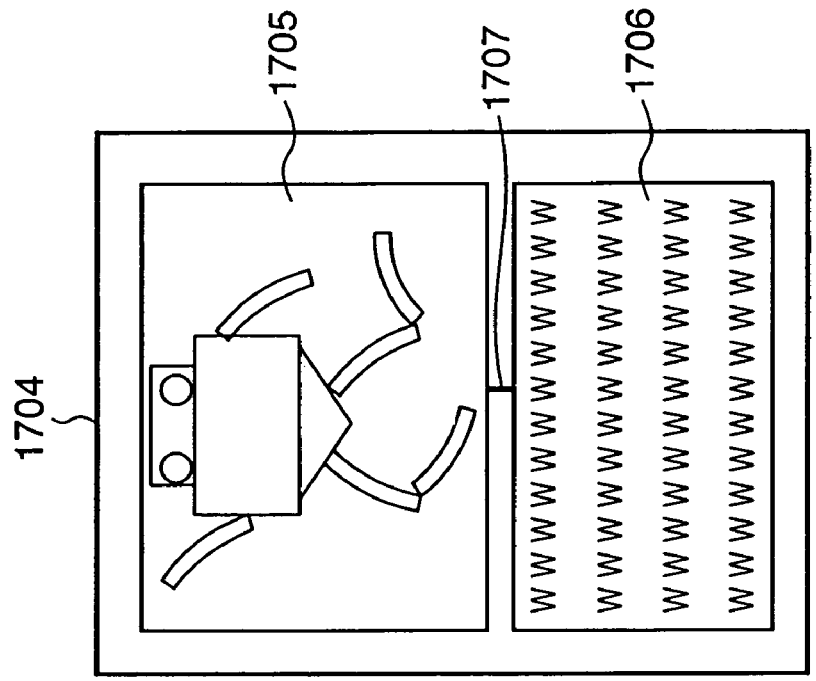
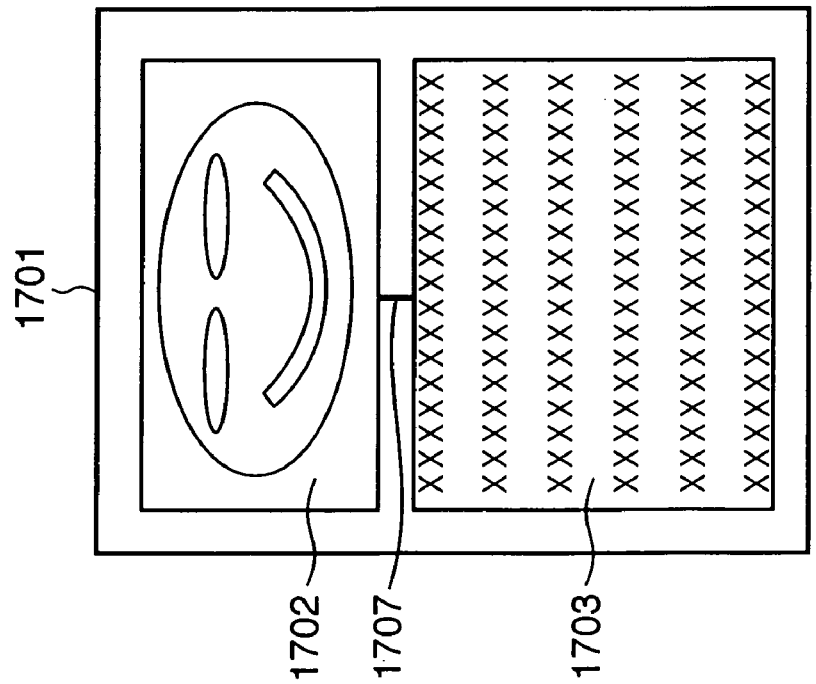
FIG. 17A  FIG. 17B

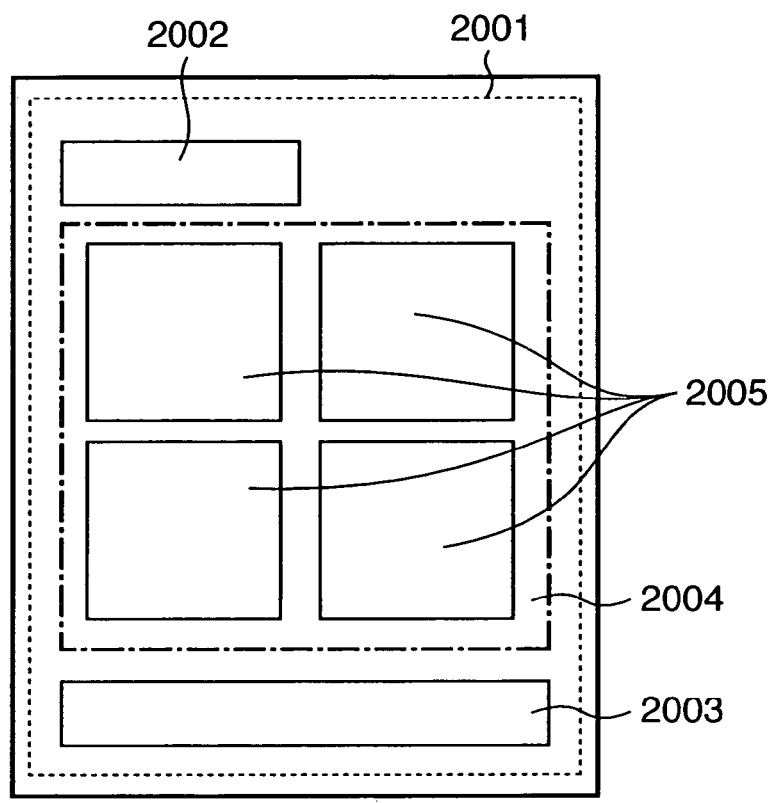
F I G. 20A
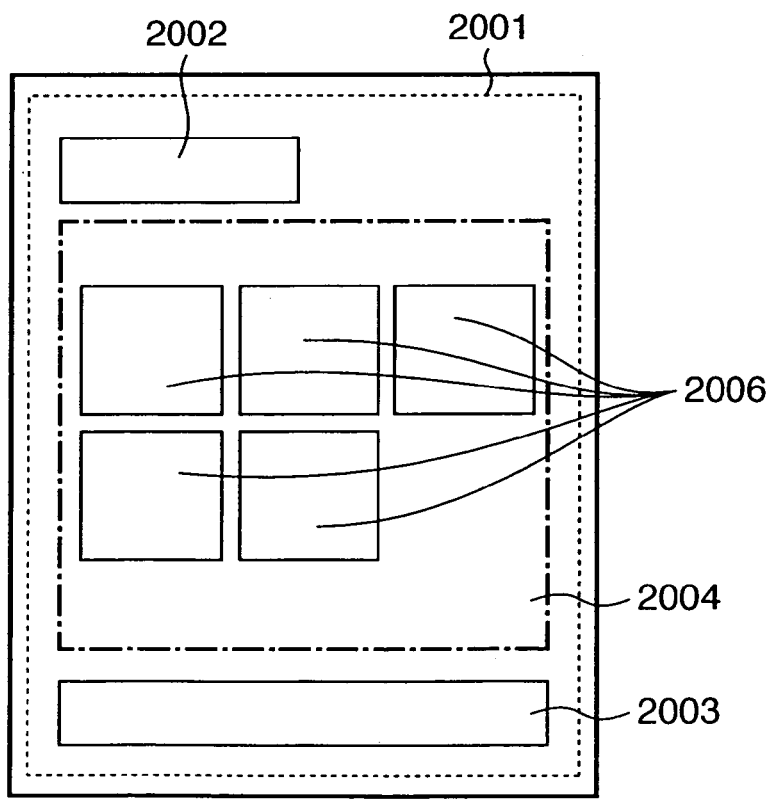
F I G. 20B

FIG. 21A

| No | Name | Price | ProductName | Description | Image1 | Image1 |
|---|---|---|---|---|---|---|
| 1 | Tom | 10000 | xxxCamera | ooooooooooo | xxxCamera | Camera |
| 2 | Tom | 25800 | JJJCamera | qqergtyjkiklop | JJJCamera | Camera |
| 3 | Tom | 15800 | zzzPrinter | qqqqqqqqqqq | zzzPrinter | Printer |
| 4 | Tom | 19800 | ertPrinter | kkkkkkk | ertPrinter | Printer |
| 5 | Tom | 12000 | yyyCamera | wwwwwwww | yyyCamera | Camera |
| 6 | Tom | 24800 | aaaPrinter | wtwtsgrtyjjyety | aaaPrinter | Printer |
| 7 | Nancy | 19800 | gggCamera | aaaaaaaaaaaaa | gggCamera | gggCamera |

2101, 2102, Area1, Area2

FIG. 21B

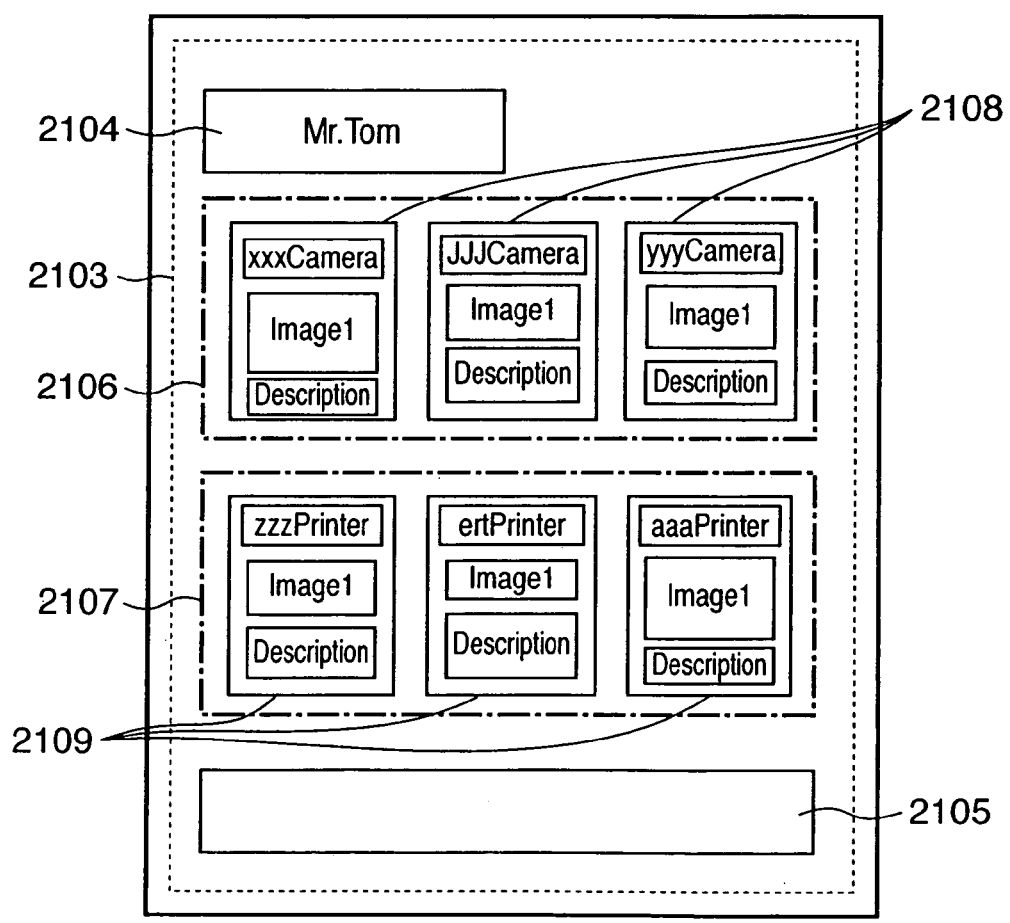

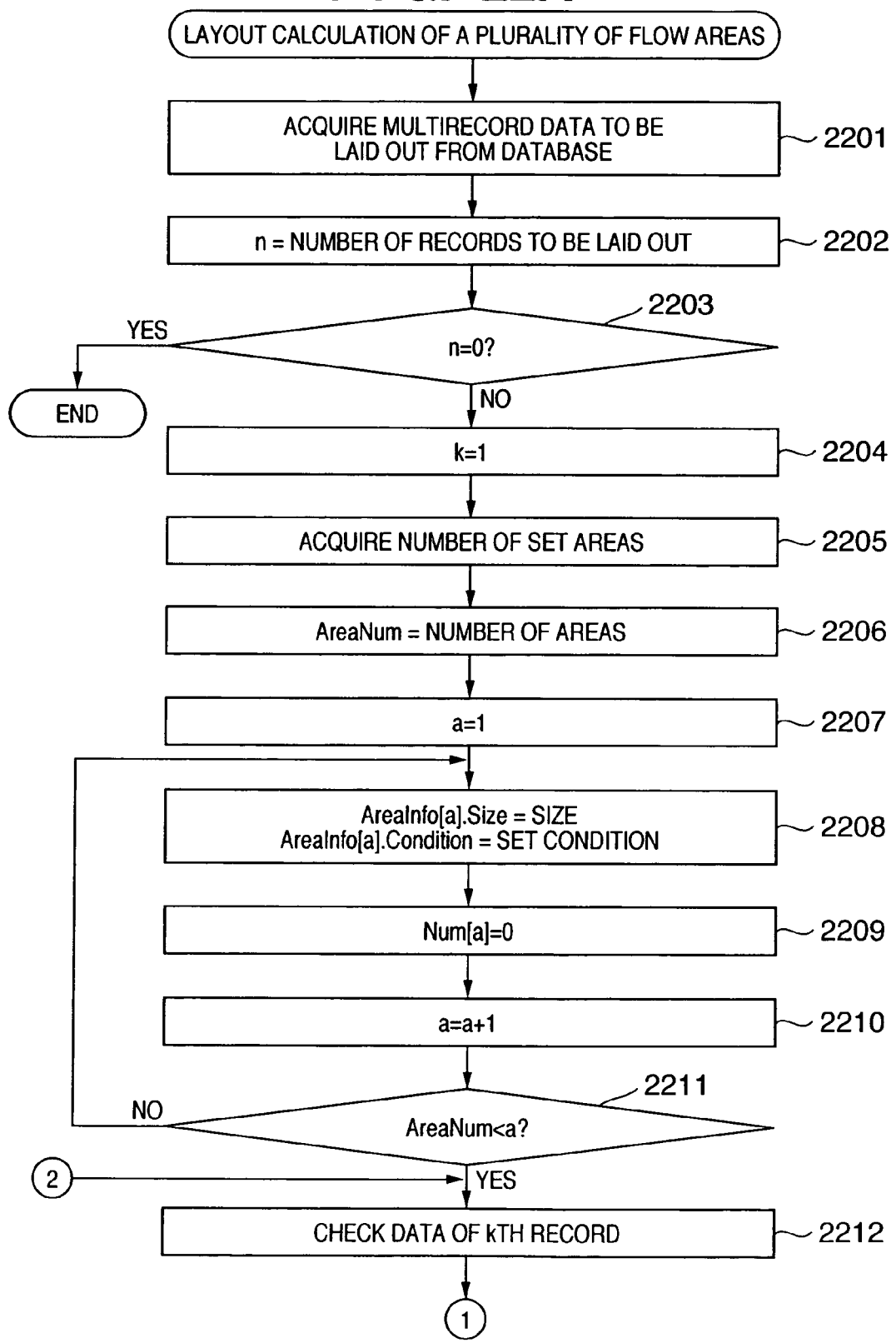

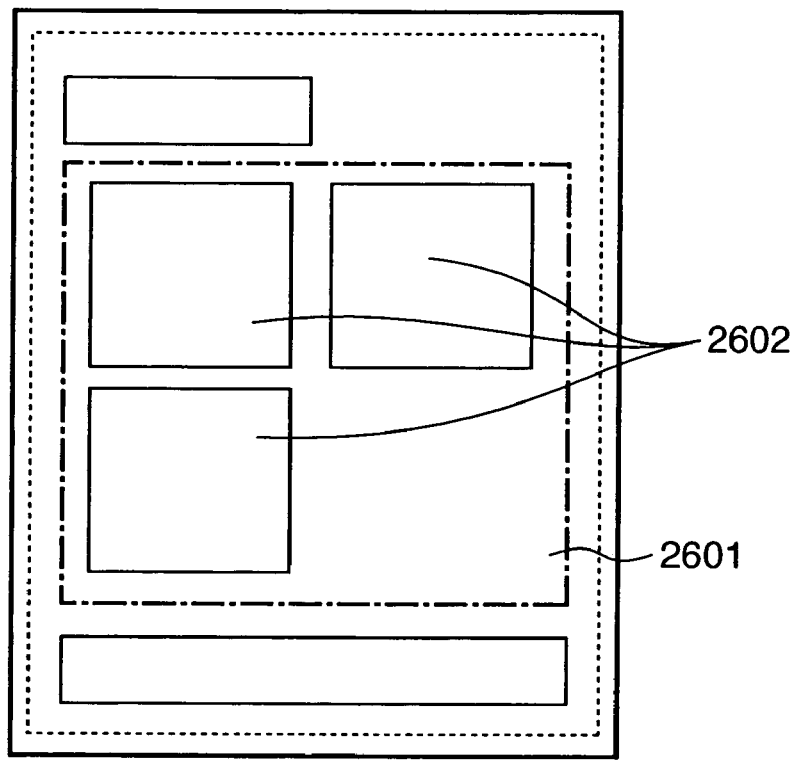
F I G. 26A
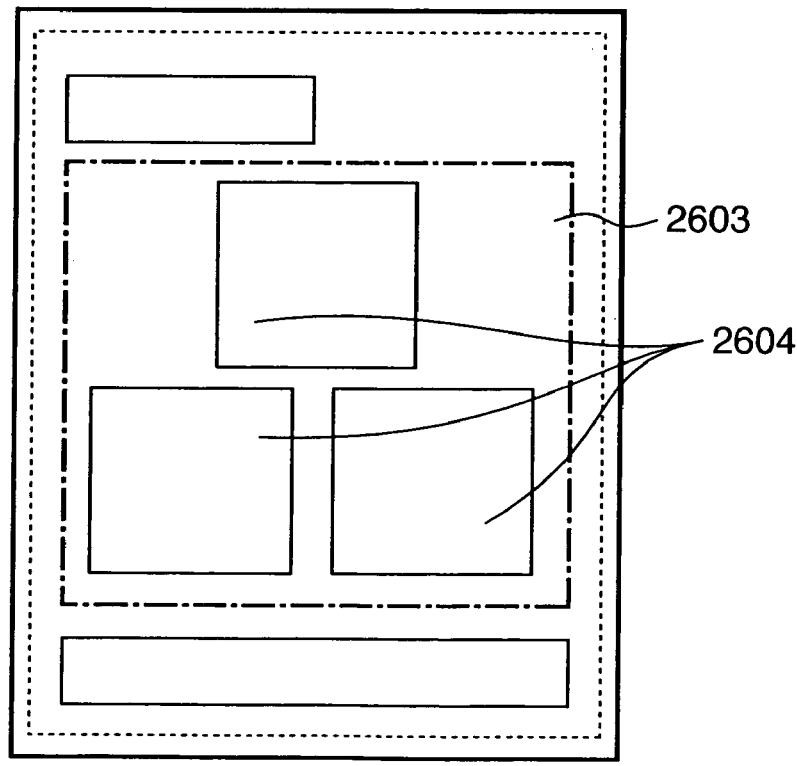
F I G. 26B

F I G. 29
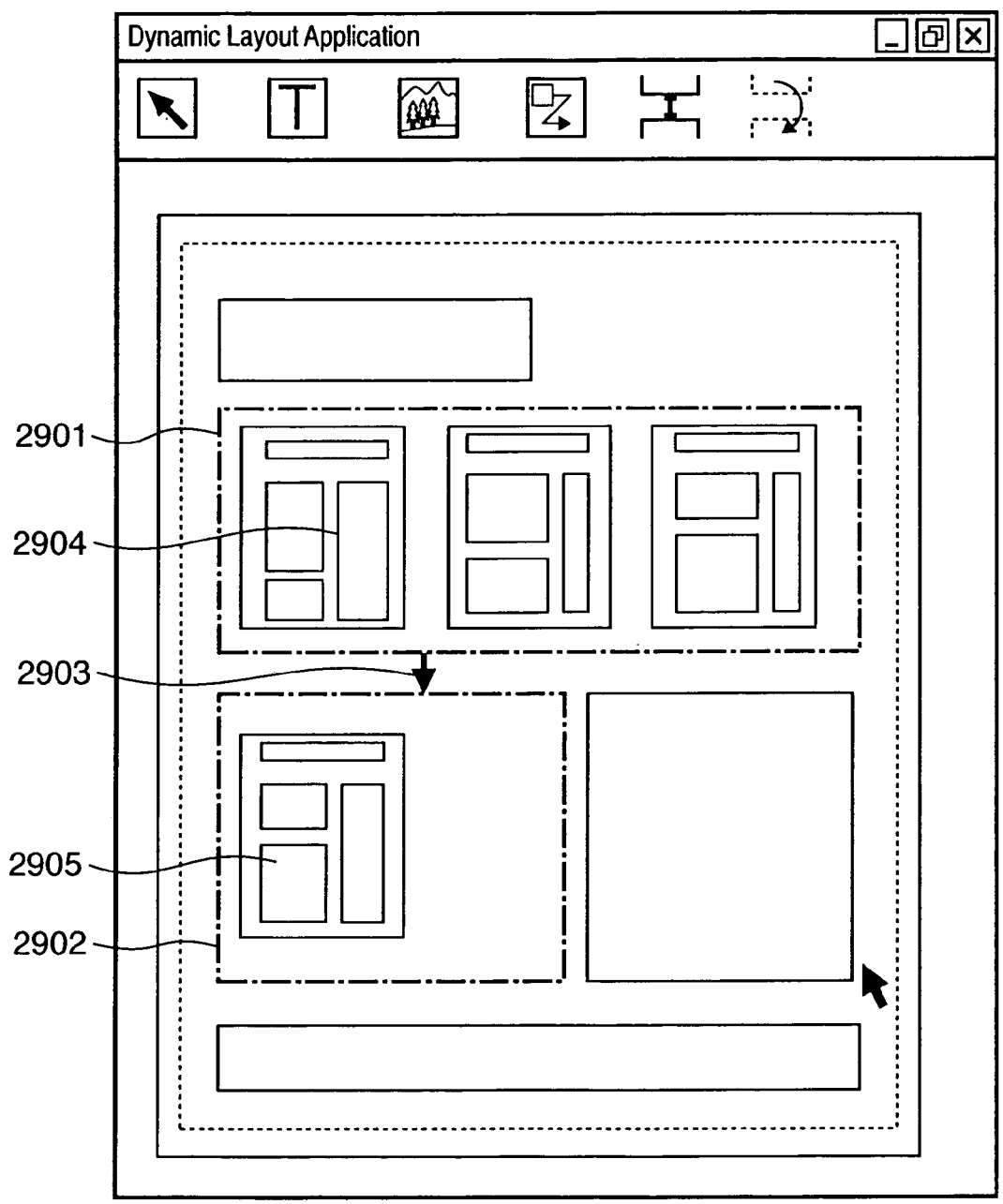

F I G. 32
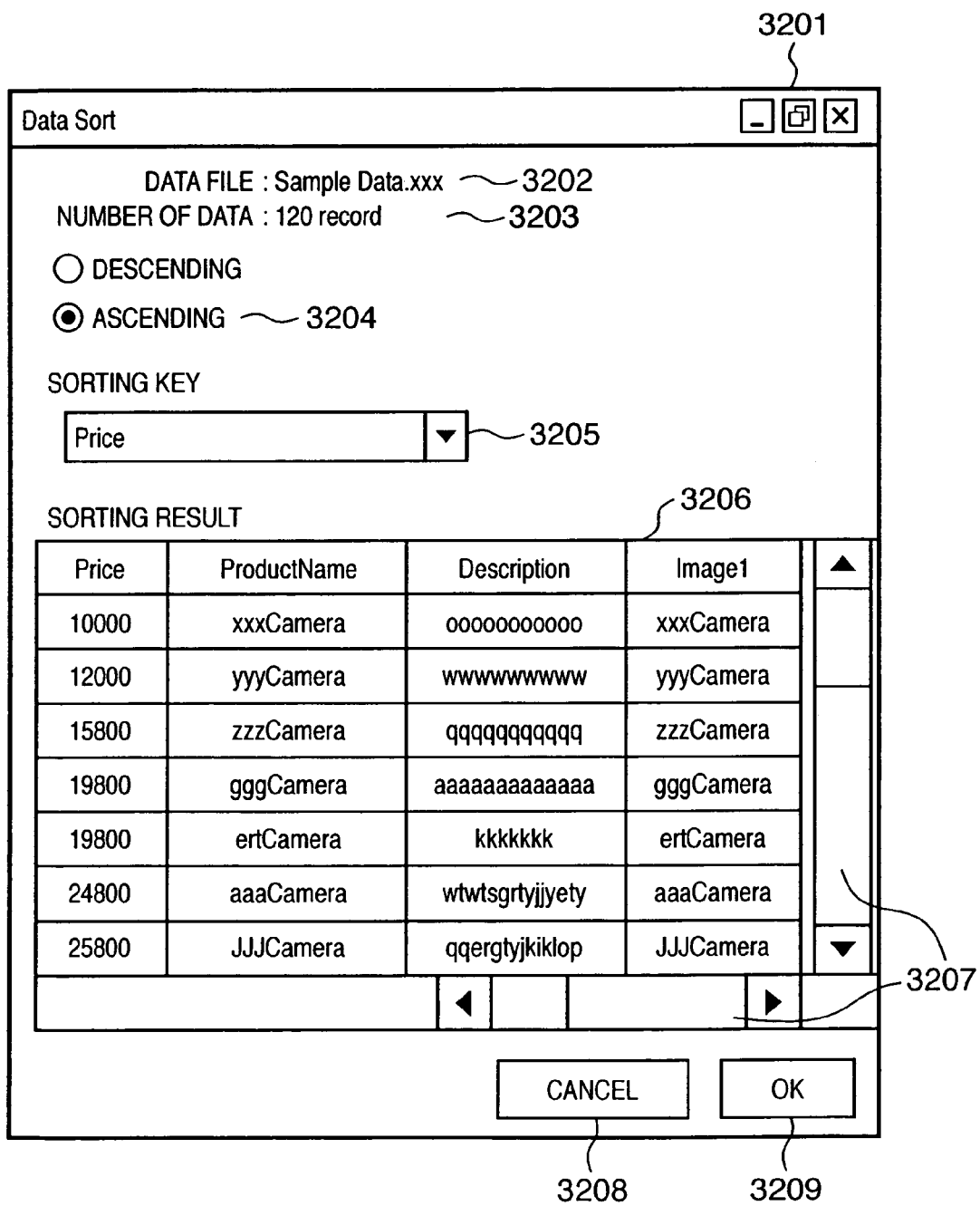

DOCUMENT PROCESSING APPARATUS, DOCUMENT PROCESSING METHOD, AND DOCUMENT PROCESSING PROGRAM

FIELD OF THE INVENTION

The present invention relates to a document processing apparatus which has an automatic layout function of laying out the fields of records registered in, e.g., a database at predetermined positions to complete a document.

BACKGROUND OF THE INVENTION

Since the merchandise service life decreases recently due to a variety of merchandise items, and customization service orientation of consumers who use the Internet strengthens, the necessity of CRM (Customer Relationship Management) and one-to-one marketing has received a great deal of attention. These methods aim at increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Along with the recent progress in DTP (DeskTop Publishing) technology and the spread of digital printers, variable print systems have been developed, which customize and output a document for each customer. Such a system is required to optimally lay out and display contents in information quantity that changes for each customer.

In a conventional variable print system, containers (also called field regions in a document form) are laid out on a document as regions where pieces of information are displayed. A database and the containers are associated with each other to achieve layout display.

However, each container serving as a partial display region in which a text or image is to be pasted has a fixed size. For this reason, when data in the database is inserted in the container, and the data amount is larger than the container size, text overlap or image clipping occurs. If the data amount is smaller than the container size, a space is formed in the container. In either case, optimum layout display corresponding to the information amount of a text or image to be displayed cannot be implemented.

To solve this problem, automatic layout systems which change the container size in accordance with the information amount have been proposed. An automatic layout system can flexibly set the container size of a text or image. Some automatic layout systems can set a variable container size and increase the container size in accordance with the amount of data to be inserted. In another technique, if text data larger than a fixed container size is inserted, the font size of the text is reduced to display the entire text in the container.

Another automatic layout technique to solve these problems is disclosed in the layout design apparatus described in patent reference 1, in which when the size of a container increases, the size of an adjacent container is decreased.

As described above, some conventional variable print systems can change layout frames (containers) dynamically in accordance with content sizes to appropriately lay out contents having different sizes.

Japanese Patent Laid-Open No. 2000-48216 also describes a technique of laying out a plurality of piece of merchandise information in a document of one page. In this method, before a merchandise catalog for each customer is created, the layout of a piece of merchandise information (e.g., the name, image, and specifications of a merchandise item) is defined in advance as a master merchandise file, and a region where the master merchandise file can be laid out is defined on a document. The contents of each merchandise information extracted from the database are laid out in accordance with the master merchandise file, and merchandise files after layout are inserted in the document from the upper left to the lower right.

However, the method of simply inserting master merchandise files in which the contents of the database are laid out into a document, as described in patent reference 1, has no concept "record" or "multirecord". Pieces of merchandise information in the database are laid out in accordance with master merchandise files and sequentially laid out in the document. The layout order or size of each record cannot be adjusted on the basis of the intention of the user. For this reason, when, e.g., direct mail is created in accordance with the taste of each customer, the design is monotonous. Even when the user wants to create a more effective design by laying out items focusing on those which should be most preferred by the customer, the intention of the user cannot be reflected on determining the layout or size of each record.

SUMMARY OF THE INVENTION

The present invention has been made in consideration of the above-described prior art, and has as its object to provide a document processing apparatus, document processing method, and computer program which can designate each region to lay out a record in accordance with its attribute and distribute the records to the respective regions.

In order to achieve the above object, the present invention has the following arrangement.

A document processing apparatus capable of changing a layout dynamically in accordance with data to be laid out comprises
  layout means for, in accordance with a template having a region to lay out the data and a layout condition of the data to be laid out in the region, creating a document in which of the data to be laid out, data which satisfy the layout condition are laid out in the region with the layout condition designated.

Alternatively, a document processing apparatus capable of changing a layout dynamically in accordance with data to be laid out comprises
  template creation means for creating a template having a region to lay out the data and an extraction condition of the data to be laid out in the region, and
  layout means for, in accordance with the template, creating a document in which of the data to be laid out, data which satisfy the extraction condition are laid out in the region with the extraction condition designated.

According to the present invention, since a condition to lay out data such as a record can be designated for each region arranged on a template, data can be distributed to the respective regions. Accordingly, instead of simply laying out the data in accordance with the insertion order, the layout position of each data can be designated independently of the original sequence of the data.

In addition, since the direction or pattern of record layout can be designated, various layout patterns can be implemented.

Furthermore, the number of records which can be laid out is fixed. For this reason, even when there are a number of records, a document of a single page can be generated without automatically generating the next page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a block diagram showing an arrangement of a computer system according to an embodiment;

FIG. 2 is a block diagram showing another arrangement of the computer system according to the embodiment;

FIG. 3 is a view showing the main window of a typical application including a menu bar, tool bar, work area, and floating palette according to the embodiment;

FIG. 6 is a flowchart showing the flow of link creation according to the embodiment;

FIGS. 17A and 17B are views showing layout examples of a subtemplate according to the first embodiment;

FIGS. 20A and 20B are views showing examples of a UI in which subtemplates are laid out in the flow area according to the first embodiment;

FIGS. 21A and 21B are views showing examples of a UI in which subtemplates are laid out in a plurality of flow areas according to the first embodiment;

FIG. 22A is a flowchart showing the overall flow of subtemplate layout in a plurality of flow areas according to the first embodiment;

FIGS. 26A and 26B are views showing layout examples when the layout rules according to the first embodiment are set;

FIG. 29 is a view showing an example of a layout of a subtemplate when the link of the flow area is set in the second embodiment;

FIG. 32 is a view showing an example of a data sorting dialogue according to the third embodiment;

DETAILED DESCRIPTION OF THE PREFERRED EMBODIMENTS

First Embodiment

A preferred embodiment of the present invention will be described. The outline of the present invention will be described first. This embodiment is directed to computer software which causes a computer to implement a so-called variable printing function. This function creates a document by laying out records of a database in accordance with containers (partial regions in which data are inserted: also referred to as field regions) defined on a document template (also simply referred to as a template). A computer in which this software is loaded as an executable program functions as a document processing apparatus. Especially, this embodiment discloses software which has a function (multirecord function) of creating part of a document in accordance with a template and inserting the part of the document in a region (called a flow area) separately defined on the template to complete the document in addition to a function of laying out data in accordance with the template. The number of document parts which can be inserted in one flow area is not limited to one. This embodiment also discloses a technique of, when a plurality of flow areas are defined on a template, distributing an already created document part to the flow areas in accordance with predetermined conditions.

The arrangement and a computer system and that of an application according to an embodiment to which the present invention can be applied will be described next.

<System Arrangement>

FIG. 1A shows a system 100 which prints a variable data document. A method to be described in this specification is practiced by causing a general-purpose computer module 101

Figure 1B:
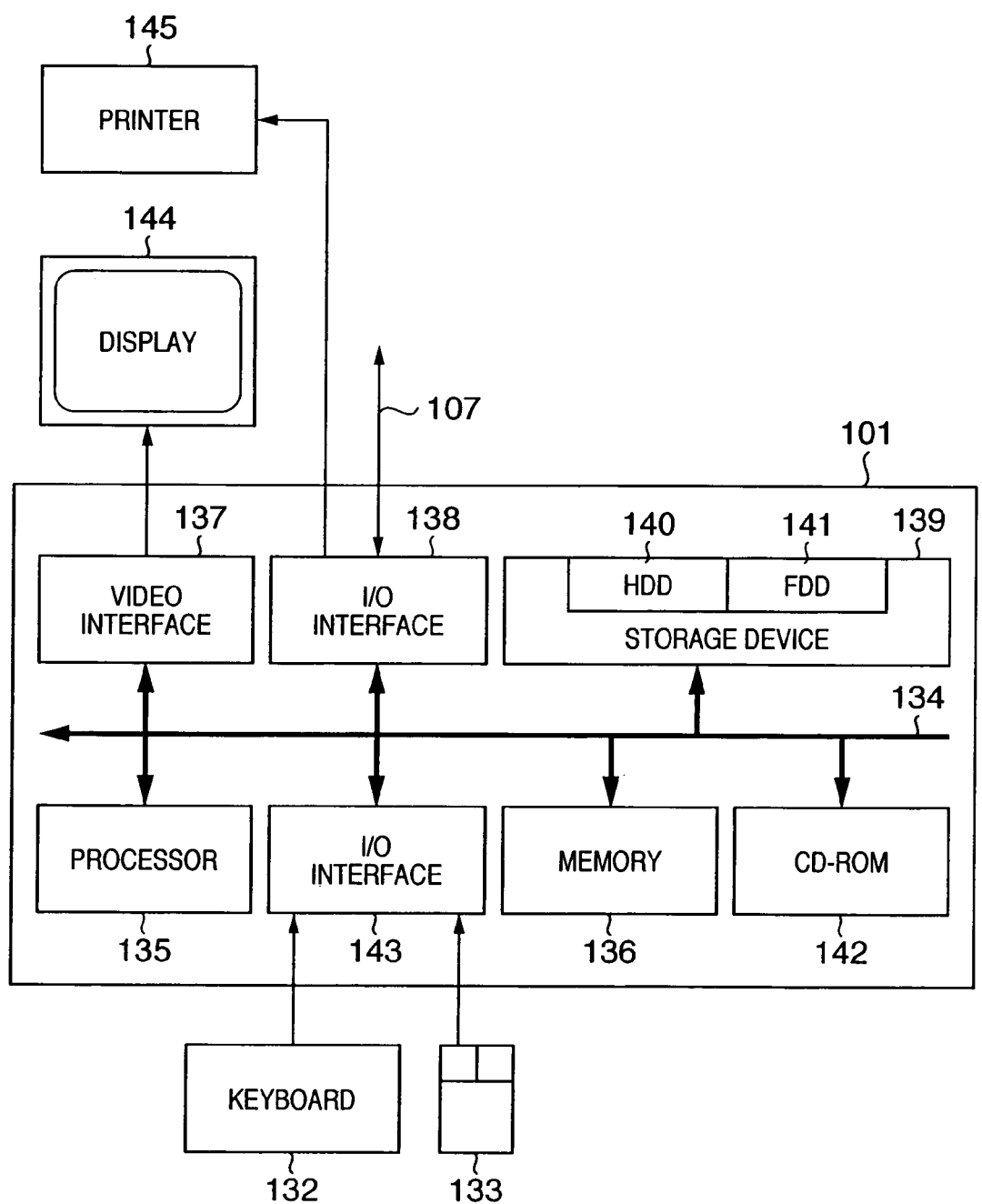
FIG. 1B is a schematic block diagram of a computer module according to the embodiment.

(to be described in detail with reference to FIG. 1B) to execute a predetermined program. The process to be described with reference to FIG. 1A is executed in the entire or part of software like a layout editing application program 121 which is executed in the computer module 101 and becomes executable on the system 100. Especially, the step of layout editing or printing is executed in accordance with an instruction of software executed by the computer 101 serving as a document processing apparatus of the present invention. The software is stored in a computer-readable medium including, e.g., a storage device to be described below. The software is loaded from the computer-readable medium to the computer and executed by the computer 101. A computer-readable medium which has the software or a computer program recorded on a medium is a computer program product. When the computer program product is used in a computer, the computer functions as an apparatus capable of executing layout editing or variable data print of a document.

The computer module 101 is connected to an input device such as a keyboard 132 or a pointing device like a mouse 133 and an output device including a display device 144 and a local printer 145 depending on the situation. An input/output interface 138 connects the computer module 101 to another computer apparatus in the system 100 through a network connection 107. Typical examples of the network connection 107 are a local area network (LAN) and wide area network (WAN).

The computer module 101 generally includes at least one processor unit 135, a memory unit 136 including, e.g., a semiconductor random access memory (RAM) or read-only memory (ROM), an input/output (I/O) interface including a video interface 137, and an I/O interface 143 for the keyboard 132 and mouse 133.

A storage device 139 generally includes a hard disk drive 140 and flexible disk drive 141. Although not illustrated in FIG. 1B, a magnetic tape drive can also be used. A CD-ROM drive 142 is provided as a nonvolatile data source. The computer module 101 uses the constituent elements (135 to 143) included in the computer module 101, which communicate through an interconnection bus 134, by an operation system such as GNU/LINUX or Microsoft Windows (registered trademark) or by a method by the conventional operation mode of a computer system.

Examples of a computer having the arrangement shown in FIG. 1B are an IBM-compatible PC or Sparcstation available from SUN, or a computer system including them.

The layout application program 121 shown in FIG. 1A is normally resident in the hard disk drive 140 shown in FIG. 1B and loaded, executed, and controlled by the processor 135. In some cases, the application program 121 is encoded on a CD-ROM or flexible disk, loaded through the corresponding flexible disk drive 141 or CD-ROM drive 142, and provided to the user. Alternatively, the application program 121 may be loaded by the user from the network connection 107. The software can also be loaded in the computer module 101 from another computer-readable medium having an appropriate size, including a magnetic tape, ROM, integrated circuit, magnetooptical disk, wireless communication or infrared communication between the computer module 101 and another device, a computer-readable card such as a PCMCIA card, email communication, and the Internet or an intranet having recorded information on a WEB site. These are merely examples of related computer-readable media. Any other computer-readable medium can also be used.

The layout editing application 121 instructs to execute variable data printing (VDP) and includes two software components. The first component is a layout engine 105. This is a software component to calculate the positions of rectangles and lines which form containers on the basis of constraints and sizes given by rectangular containers. When the layout engine 105 operates as an application to determine the size and position of each partial region (container) and outputs drawing information to a printer driver (not shown), the printer driver executes image drawing processing of a variable data document and generates print data.

A user interface 103 as the second component provides a mechanism which causes a user to create a document template and associates the data source with a container in the document template. The user interface 103 and layout engine 105 communicate with each other through a communication channel 123. The data source for document generation is a general database 119 on a database server 117 formed by another computer which is generally making the database application run. The host computer 101 communicates with the database server 117 through the network connection 107. The layout editing application 121 generates a document template to be stored in the host computer 101 or a file server 115 formed by another computer. The layout editing application 121 also generates a document containing a document template merged with data. The document is stored in the local file system of the host computer 101 or in the file server 115, or directly printed by a printer 113. A print server 109 is a computer to provide a network function to a printer which is not connected directly to the network. The print server 109 and printer 113 are connected through a general communication channel 111.

FIG. 2 shows an arrangement which separates a layout engine 255 from the arrangement shown in FIG. 1A and causes an engine server 227 to execute the layout engine. The engine server 227 is a general computer. A document template stored in the file server 115 can be merged with data stored in the database 119 to cause the layout engine 255 to generate a document for printing or another purpose. This operation is requested through the user interface 103 or requested to print only a specific record.

<Arrangement of Application>
(Main Window)

As shown in FIG. 3, the user interface 103 includes a user interface formed by an application window 301 displayed on the video display 144 at the time of operation. The application window 301 is characterized by a menu bar 302 and tool bar 303 which can be set in a non-display state or moved to various positions on the screen, a work area 306 whose position can be moved by the position and operation of the mouse 133, an optional palette 311, and a cursor/pointer device 313.

The menu bar 302 as a known technique has a number of menu items 304 extended under the layer of menu options.

The tool bar 303 has a number of tool buttons and widgets 305 which can be set in a non-display state or display state by a special mode of the application.

An optional ruler 308 is used to indicate the position of a pointer, page, line, margin guide, layout frame (container), or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

Figure 4:
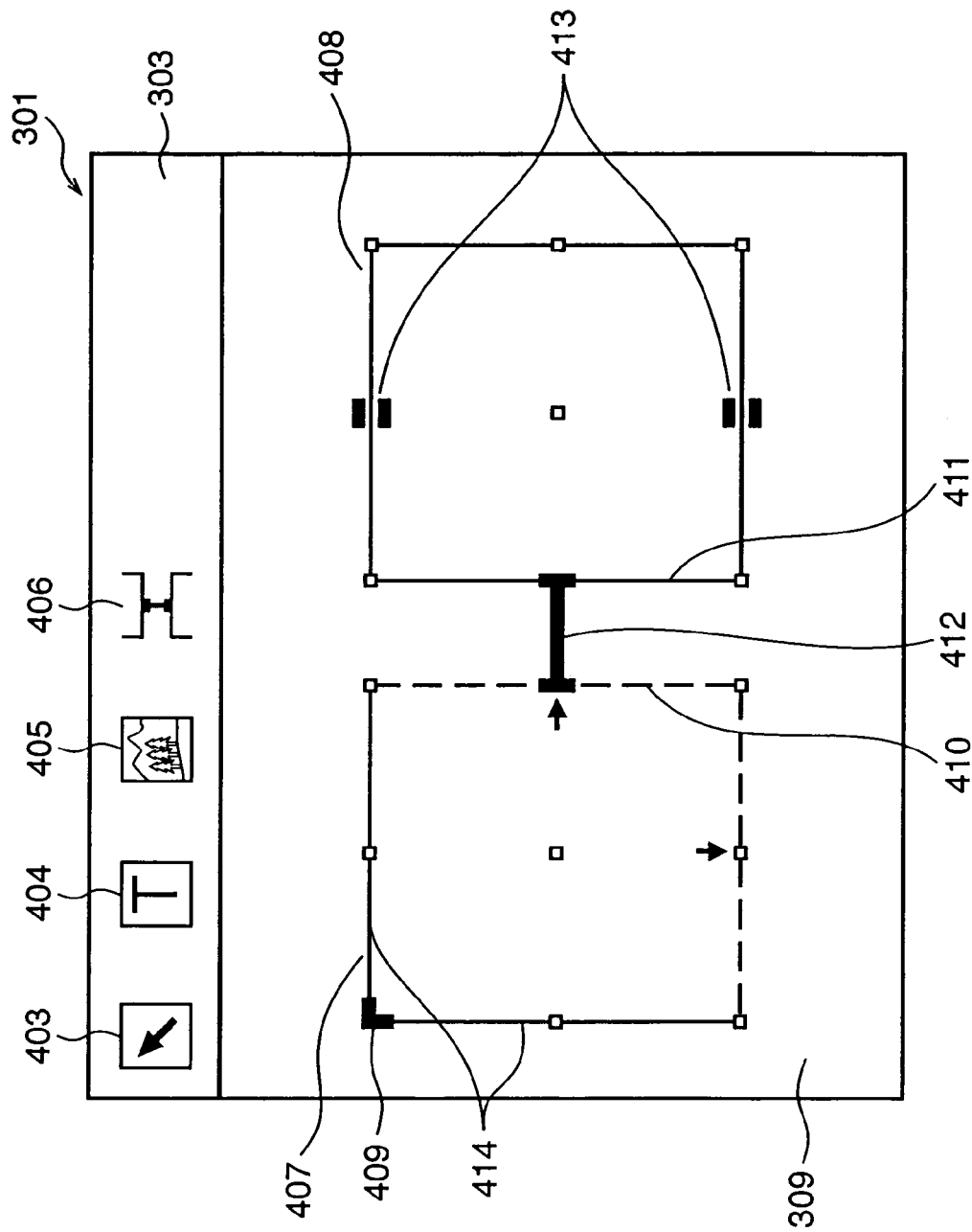
FIG. 4 is a view showing an aspect of typical containers which have a link between them, an anchor, and sliders according to the embodiment by using a screen, tools, and icons.

As show in FIG. 4, the tool bar 303 has at least following user-selectable "buttons".

(1) Select tool button 403: This button is used for side selection, movement, size change, resize, or lock/unlock of a container. A container is selected by dragging a select box around the container. When a plurality of containers are selected while keeping the CTRL key pressed, the plurality of containers can be selected.

(2) Image container tool button 404: This button is used to create a container having a static (fixed) or variable image.

(3) Text container tool button 405: This button is used to create a container having a static (fixed) or variable text.

(4) Link tool button 406: This button is used to create a link to associate containers with each other. This button is also used to control the distance of the link.

These buttons are mounted as tool chips of icons which change in accordance with the operation situation, as is well known.

In the application window 301 of the layout editing application 121 shown in FIG. 3, when containers and links are laid out in a page, a basic layout can be determined. The basic layout is a layout as a base of variable data print. When all containers in the basic layout are fixed containers, all record print results have the same layout. When containers in the basic layout are variable containers (to be described later), the size or position of each container varies within the constraint range (to be described later) in accordance with the amount or size of data loaded for each record. The document template created by the layout editing application 121 is strictly used to determine the basic layout. When a variable container is included, the final layout of a printed product is adjusted in accordance with loaded data.

(Document Template)

The work area 306 is used to display and edit the design of the document template. It allows the user to design the outline of a printed document as preprocessing and understand how the merged document changes on the basis of the amount or size of variable data.

When an external data source (e.g., a record of a database) is linked to the template, a variable text or image is displayed in each container so that a preview of the current document can be obtained.

Objects serving as visual keys to express the document structure and variable data containers are always displayed when the cursor is moved onto a container, or a container is selected.

The work area 306 is characterized by a scroll bar 307, the optional ruler 308, and a document template 309. The document template 309 can indicate the presence of a plurality of pages.

The page size of a given document template is designated by the user by a known technique. For example, "Page Setup" is selected from "File" of the menu to display a dialogue to set the page size. The page size designated there by the user is reflected. The actual number of pages of each document can change depending on the variable data. When variable data cannot be fitted in one page, and the basic layout has no constraint to fit the containers in a page having a predetermined paper size, an additional page is automatically created. When a constraint (the constraint can be set by an anchor icon to be described later) to fit the containers in a page having a predetermined paper size is set in the basic layout, the size and position of each container are determined while changing their sizes relative to each other in the page, and variable data to be inserted is reduced as needed. Accordingly, the layout is determined dynamically for each record.

A border in each page is a page margin 310 representing the maximum width of an object printable on the page. The page margin 310 can be defined by the user.

FIG. 4 shows examples of objects which can be displayed on the document template 309 of one page. The objects include a plurality of containers 407 and 408, an arbitrarily applicable anchor icon 409, unfixed sides 410, a link 412, and sliders 413. The anchor icon 409 can be set at a corner or side of the rectangle of a container or the center of a container. When the anchor icon 409 is set, the position of the set point is fixed. That is, in the example shown in FIG. 4, the anchor icon 409 is set at the upper left corner of the container 407. When variable data is inserted in the container 407, and the image size or text amount of the variable data is large, the container can be enlarged to the right and lower sides. When the anchor icon 409 is set on a side, the side is fixed. The container can be enlarged in the directions of the three remaining sides. When the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the sides on which the sliders are set.

(Container)

A container is a space (called a partial region) where a fixed or variable text or image is inserted from a variable data file to the document template for each record and drawn. A container is laid out together with other containers and objects. Movement, size adjustment, and re-creation of the container are done by using the pointer 313 by operating the mouse 133, as shown in the user interface window shown in FIG. 3 or 4.

Exactly speaking, a container has an aggregate of settings, visual expression, and interaction and editing operation. The definition of a container will be described below.

(1) A container is associated with a fixed or variable content. A variable content is dynamic in a sense that it is acquired from a data source (e.g., a record of a database) and can change depending on the document. Animated contents or contents which change over time by another method are not included in variable contents because they are not suitable for printing. A fixed content is displayed in the same manner in all documents generated by using one template. However, when a link is set between a fixed content and a variable content, the positions of containers containing fixed contents can change between documents as the positions and sizes of containers containing variable contents change.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data when a document is generated. The ornament function is generally an output product and visible for all fixed contents. A variable content is obtained as specific data from the data source and displayed or printed. A content inserted in a container can be, e.g., printed, displayed on the screen 144, or subjected to both printing and display.

(4) A container has a user interface and, for example, an interactive GUI to edit the container or set display. Each element of the interface is normally displayed on the screen 144. The user interface 103 displays some of the ornament functions of a container such as the background color and font. The user interface 103 also has a function of editing or displaying container setting. Examples of purposes of the user interface function are a border, a corner icon to interactively change or display the size and position of the container, and the number of times of overwrite, line, icon, and text when the container is merged with data from the data source.

(Constraints of Container)

A container has constraints to control the manner a content to be displayed or printed in each document is fitted in the container. These constraints are used as a principal means for causing the user to control a number of documents by one document template. An example of the constraint is "the maximum height of the content of this container is 4 inches". Another example of the constraint is "the left edge of the content of the container must be displayed at the same horizontal position in each document". Various methods for displaying and editing the constraints by using a GUI will be described hereinafter.

A content place holder which designates the layout of a fixed content such that, e.g., an image has a defined position on a page is well-known in the digital print technique. In the following description, a container has a position and size which can be edited and displayed by a known technique.

The user can designate the sizes and positions of the contents of a document by designating the positions, sizes, and constraints of containers. Since a plurality of document are generated from one document template, the user interface needs to be used to designate and display a number of possible settings and constraints of containers.

The sides of one container define the virtual border of a content associated with the container displayed in the document. More specifically, the left side of a container corresponds to the left edge of layout of the content associated with the container in all documents to which the same template is applied. Similarly, the height of a container can be understood as a constraint of the height of a content associated with the container in a document generated by applying the same template. In this specification, this discrimination will be clarified in a description of the side or size of a container by referring to the user interface 103.

Detailed examples of container constraints in this embodiment will be described below. The term "fixed" is used in a sense that a certain value is commonly used in all documents in which a certain container is commonly used.

(1) When the width of a container is fixed, the width to be assigned to a content associated with the container has the same value (fixed value) for the page containing that container in all documents generated by using the template containing the container.

(2) When the height of a container is fixed, the height to be assigned to a content associated with the container has the same value (fixed value) for the page containing that container in all documents generated by using the template containing the container.

(3) When the distance constraint is fixed, the designated distance (fixed value) is a constraint for all documents generated by using the template containing the container.

(4) When the left and right sides of a container are fixed, the horizontal position of the sides of the container is the same for the page containing that container in all documents generated by using the template containing the container. However, the height or vertical position of the container can change. For example, if the left side of a container is fixed, the content associated with the container may be displayed near the upper edge of a page in a document generated by using a template or near the lower edge of a page in another document. However, the horizontal position of the left side is the same in all documents.

(5) When the upper and lower sides of a container are fixed, the vertical position of the sides is the same for the page containing that container in all documents generated by using the template containing the container. However, the width or horizontal position of the container can change.

(6) The vertical axis of a container is a virtual vertical line which is parallel to the right and left sides of the container and is located at the intermediate position therebetween. When the vertical axis of the container is fixed, the average of the horizontal positions of the left and right sides of the container is the same for the page containing that container in all documents generated by using the template containing the container. In this constraint, the width of the container can change. For example, the horizontal position of the left and right sides of a container can be close to or far from the vertical axis in different documents. However, the vertical axis is located at the same horizontal position for the page containing that container in all documents generated by using the template containing the container. The height and horizontal position of the container are not affected by this constraint.

(7) The horizontal axis of a container is a virtual horizontal line which is parallel to the upper and lower sides of the container and is located at the intermediate position therebetween. Like the vertical axis, when the horizontal axis of the container is fixed, it restricts the vertical position of the upper and lower sides of the container. However, the height is not affected by this constraint.

(8) When both the horizontal and vertical axes are fixed, the central position (intersection between the vertical and horizontal axes) of the container is fixed. However, the width and height of the container are not affected by this constraint.

(9) When a corner of a container, the intermediate position of a side of a container, or the central position of a container is fixed, the content associated with the container is displayed at the same position for the page containing that container in all documents generated by using the template containing the container. For example, when the upper left corner of a container is fixed, the upper left position of the container laid out is the same for the page containing that container in all documents generated by using the template containing the container.

(10) The vertical sides or vertical axis is fixed in association with the left or right side of the page, left or right page margin, or another horizontal position. Similarly, the horizontal sides or horizontal axis is fixed in association with the upper or lower side of the page, upper or lower page margin, or another vertical position.

A term opposite to "fixed" is "variable" which indicates that a side, axis, corner, intermediate position, or a document constraint can change between documents (between records). For example, in a page, the layout is expected to dynamically change depending on the size or amount of variable data. However, the user may want that the size or position of a specific container is fixed, or the four corners of a container at a corner of the page are fixed. For this purpose, the layout editing application 121 can appropriately set, for each container (partial region), whether to fix or change a side, axis, corner, or intermediate position. Hence, the user can create a desired basic layout in determining the basic layout of a document template 180.

<Layout Mode (Display and Editing of Container)>

The procedures for creating a document to be variable-printed can be divided into two phases, i.e., template creation processing (layout mode) for creating a template and a document creation processing (processing for displaying a preview of a document will particularly be called a preview mode) for creating a document by inserting contents in the created template. The layout mode will be described.

(Method of Creating New Container)

Containers are classified into two types: text container and image container. A text container has a text and an embedded image. An image container has only an image.

As shown in FIG. 4, a new text container or image container is created on the document template 309 by clicking o the text container tool 404 or image container tool 405 by the mouse 133 and dragging a rectangle onto the template 309.

Alternatively, a container can easily be created by activating the appropriate tool 404 or 405 and clicking the mouse on the document template 309. When a new container is created, a container having a default size is inserted. Alternatively, a dialogue box or prompt is displayed to input the size of the new container. A container can also automatically be created and laid out by a schema defined or calculated in advance. When the generated container is selected by an input means such as the mouse, and its properties are designated by clicking on the right button of the mouse, the container property dialogue is displayed so that constraints for the container can be set. In the container property dialogue UI (corresponding to a partial region setting means), various kinds of constraints described above can be set. In the container property dialogue, the size (width and height) and position of the container can be set. To set a variable size, the basic pattern (basic size and reference position) of the container is set. In addition, the maximum container size (width and height) and the minimum container size (width and height) can be set.

(Container Display Method)

The states of the sides of a container created in the document template are preferably graphically displayed on the user interface, as shown in FIG. 4. When the states of the sides are indicated by common expression, the number of types of objects corresponding to states can further be reduced.

FIGS. 5A to 5D are views showing display examples of a container. To express the state of a side, the layout editing application 121 expresses a side by a solid line 503 or dotted line 504. A container has anchors (line, shape, and icon indicated by objects 506, 507, and 509 drawn near the sides), handles (control points drawn on or near the sides or shapes for movement and correction) 502, sliders (short parallel lines drawn on both sides of a side, 403 in FIG. 4), enlarge/reduce (arrow) icons 505, and colors as characteristic features.

The rules of the container display method shown in FIGS. 5A to 5D are as follows.

(1) When each side is fixed, the side is drawn by a solid line.

(2) When the width is fixed, the left and right sides are drawn by the solid lines 503.

(3) When the height is fixed, the upper and lower sides are drawn by the solid lines 503.

(4) The axes are not drawn.

(5) The enlarge/reduce icons 505 are drawn near a side which is not drawn yet, and the side is drawn by a dotted line 504.

(6) At the intersection between a vertical side or axis and a horizontal side or axis, an anchor is drawn if both of the sides or axes crossing each other are fixed.

(7) When no anchor is drawn anywhere on a fixed side, a slider is drawn at the center of the side.

(8) At the intersection between a vertical side or axis and a horizontal side or axis, a handle is drawn if neither anchor nor slider is drawn there.

Flexible sides are drawn by dotted lines. Anchors are displayed at fixed points defined by the rules 6, 7, and 8. Sliders are displayed on fixed sides. Handles are displayed on remaining sides.

In the above-described rules, higher priority is given to a constraint set by the user later. That is, when another constraint is set later, and it can affect sides which should be drawn in accordance with the above-described rules, the drawing contents of solid line or dotted lines are changed.

The location where a variable side (i.e., a movable side) is drawn depends on the content of the container. As will be described later, "dynamic correction processing" is performed in which a content is merged with a document template, and a document is displayed on the user interface.

These content expressions provide a graphical means for displaying the state of a side of a container. The expressions can be interpreted in the following manner.

(1) A dotted line indicates the position of a side in the document corresponding to the content of the container, like the side 410 shown in FIG. 4.

(2) A solid line indicates a restricted side. This is because a side indicated by a solid line is fixed (side 414), or the width or height of the container is fixed (both the width and height are fixed in the container 408).

(3) An anchor indicates that the intersection between sides or axes is fixed. For this reason, an anchor point appears at the same horizontal and vertical positions in all documents to which a document template containing the anchor point is applied. The anchor is fixed, as a matter of course. The icon 409 in FIG. 4 is an example of an anchor icon which aims at fixing the sides 414 crossing each other.

(4) A slider indicates that the associated side is fixed in the vertical direction of the side. However, the container can be moved to a position slid along the side by the "length of the slide". For example, the content of the container 408 may be moved to the left or right in the document and displayed by operating the sliders 413.

Some or all of these icons and sides are drawn or not depending on which tool or container is selected, highlighted, or activated. Generally, the sides of a container and icons are displayed to design the document template and not drawn on a printed product to which the created document template is applied.

Settings of a basic pattern for the reference values, minimum values, and maximum values of the width and height of a container are displayed in a secondary dialogue window.

Figure 5A:
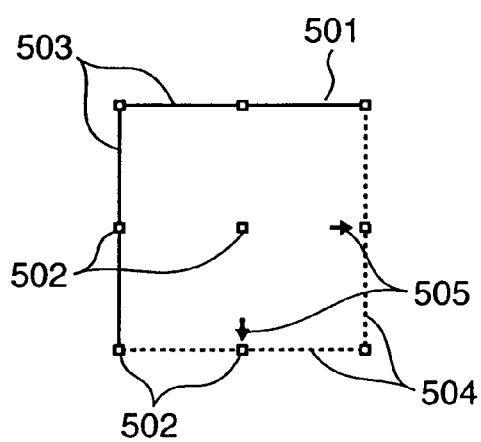
FIGS. 5A to 5D are views showing typical container rules according to the embodiment.

Referring to FIG. 5A, neither the width nor height of the container 501 is fixed. The fixed sides 503 are expressed by solid lines. The variable sides 504 are expressed by dotted lines. A dotted line indicates that the side can be changed in accordance with the size of a content of the container. On the other hand, the enlarge/reduce icons 505 are indicators representing that the adjacent sides 504 can be changed as another container associated by a link changes its size or moves.

Figure 5B:
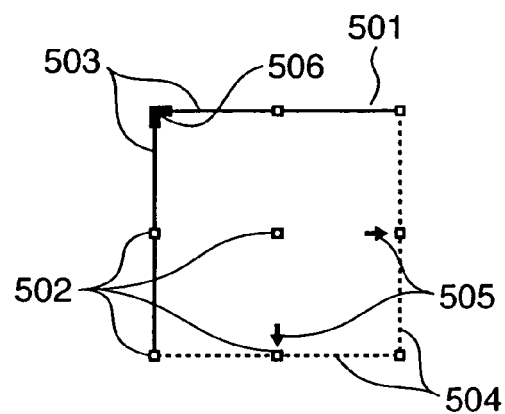

Referring to FIG. 5B, both the width and height of the container 501 are variable. The anchor icon 506 indicates that the two crossing sides 503 are fixed.

Figure 5C:
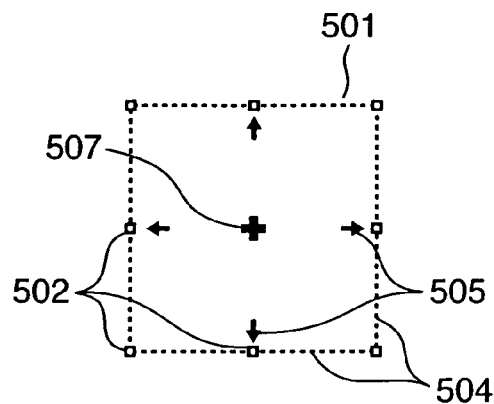

Referring to FIG. 5C, the container 501 can extend equally from the point indicated by the anchor icon 507. The container 501 can change both the width and height. In enlargement/reduction, the layout is adjusted such that the anchor icon 507 is always located at the central point of the container 501.

Figure 5D:
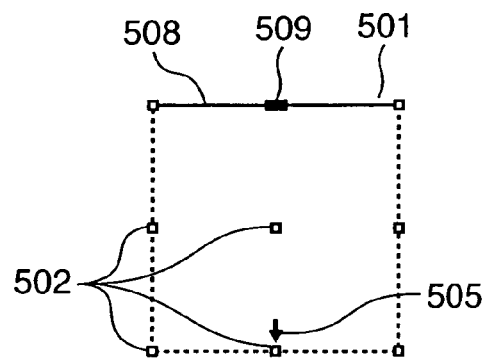

Referring to FIG. 5D, both the width and height of the container 501 are variable except that an upper side 508 is fixed. The anchor icon 509 displayed at the center of the upper side 508 indicates that the left and right sides of the container can move about the central axis (vertical axis) which passes through the icon 509 and is drawn vertically.

<Example of Data of Document Template>

Figure 33:
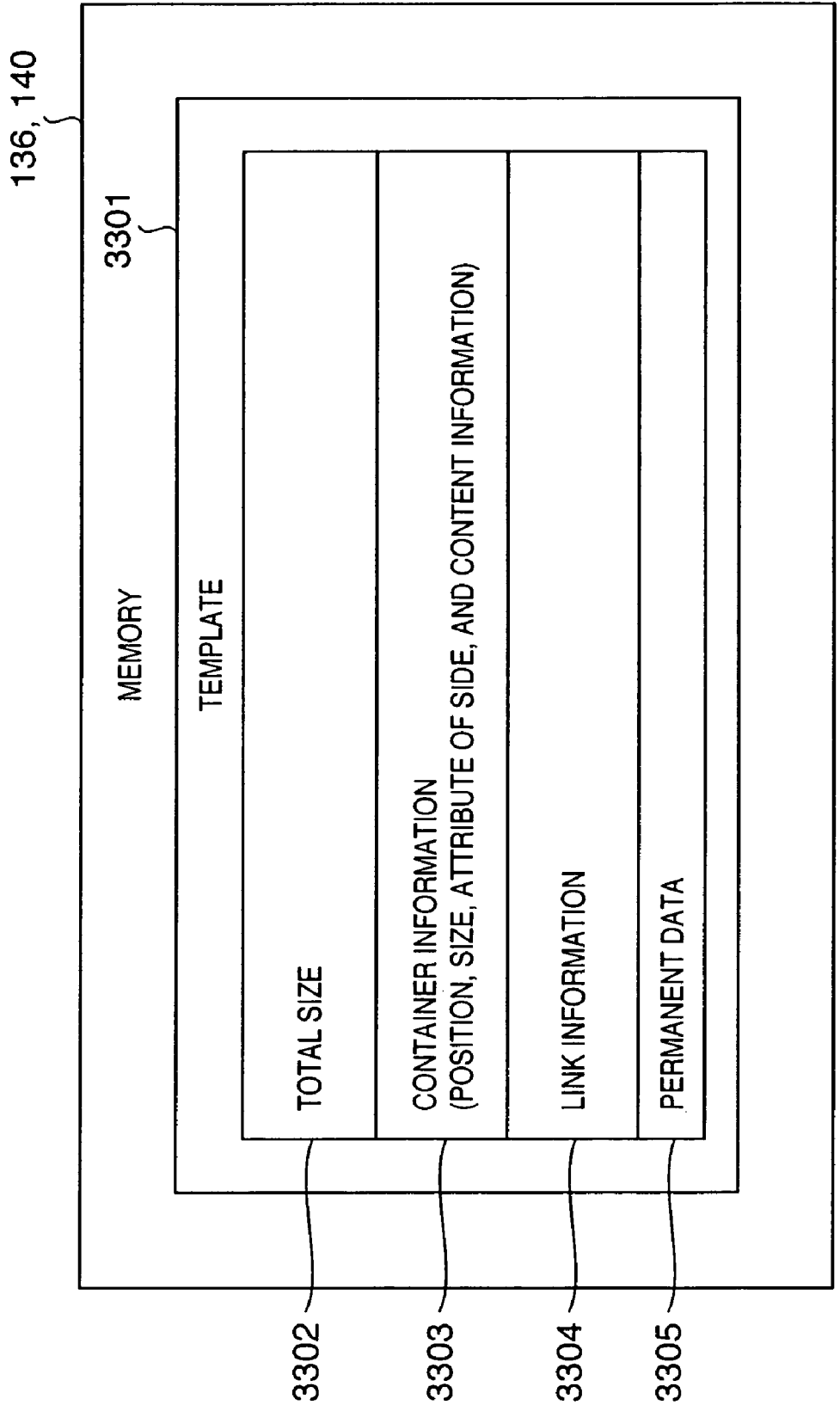
FIG. 33 is a view showing an example of template data.

FIG. 33 shows an example of data of a document template (to be referred to as template data). Referring to FIG. 33, template data 3301 is stored in the memory unit 136 or hard disk 140. The template data contains the following elements.

(1) Total size 3302: The page size of the whole template. The size is represented by, e.g., the vertical and lateral lengths, or a standard paper size.

(2) Container information 3303: Identification information to specify each container laid out on the template, the reference position of each container (position information), the length of a side (size information), the attribute of a side or point of a container (attribute information), and information of a content associated with a container.

Position information and size information are defined when a template is created. Position information indicates the reference position of a container set by the user when the container is created. When the position of the container is variable, the container size is changed in accordance with the size (image size or text amount) of the content inserted in the container, and the container position is changed dynamically in accordance with the size of each container. When the position of the container is fixed by an anchor or the like, the position information indicates the fixed position. The position information contains information capable of specifying at least the positions of diagonal points of the container. All points may have position information on the template. Alternatively, one point may have position information on the template, and the remaining points may have relative position information. That is, the position can be defined by one point of the container and the size of the container. Fixed points may be defined by positions on the template, and variable points may be defined by relative positions.

Attribute information indicates the attribute of a side or axis of a container or the intersections between them, which have been described with reference to FIGS. 4 and 5A to 5D. The upper, lower, left, and right sides, horizontal and vertical axes, corner points, central point, width, and height of a container are defined by, e.g., the position and size. Whether each element is variable or fixed is defined by attribute information. When a document template is created by the user interface shown in FIG. 4, a side, point, or axis of a container is selected. In this state, the operator selects a desired item from menus "fixed" and "variable" displayed in the palette 311. Accordingly, the attribute "fixed" or "variable" is written in the container information 3303 in correspondence with the selected point or side. Default values immediately after container creation are, e.g., "variable". In this example, when a side or axis is "fixed", not the length of the side or axis or its position in the longitudinal direction but the position in a direction perpendicular to the longitudinal direction is fixed. When the attribute of a point or side is set, and accordingly, the attributes of the remaining points or sides are defined automatically, the attributes are also written. For example, when a corner point is designed as "fixed", the sides that define the point are also "fixed", and vice versa. In addition, for example, when the position of the central point is designated as "fixed", "fixed" is written in the attribute of the central point. Simultaneously, the attributes of horizontal and vertical axes are also written as "fixed". In this case, if the width and height remain variable, the attributes of the width and height are maintained "variable".

Information (content association information) about an associated content contains, e.g., information representing the container type (text container or image container), the identifier of a data source to be inserted in the container (e.g., some or all of the database name, record name, and field name), and association information (e.g., a conditional expression to extract the content). For a text container, text enhancement information such as information about the font, including the font type, size, color, italic, bold, and underline is also contained in the content association information.

Pieces of container information 3303 are held equal in number to containers arranged on the document template.

(3) Link information 3304: A link is association between containers and is especially information to set the distance between two containers combined by a link to a predetermined value (fixed link) or in a variable range (variable link). The link information contains, in each of the horizontal and vertical directions, the identifiers of two containers, information representing that a link is set between the opposing sides of the containers, and the distance between them in the direction along the link. Link information is held for each defined link. As the form of link information, the position of a side of each container may be held in each of the horizontal and vertical directions, and information representing that a link is set between the sides may be held.

(4) Permanent information 3305: Permanent information contains information to define a fixed portion except variable portions. For example, a text or image common to all documents (all records) generated by using the template can be defined. For a text or image, only position information can be defined instead of containing the data itself. Information to define the layout position on the template data is also contained, as a matter of course.

Figure 34:
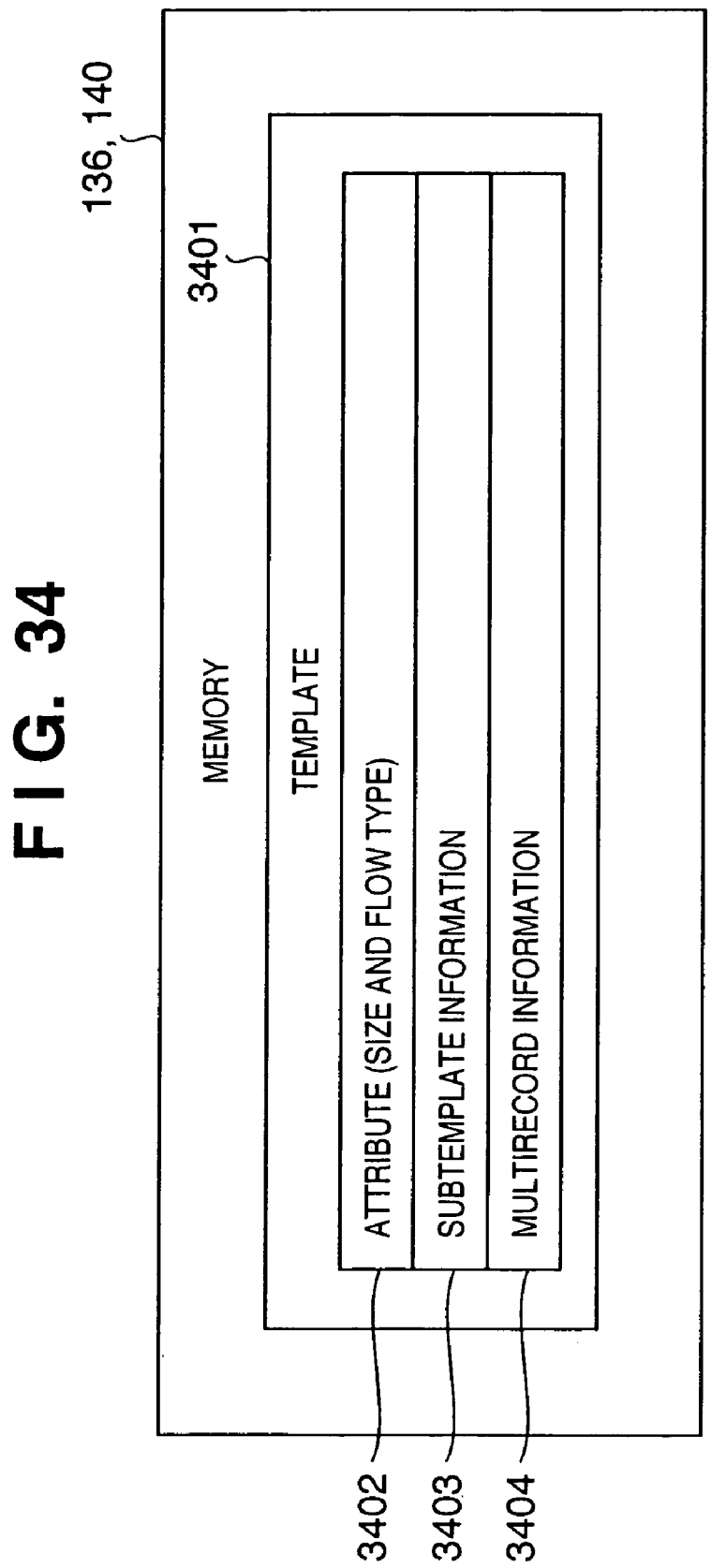
FIG. 34 is a view showing an example of template data defined in a flow area.

FIG. 34 shows an example of template data used for the multirecord function. Referring to FIG. 34, a region called a flow area in which another template can be inserted as a subtemplate is defined in the document template. The region in which subtemplate is inserted is called a flow area. Subtemplates equal in number to multirecords are inserted in one flow area. Referring to FIG. 34, template data contains flow area information 3401. Pieces of flow area information equal in number to flow areas contained in the template are contained in the template data. The flow area information 3401 contains the following elements.

(5) Flow area attribute information 3402 representing the position, size, and flow type: The position and size are the same as those described with reference to FIG. 33. Flow type is a code which defines the pattern of subtemplate insertion in the flow area. This will be described later in detail. The number of subtemplates to be inserted in the flow area is variable and is determined by the key column (to be described later) of multirecords. Flow type is information to define the layout of subtemplates in the flow area by the number of subtemplates to be inserted in the flow area.

(6) Subtemplate information 3403: The subtemplate information 3403 contains a content to be laid out in the subtemplate, and layout information representing the correspondence to the flow area in which the content (in this specification, this content will be referred to as a layout content) laid out in accordance with the subtemplate is to be inserted. The subtemplate information 3403 is, e.g., information to identify a template to be inserted in the flow area and contains, e.g., the name of a template data file (template file). A layout condition to lay out a layout content or a flow type to designate the insertion order of layout contents may also be contained in the subtemplate information. As a layout condition, for example, a search condition (search formula) of the database as a layout target by the subtemplate is held. A flow type is designated from choices such as Z-type, N-type, and V-type prepared in advance, and an identifier representing the designated flow type is held as flow type. Alternatively, a layout information field may be prepared in a record of the database. A layout content may be inserted in a flow area corresponding to a layout condition value which coincides with the value in the layout information field.

(7) Multirecord information 3404: The multirecord information 3404 contains identifiers of a database name associated with the flow area and a field name in each record. Records having the same value for a designated field name are fetched (loaded) from the designated database and laid out in one flow area in principle. Limited expression "in principle" is used because the number of records which satisfy the condition can be considerably larger than the size of the flow area. In this case, exceptional processing must be executed by, e.g., generating another document.

<Link Setting Method>

Figure 7A:
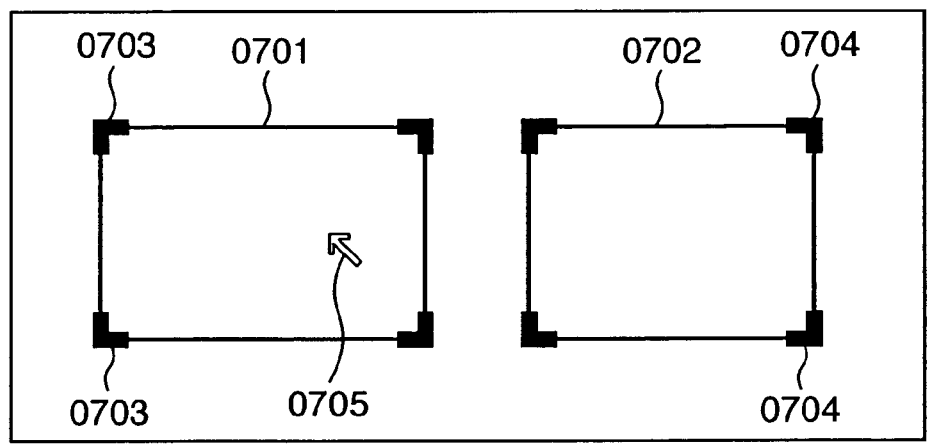
FIGS. 7A to 7C are views showing examples of a UI in creating a link.
Figure 7B:
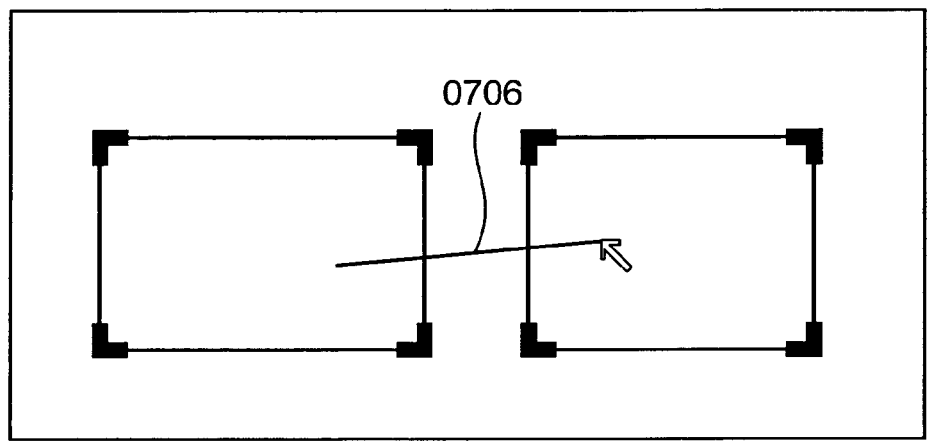
Figure 7C:
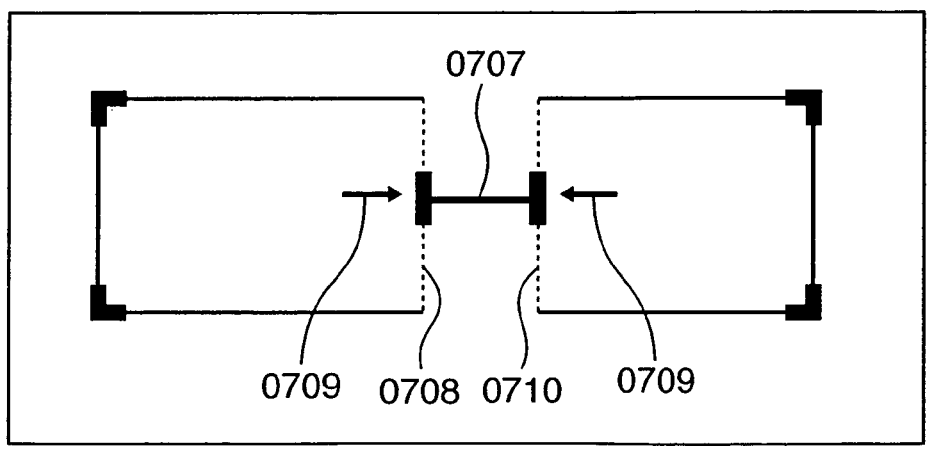

FIG. 6 is a flowchart showing a link setting method by the layout editing application 121. FIGS. 7A to 7C show examples of a UI. A method of setting a link between containers will be described below with reference to FIGS. 7A to 7C and 6.

First, to set a link, the layout editing application 121 creates containers (at least two containers) to set a link in accordance with an operation instruction from the user (step 0601). Next, the link tool button 406 shown in FIG. 4 is selected (step 0602). FIGS. 7A to 7C show examples of the user interface when two containers are created, the link tool is selected, and the operation of setting a link is executed. FIGS. 7A to 7C will be described sequentially.

Sides 0701 and 0702 shown in FIG. 7A are fixed sides which are the same as the sides 407 and 409 in FIG. 4 described above. Anchors 0703 and 0704 are the same as the anchor 409. First, the user selects one container as a link setting target by clicking on it (step 0603). As shown in FIG. 7B, the mouse pointer is moved to the other container, and the mouse is clicked on it (step 0604). A line 0706 shown in FIG. 7B indicates a line which connects the first click point in FIG. 7A and the position of the mouse pointer after movement. The line 0706 is a UI which presents the link setting position to the user. After step 0604, the containers are set in the state shown in FIG. 7C. A link 0707 is displayed at the set position (step 0605). When the link is set, the objects which indicate the containers are also changed automatically (step 0606). Sides 0708 and 0710 indicated by dotted lines are variable sides. The sides of the containers are changed as shown in FIG. 7C because they need to be changed to variable sides in accordance with link setting. If all sides are fixed even after link setting, a contradiction occurs. The above-described processing is executed automatically to prevent this contradiction. Enlarge/reduce icons (arrows) 0709 are the same as the icons 505 in FIGS. 5A to 5D. The enlarge/reduce icons 0609 are objects which visually present, to the user, directions in which the containers can change due to link setting. In the example shown in FIG. 7C, the right side 0708 of the left container and the left side 0710 of the right container change to variable sides. This is merely an example. The right container may have the slider 413 in FIG. 4.

This processing can be described as follows from the viewpoint of data processing in FIG. 33. For example, in step 0601, container information 3303 is defined by creating containers. In step 0606, the layout editing application 121 stores, as link information, that a link is set between the two containers selected in steps 0603 and 0604. In step 0606, the layout editing application 121 changes the attributes of the opposing sides of the two containers having the link as needed. For example, if at least one of the opposing sides is variable, the attributes of the sides need not be changed. However, if both sides are fixed, link setting is meaningless. Hence, at least one of the sides is changed to a variable side. In the example shown in FIG. 7, both sides are changed to variable sides. When the attributes of the sides are changed, the attribute information of each side having the changed attribute contained in the container information 3303 is rewritten.

In the above description, expression "opposing" has been used. This applies to a case in which two lines apparently oppose each other. Additionally, when lines themselves do not oppose (i.e., when the projections of two lines in the longitudinal direction do not overlap) but the extended lines of the lines oppose each other, a link can be set between the extended lines. In this specification, the expression "opposing" is used for containers associated by a link, including those having sides whose extended lines oppose each other. That is, a link can be set even between small containers laid out along, e.g., a diagonal line of the template.

As described above, when one of the opposing sides of containers associated by a link is variable, and the other is fixed, the variable side can move in accordance with the content size. The container itself on the side of the fixed side translates in accordance with the movement amount of the variable side (if no anchor is present). The distance (distance in the direction along the link) between the containers, which is defined by the link, is maintained. When both sides are variable, the sizes of both containers can change in accordance with content sizes. Even in this case, the distance between the containers is maintained.

<Preview Mode (Layout Calculation)>

Figure 8:
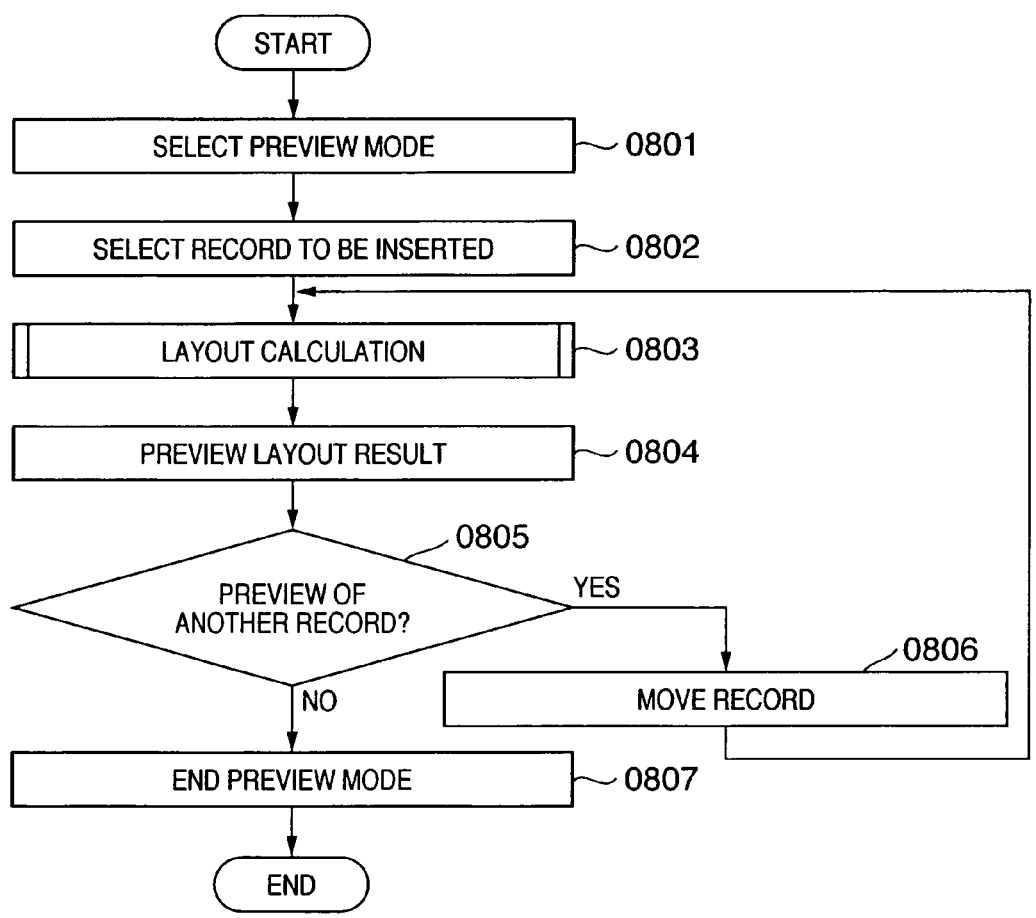
FIG. 8 is a flowchart showing the overall flow of layout calculation according to the embodiment.

FIG. 8 shows the flow of layout calculation. Layout calculation is processing of, when actual data are inserted in containers on a document template, re-calculating the sizes and layout of the containers in accordance with the data sizes of the contents. FIG. 8 shows an example when a preview mode is designated. Hence, a document generated by inserting contents in a template is displayed on the display 144. However, when a print mode is designated, the document is printed instead of displaying its preview.

Referring to FIG. 8, first, the preview mode is selected (step 0801). The operation modes of the automatic layout system according to this embodiment include a layout mode in which containers are created, and a document template in which a layout is defined is created by associating the containers with each other, and a preview mode in which records are inserted in the created layout (template), and the layout result after actual record insertion is previewed.

In the preview mode, actual records are inserted, and the layout is calculated. In the preview mode, layout calculation for display is done. Even in actual printing, layout calculation is done by inserting records. The calculation method at this time is the same as in the preview mode.

In the preview mode, a record to be previewed is selected (step 0802). The record is selected by selecting a record designated by the operator or selecting records sequentially from a designated database. When the record is selected, calculation is done to lay out the record in accordance with the template (step 0803). The record is laid out in accordance with the calculation result in step 0803 and displayed (0804). It is determined whether to preview another record (step 0805). This determination can be done on the basis of the operator's instruction. Alternatively, it may be determined whether preview within a range designated in advance is ended. If NO in step 0805, the preview mode is ended (step 0807).

If YES in step 0805, another record is selected, layout calculation is executed again, the record is laid out, and preview is done (step 0806). Not in the preview mode but in the print mode, layout calculation is done sequentially for all records to be printed. Hence, the processing in steps 0801 and 0807 is not present. In step 0805, it is determined whether all records to be printed are printed.

(Layout Calculation Procedures)

Figure 9:
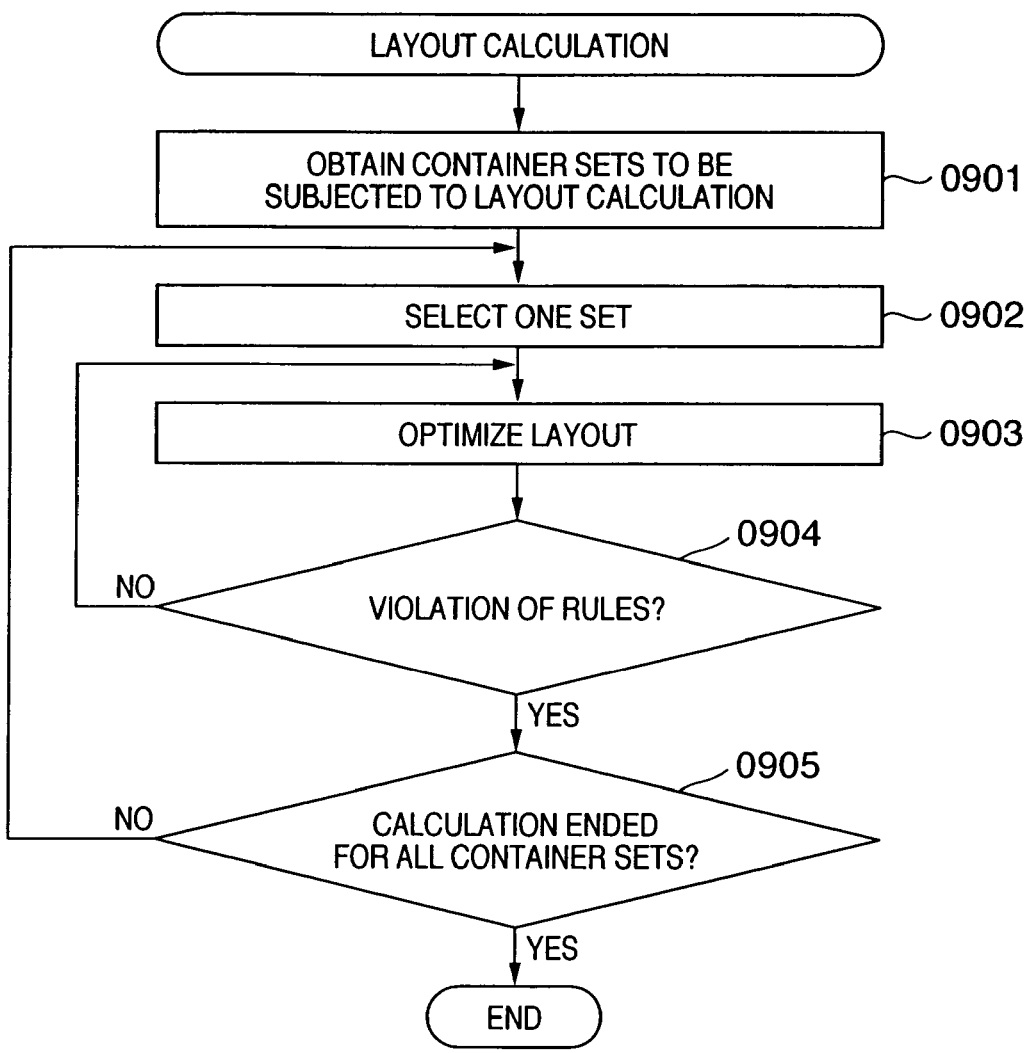
FIG. 9 is a flowchart showing details of the flow of layout calculation according to the embodiment.
Figure 10A:
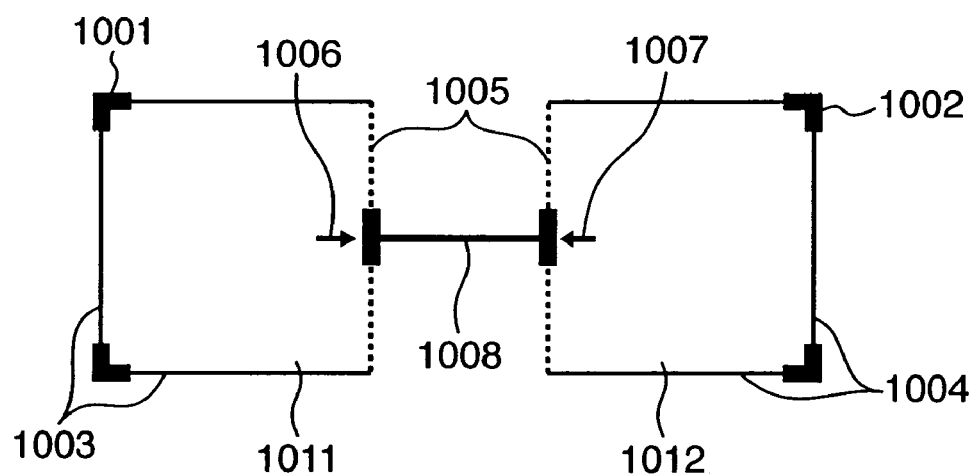
FIGS. 10A to 10C are views showing examples of a UI corresponding to the flow in FIG. 9 according to the embodiment.
Figure 10B:
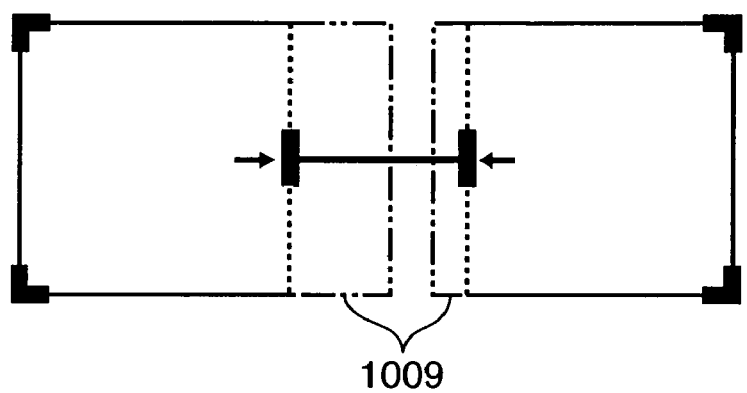
Figure 10C:
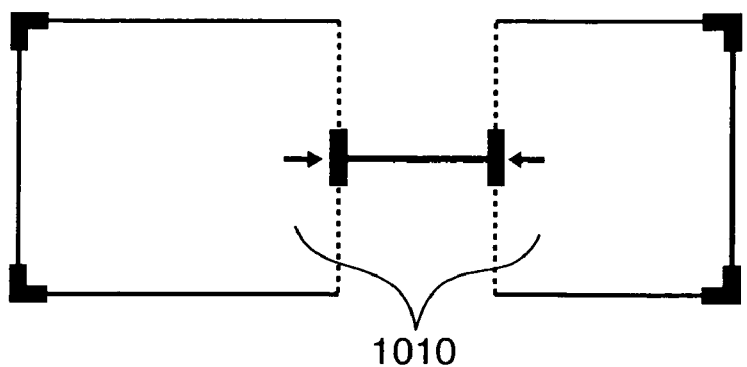

FIG. 9 is a flowchart showing details of layout calculation in step 0803 in FIG. 8. FIGS. 10A to 10C are views showing display examples of the UI at that time. Flowcharts to be described in this embodiment, including that shown in FIG. 9, are executed by the computer shown in FIG. 1A, 1B, or 2.

Figure 11:
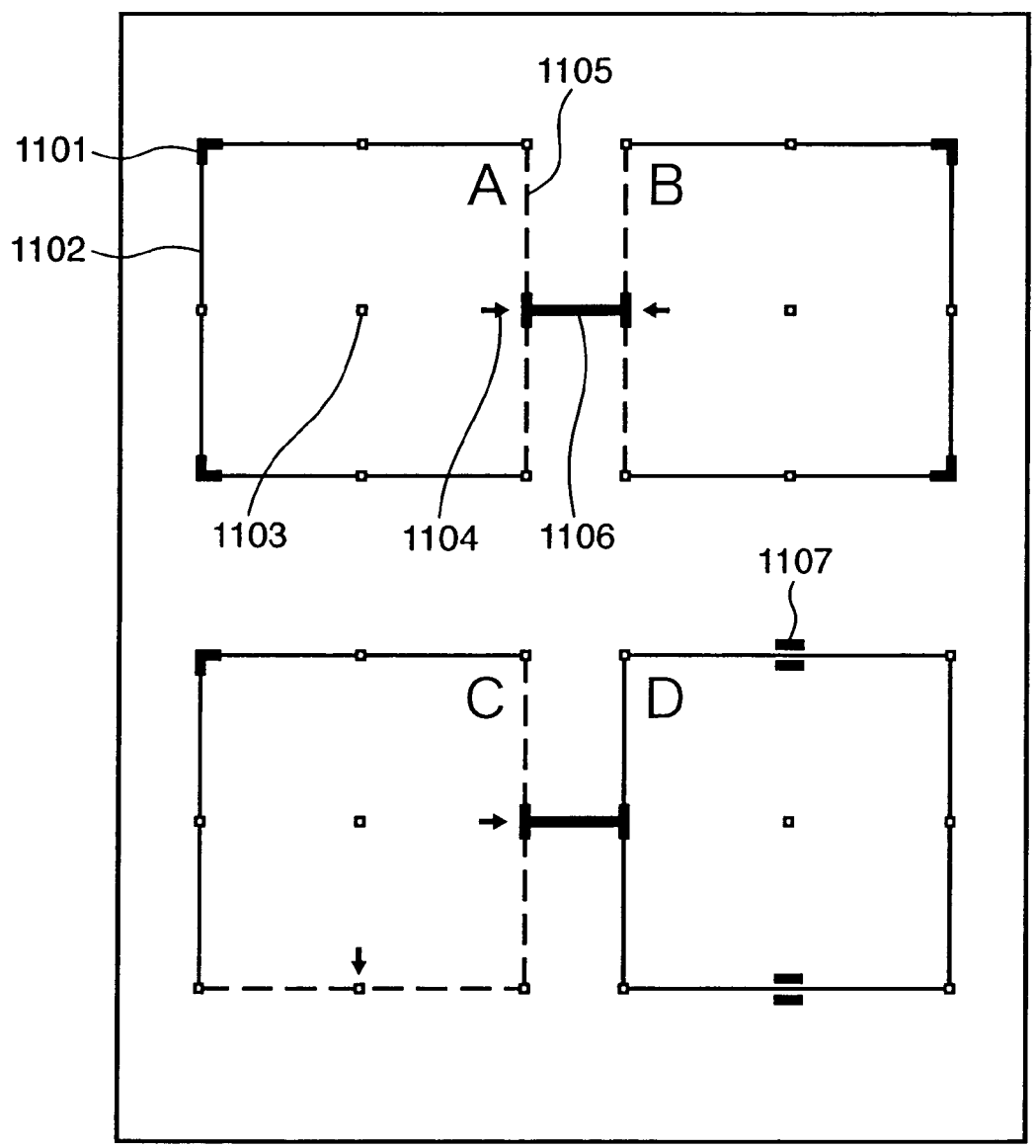
FIG. 11 is a view for explaining container sets in layout calculation according to the embodiment.

First, container sets to be subjected to layout calculation are obtained (step 0901). Layout calculation is executed for each set of containers associated with a link. Referring to, e.g., FIG. 11, four containers are laid out on a page and associated with each other. In this case, containers A and B are associated by a link, and containers C and D are also associated by a link. Hence, the containers A and B form set 1, and containers C and D form set 2. More specifically, link information 3304 of template data shown in FIG. 33 is referred to, and containers associated by links can be determined as one container set. As described above, reference numeral 1101 in FIG. 11 denotes an anchor; 1102, a fixed side; 1103, a controller; 1104, an arrow which indicates the change direction of a variable side; 1105, a variable side; 1106, a link; and 1107, a slider.

A set is selected from the container sets obtained in step 0901 to calculate the layout (step 0902). The selection is done in accordance with, e.g., the appearance order in the link information of the template data. For the selected container set, layout calculation is executed. In this case, the layout is optimized such that the difference between the size of each container to be laid out and the actual content size becomes as small as possible (step 0903).

The layout is optimized such that, in containers associated with each other to dynamically change their sizes, a content inserted in each container and the container in which the content is to be inserted have the same size as much as possible. When the size of a container is fixed, the content is enlarged or reduced and fitted in the container, or part of the content is fitted in the container.

Assume that one container in the container set of interest has a fixed size, and the other container has a variable size. The container having the fixed size is adjusted in accordance with the above-described procedures. For the container having the variable size, the size is changed within the movable range of the container with the fixed size, and then, the content is inserted. If the content cannot be fitted in the container even after the size is maximized, the content is enlarged or reduced, or part of the content is inserted in the container.

When both containers in the container set of interest have variable sizes, the layout is determined such that the contents are fitted in them uniformly as much as possible. For example, assume that outer points of two containers associated by a link are fixed, and only opposing sides are variable, as shown in FIG. 7C. In this case, the container sizes are temporarily determined in accordance with the sizes of the contents. The opposing sides of the containers are determined such that the containers are located at equidistant points from the intermediate point of the distance along the direction of the link between the containers. The sides have a distance defined by the link information, as a matter of course. The size of each container is determined in this way. If the content cannot completely be fitted in the container, the content is enlarged or reduced, or the content is partially clipped and inserted in the container.

Even when the container set contains three or more containers, the container sizes (i.e., the lengths of variable sides) are calculated in accordance with the content sizes. Points separated from the intermediate point by the distance defined by the link information are determined as the positions of the sides. A container having a fixed side as a linked side is moved in accordance with the movement of a side of an associated container.

In the above-described way, a set is formed by containers associated by a link. For a container having a variable size, its size is determined. For a container having a variable position, its position is determined.

Layout optimization calculation is executed in accordance with the above procedures. If the calculation result violates rules, calculation is done again to prevent any violation of rules (step 0904). The rules are constraints set by the user in creating the layout. Examples of the constraints are the size and position of a container and the length of a link. The constraints are defined by attribute information of a side or point contained in container information and link information in the template data. Especially, items having a value "fixed" in the attribute information and the link information define constraints in the layout. After the end of layout calculation in step 0903, items such as the position of a side or point and the size of each container after calculation, which have attribute "fixed" are compared with container information in the template data. If an item has a different value, it is determined that a violation of rules has occurred. Even for the link, when the link length (distance between containers) contained in the link information is different from the distance between containers for which the link after layout calculation in step 0903 is set, it is determined that a violation of rules has occurred.

When the layout is calculated without any violation of rules, the layout of the container set is completed. The processing in steps 0902 to 0904 is executed for all container sets on the page. The layout of the entire page is thus calculated (step 0905).

Layout Example

FIGS. 10A to 10C show display examples of a UI in layout calculation. Print examples are also the same. FIG. 10A shows a container set initially defined in template data. Referring to FIG. 10A, the template data contains anchors 1001 and 1002, fixed sides 1003 and 1004, a variable side 1005, an arrow 1006 which indicates the change direction of a variable side, and a link 1008. In this state, a record is selected, and contents having different sizes are inserted from the record in the containers. FIG. 10B shows the new container sizes superposed on the state shown in FIG. 10A. Rectangles 1009 indicated by alternate long and two-dashed lines indicate the sizes of contents to be inserted in the respective containers. Layout calculation is executed. FIG. 10C shows the result of layout calculation. The sizes of containers after layout calculation are calculated such that they have the same difference to the size of the content to be actually inserted. Accordingly, the position of the variable sides are determined. That is, the frames in which the contents are to be laid out are determined. This layout is calculated such that no violation of the above-described rules occurs. As shown in FIG. 10C, the content sizes 1009 to be inserted in the containers shown in FIG. 10B and content sizes 1010 after calculation (i.e., container sizes after calculation) have the same difference.

<Multirecord (Multidata) Function>

The outline of multirecord will be described. In a normal document template, one record corresponds to one document. In a multirecord corresponding to a subtemplate, records until a break at which a reference item changes occurs are inserted. Hence, a plurality of records are inserted in one document. The database of variable data corresponding to a normal document template and the database of multirecord of variable data corresponding to a subtemplate are preferably different databases.

Figure 12:
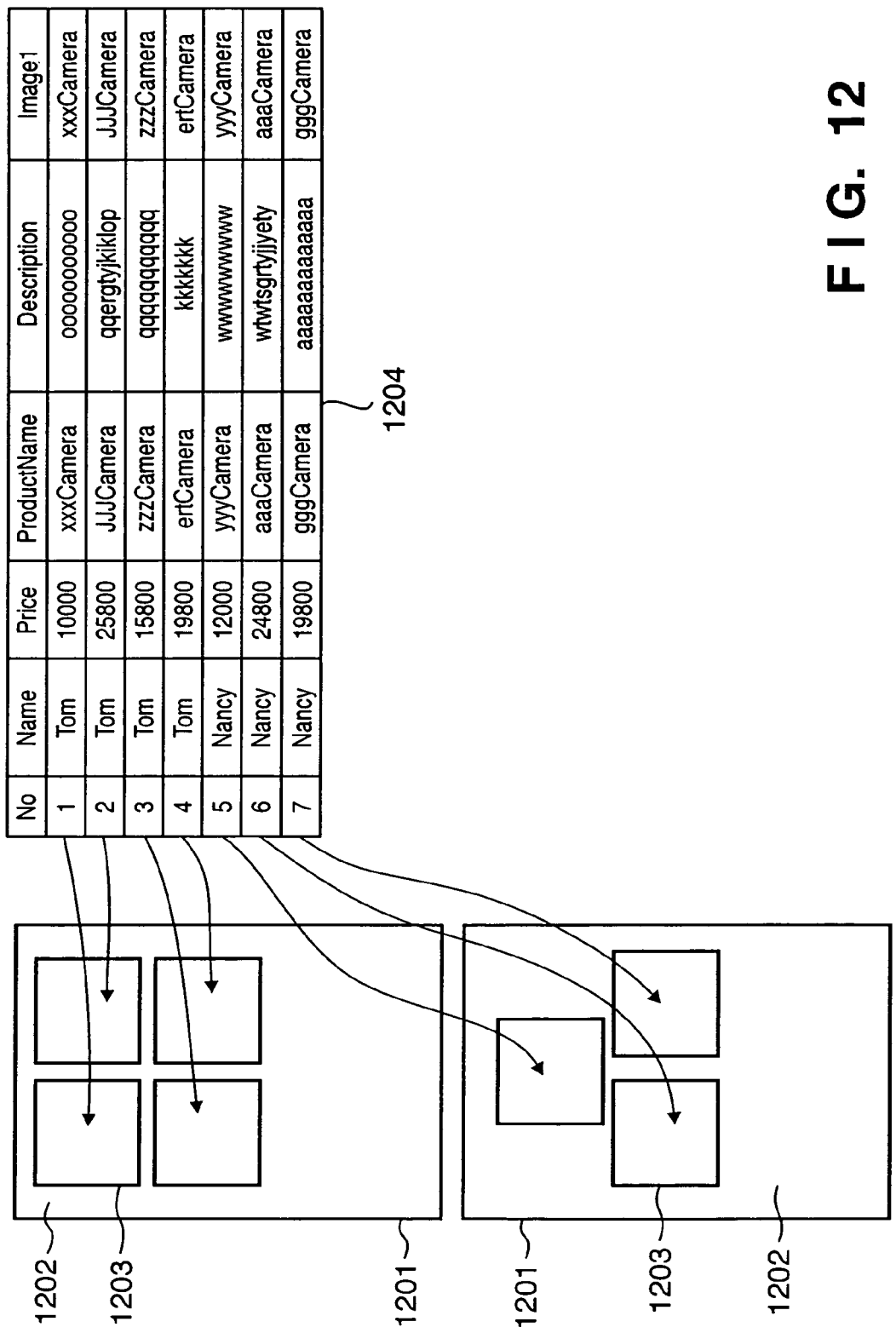
FIG. 12 is a view showing the outline of a multirecord according to the embodiment.

FIG. 12 is a view showing the outline of a multirecord and its layout method. A database 1204 contains documents 1201, pages 1202, subtemplates 1203, and database 1204. Referring to FIG. 12, the database 1204 contains records 1 to 7. In a normal variable print mode in which one record is laid out in one documents, seven documents are created because there are seven records.

However, in the variable print mode of the present invention which supports the multirecord function of laying out multiple records in one document, the following processing is executed. First, the user designates a column (field) as a reference item to designate a multirecord. The designated column is called a key column. The key column is sometimes called a multidata condition. In this example, the field name: Name is designated as the key column. Records having the same value in the designated field are laid out in one document. In this example, records 1 to 4 have the same value "Tom" in the Name field as the key column and are therefore laid out in one document. Records 5 to 7 have the same value "Nancy" in the Name field. A break occurs, and records 5 to 7 are laid out in one document (FIG. 12). Records having different values in the field designated for the multirecord are laid out in different documents. The pages 1202 of the documents shown in FIG. 12 are created as different layouts because the number of multirecords are different between the documents. The layout of subtemplates are determined by the number of multirecords. As will be described later, when the flag of flow type of the flow area attribute information 3402 indicates that the number of subtemplates is four, the layout on the upper side of FIG. 12 is obtained. When the number of subtemplates is three, the layout on the lower side of FIG. 12 is obtained.

<Multirecord Layout Processing>

Figure 13:
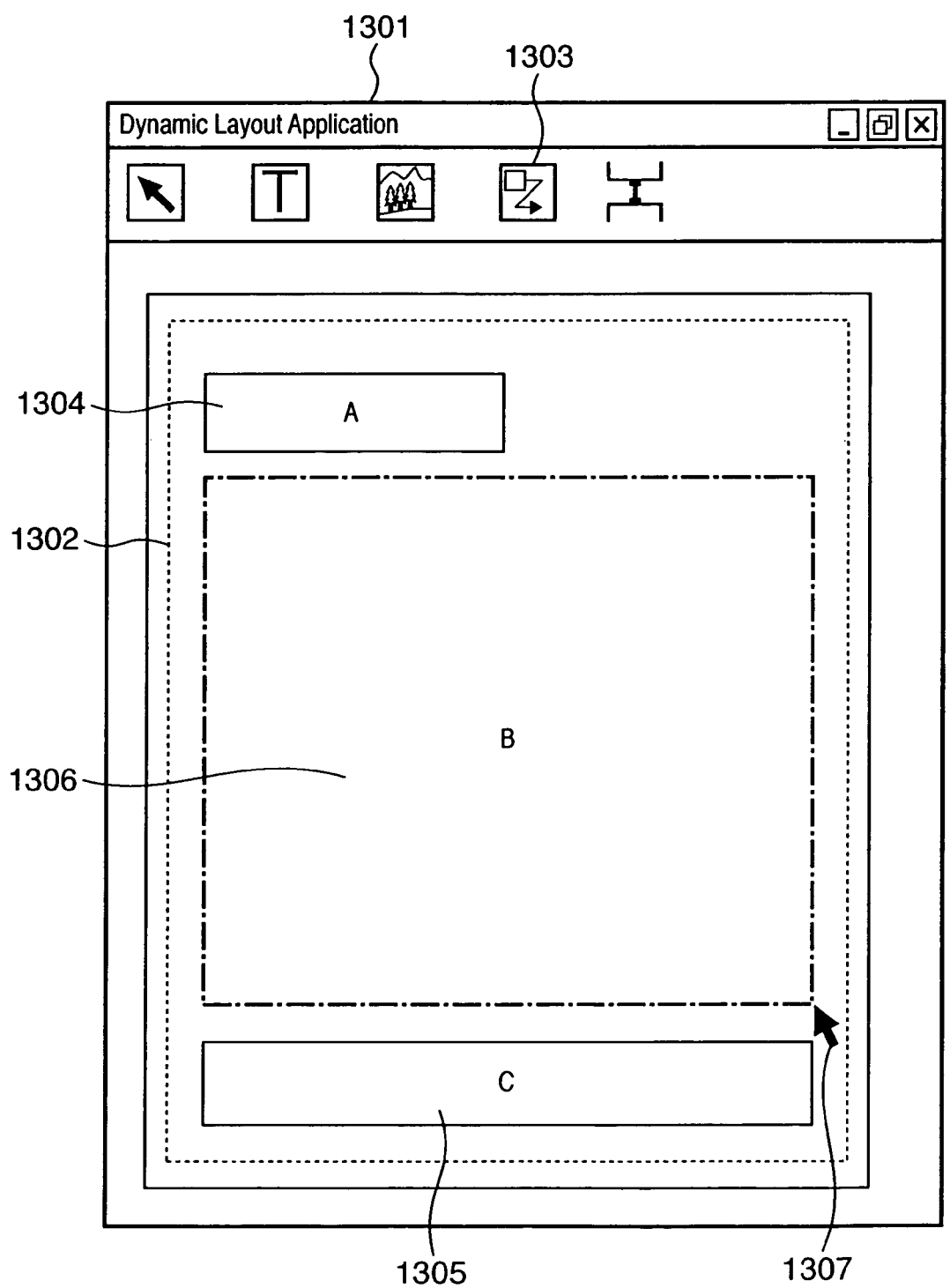
FIG. 13 is a view showing an example of a UI in a flow area according to the first embodiment.
Figure 14:
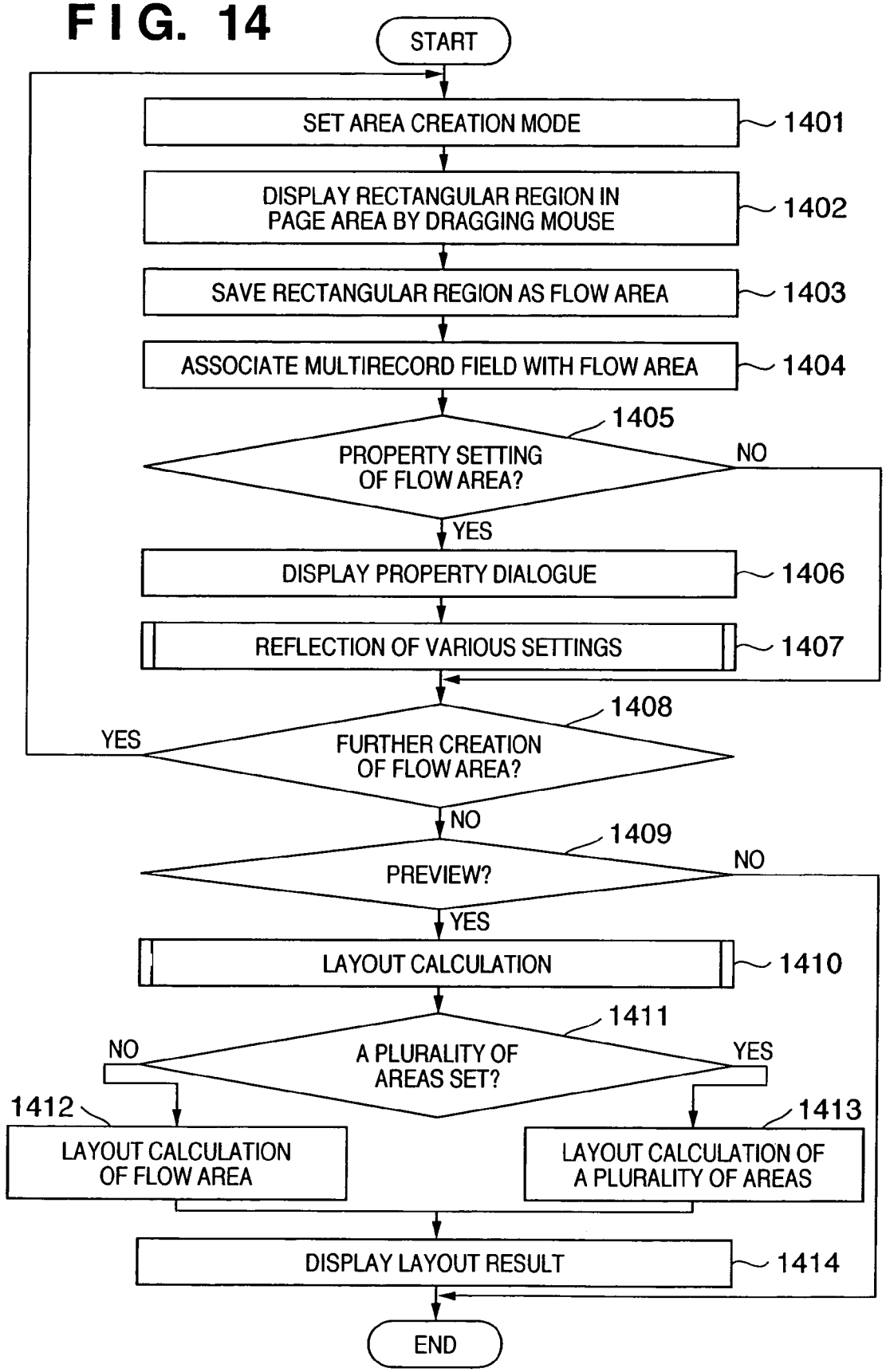
FIG. 14 is a flowchart showing the overall flow according to the first embodiment.

FIGS. 13 and 14 show the user interface and processing procedures of multirecord processing according to the present invention.

Each step of the flow shown in FIG. 14 will be described on the basis of the UI shown in FIG. 13. When an icon 1303 shown in FIG. 13 is clicked on, an area creation mode is set (step 1401). In a page margin area 1302, a rectangle is drawn by dragging the mouse (step 1402). In the area creation mode, the drawn rectangle is a flow area. Information such as the size and position of the flow area is stored as the flow area attribute information 3402 of the template data shown in FIG. 34 (step 1403). Referring to FIG. 13, a flow area 1306 is drawn. A text container 1304 and image container 1305 are also included on the template. On the user interface, the flow area 1306 and the containers are expressed in different manners so that the user can easily visually recognize them. Each of the text container 1304 and image container 1305 is created as a document which changes for each record by loading variable data from the database. As will be described later, data is loaded in the flow area 1306 until a break occurs in accordance with the key column designated from the multirecord database. The layout of the flow area is determined by the flow type.

Next, for the created flow area 1306, the operator is caused to input identifiers such as the name of the multirecord database storing variable data and the name of the field designated as the key column. The input identifiers are associated with the flow area and stored as, e.g., the multirecord information 3404 shown in FIG. 34 (step 1404).

The layout editing application 121 determines on the basis of the operation by the operator whether to execute various settings for the flow area 1306 (step 1405). Various setting operations are done by setting properties. If a property setting operation of, e.g., clicking the mouse pointer on the flow area 1306 is executed, the user interface module 103 displays a property dialogue (step 1406). Settings input through the displayed property dialogue are stored (step 1407). The setting method will be described later in detail with reference to FIGS. 15, 16A, and 16B.

When creation of one flow area is ended, the layout editing application 121 determines on the basis of input by the operator whether an instruction to create a new flow area is input (step 1408). If YES in step 1408, the flow returns to step 1401 to create a new flow area. The properties are also set.

If it is determined in step 1409 that an input to preview the layout is input, the preview mode is set. The layout editing application 121 executes layout calculation (step 1410). The layout calculation is executed in accordance with same procedures as in the flowchart shown in FIG. 9. More specifically, an appropriate record is selected and applied to the created template, and the result is displayed.

The layout editing application 121 confirms whether one or a plurality of flow areas are set (step 1411). If there is one flow area, the layout editing application 121 executes layout calculation for one flow area (step 1412). This processing will be described later in detail with reference to FIGS. 19 and 18. If a plurality of flow areas are present, layout calculation for a plurality of flow areas is executed (step 1413). This processing will be described later in detail with reference to FIGS. 22A, 22B, 23, and 18. Finally, the layout result is displayed (step 1414).

<Property Setting Processing>

Figure 15:
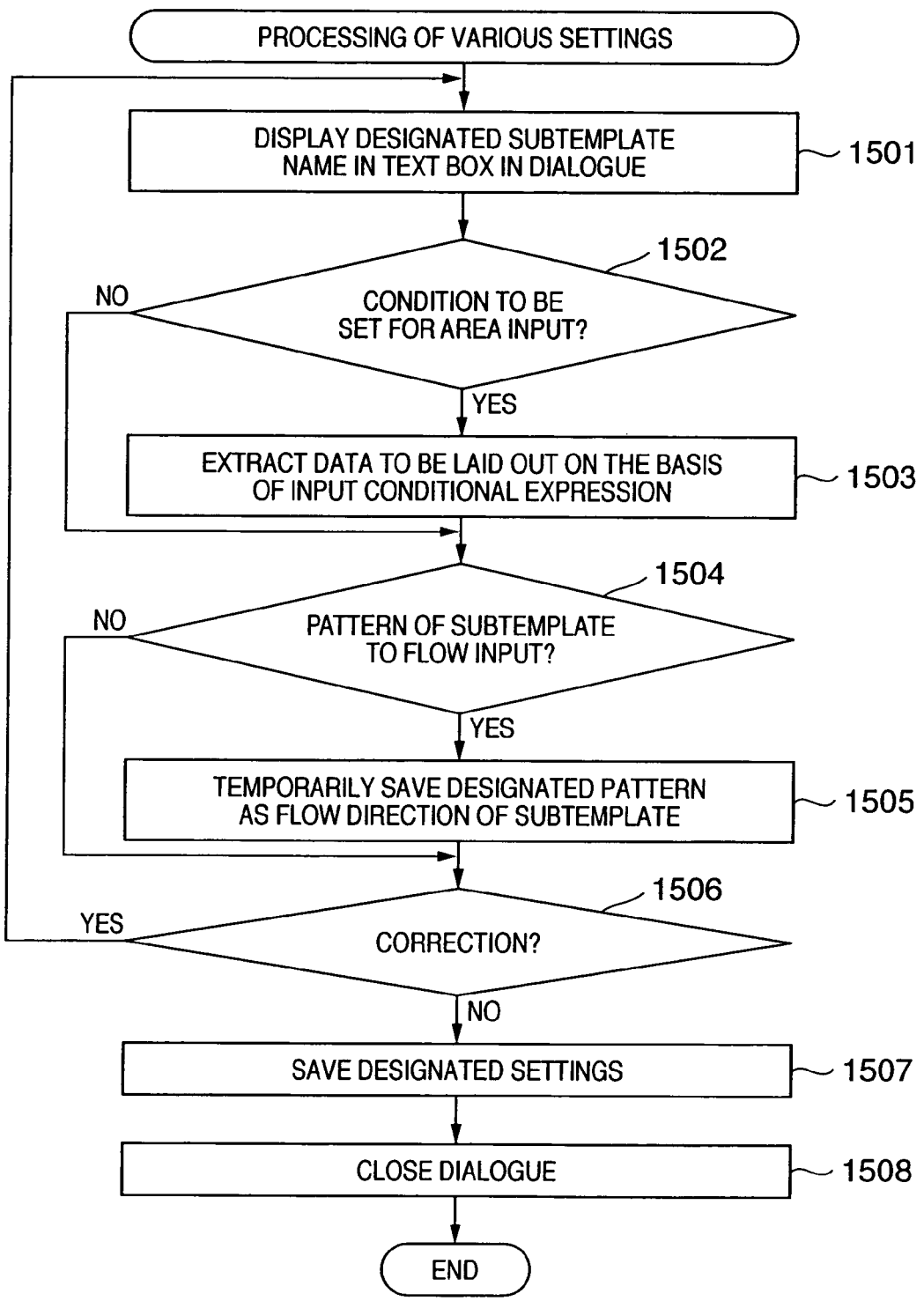
FIG. 15 is a flowchart showing the flow of various settings for the flow area according to the first embodiment.
Figure 16A:
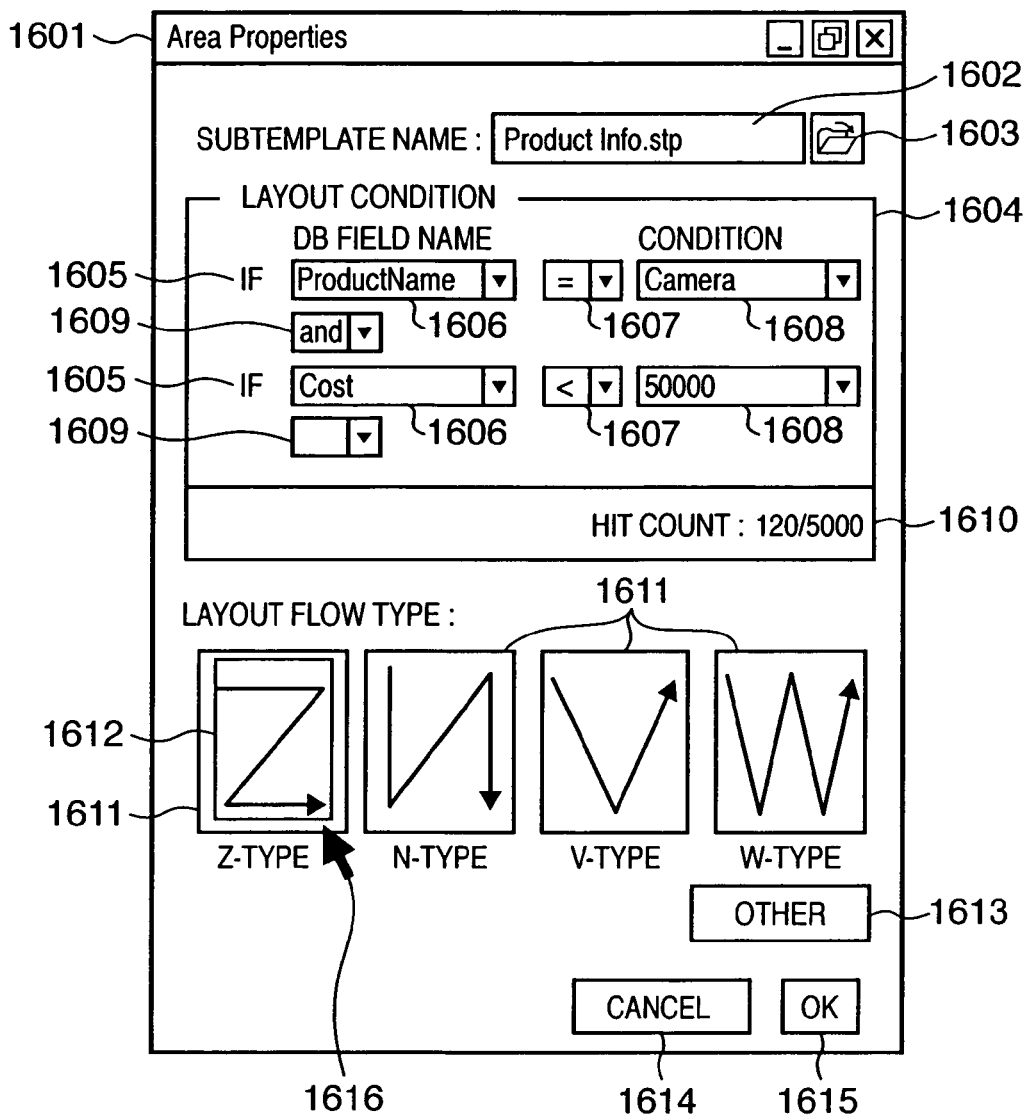
FIGS. 16A and 16B are views showing examples of a dialogue of various settings for the flow area according to the first embodiment.
Figure 16B:
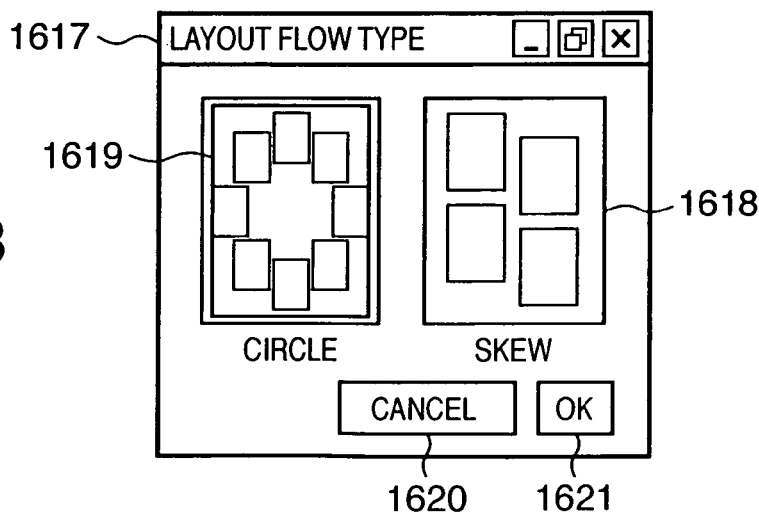

FIG. 15 shows the processing flow of various settings (property setting) for the flow area in step 1407 in FIG. 14. FIGS. 16A and 16B show examples of a setting dialogue.

Each step of the property setting method shown in FIG. 15 will be described with reference to FIGS. 16A and 16B. The subtemplate in the description will be described later. First, a subtemplate to be used in the flow area is designated by the user and displayed in a text box 1602 in FIG. 16A (step 1501). The subtemplate name can be directly designated in the text box or by using a file open icon 1603. Reference numeral 1601 in FIG. 16A denotes a property dialogue; and 1616, a mouse pointer.

The layout editing application 121 determines whether conditional expressions are set (step 1502). In accordance with the conditional expressions input by the user, data to be laid out in the flow area are extracted from the connected database (step 1503). A region 1604 indicates a region where conditional expressions 1605 are input. The field names of connected data files are input in list boxes 1606. Operators to calculate condition determination are input in list boxes 1607. Conditions are input in list boxes 1608. An operator to connect the conditional expressions is input in a list box 1609. The conditions in the list boxes 1606 to 1609 can also be selected from lists instead of directly inputting them. In the example shown in FIG. 16A, conditions representing that the value of ProductName field is "Camera", and the value of Cost field is "less than 50,000" are set for a database "ProductInfo.stp". When the conditions are set, data are extracted from the database. When the data are extracted, the number of extracted data is displayed in a hit count display field 1610. The conditions are called extraction conditions in some cases.

Next, the layout editing application 121 determines whether a flow type to flow the subtemplate in the area is designated (step 1504). If YES in step 1504, the designated flow type is stored as part of the attribute information 3402 shown in FIG. 34. Layout patterns (flow types) are displayed in example fields 1611. The user can designate the flow type by selecting a desired pattern. A rectangle 1612 indicates the currently designated layout pattern. In the example shown in FIG. 16A, Z-type is designated. Any other flow type except the Z-type, N-type, V-type, and W-type shown in FIG. 16A can be set. When a button 1613 is clicked on, a flow type settling dialogue 1617 is displayed. A special flow type such as circle 1619 or skew 1618 can be selected. The flow type is not limited to those described here, and any other type can also be set. Since one flow type is already set by default, no flow type need be set if it is unnecessary. The flow type is preferably changed in accordance with the number of sub-templates (corresponding to the number of data satisfying the layout conditions) to be laid out in the flow area. Hence, the example field 1611 to select a layout flow type in FIG. 16A may be selectable in accordance with the number of subtemplates.

It is determined next whether the set contents need to be corrected (1506). When the operator clicks on a button other than an "OK" button 1615, it is determined that correction is necessary. If YES in step 1506, one of steps 1501 to 1505 is executed in accordance with the operation by the operator. If NO in step 1506, i.e., when the "OK" button 1615 is clicked on, the layout editing application 121 deterministically saves the various designated values (1507). To do this, values designated by operations before step 1501 are saved in a temporary saving area, and they are copied to corresponding items of the attribute information 3402 in step 1501. When a cancel button 1614 is clicked on, all the various settings designated so far are canceled. The attribute information 3402 remains unchanged in the state immediately before the procedures in FIG. 15 start. When step 1507 is executed, the dialogue is closed (step 1508).

(Subtemplate)

Figure 18:
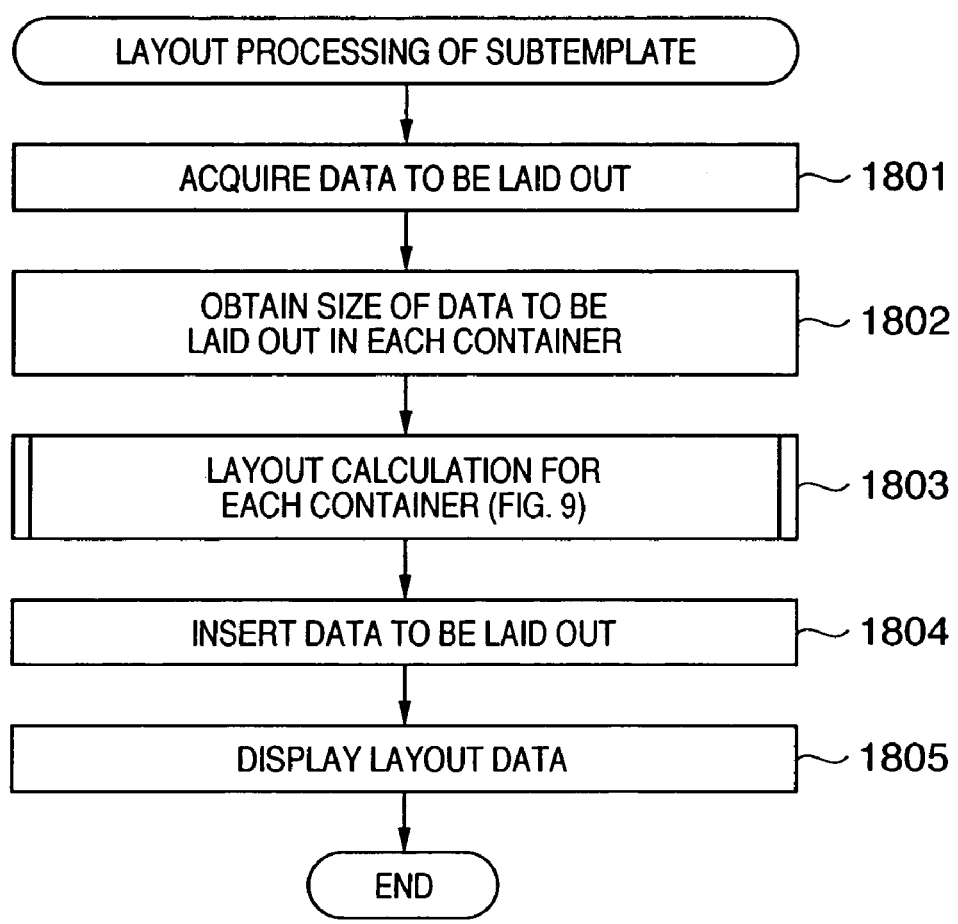
FIG. 18 is a flowchart showing the flow of subtemplate layout according to the first embodiment.

The outline and layout flow of the above-described subtemplate will be described. FIGS. 17A, 17B, and 18 show layout examples and layout flow of a record corresponding to a subtemplate.

A subtemplate is a template in which an image container and text container are laid out. The subtemplate is saved while setting which data should be assigned to the containers. The data itself is not particularly different from a normal template and is defined by template data shown in FIG. 33. The subtemplate can conveniently be used when the same layout is used many times in one document or diverted to another document. A link can be set between image containers or text containers laid out in a subtemplate. Hence, the layout size (and position) can optimally be changed in accordance with the data to be laid out. FIGS. 17A and 17B show layout examples of a record using a subtemplate. Reference numerals 1701 and 1704 denote outer frames of subtemplates; 1702 and 1705, image containers; 1703 and 1706, text containers; and 1707, a link. FIGS. 17A and 17B show layout examples using the same subtemplate. However, since the images and texts have different sizes, different layout results are obtained. FIG. 18 shows the flow of record layout processing by using a subtemplate. FIG. 18 shows an example of preview processing. In the print mode, "display" in FIG. 18 changes to "print".

The layout editing application 121 acquires data to be laid out (step 1801). In the preview mode, the operator designates an appropriate record. In the print mode, a record which coincides with conditions is extracted from a target database and acquired as data to be laid out. Next, the layout editing application 121 obtains the size of data to be laid out in each container (step 1802). The layout editing application 121 executes layout calculation for each container on the basis of the obtained data size (step 1803). Step 1803 is processing described with reference to FIG. 9 and includes optimization processing. When an optimum layout is determined, the layout editing application 121 inserts the data to be laid out in the container optimized for the data, thereby completing the document (step 1804). The completed document is displayed as a preview image (step 1805).

(Flow Area Layout Method (when One Flow Area Exists in Document))

Figure 19:
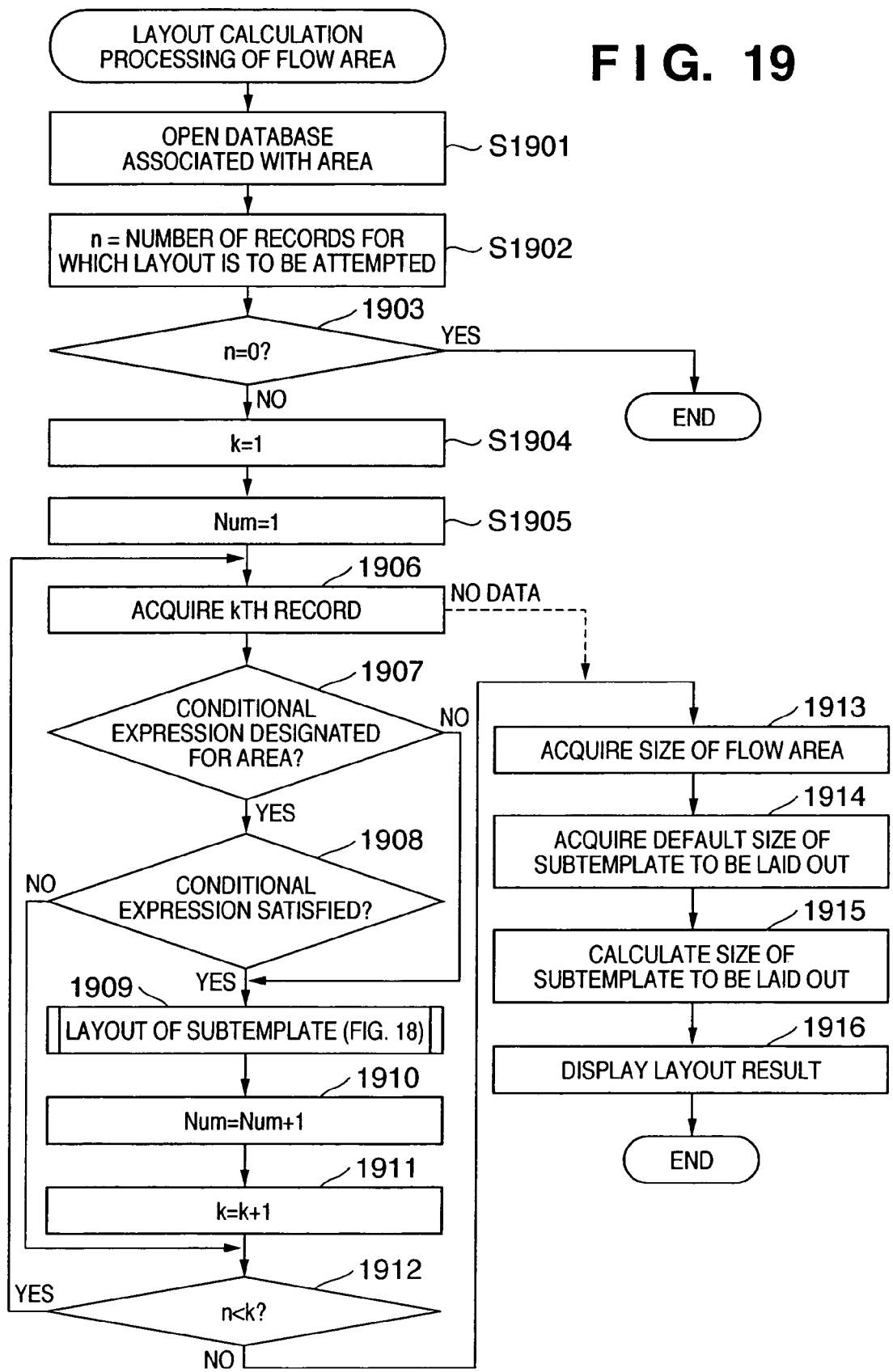
FIG. 19 is a flowchart showing the flow of subtemplate layout in the flow area according to the first embodiment.

FIG. 19 shows the flow of layout calculation in a flow area. FIG. 19 shows procedures when one flow area is set. First, the layout editing application 121 opens the database associated with the flow area (step 1901). The number of records for which layout in the flow area is to be attempted is substituted into a variable n prepared in the memory (step 1902). The variable n is a value designated by the user as the number of flow areas to paste and may be input from the user interface window shown in FIGS. 16A and 16B. When n=0, i.e., the number of records for which layout is to be attempted is 0, the layout processing need not be executed, and the flow is ended without executing the processing (step 1903).

Next, 1 is substituted into a variable k representing the number of records for which layout has been attempted (including the number of records for which layout is being attempted) (step 1904). In addition, 0 is substituted into a variable Num to count the number of subtemplates laid out in the flow area (1905).

After that, the data of the kth record is acquired from the database (step 1906). If a reply representing that no data is found is received from the database, the flow branches to step 1913.

The layout editing application 121 confirms whether conditional expressions are set in the above-described property setting for the layout flow area (step 1907). As already descried above about the multirecord, a record which satisfies predetermined conditions is inserted in one flow area. The record which satisfies predetermined conditions (conditional expressions) corresponds to data associated with the flow area. When conditional expressions are set, it is determined whether the data acquired in step 1906 satisfies the set conditional expressions (step 1908). If no conditional expressions are set for the flow area, or it is determined in step 1908 that the data satisfies the conditional expressions, the layout editing application 121 lays out the acquired kth record in accordance with the subtemplate associated with the flow area (step 1909). When the database can be searched on the basis of the conditional expressions associated with the flow area, the record is extracted in step 1906 in accordance with the conditional expressions. In this case, the record extracted on the basis of the conditional expressions always satisfies the conditions associated with the flow area. If conditions to filter the records relevant to the conditional expressions can be set, the records are extracted in step 1906 on the basis of the conditions. In this case, the determination in step 1908 is essential. If condition search of the database is impossible, records are sequentially acquired in step 1906.

The layout procedures according to a subtemplate are the same as those described in FIG. 18. When the record is laid out in accordance with the subtemplate, the variable Num is incremented by one (step 1910). To process the next data, the variable k is incremented by one (step 1911). If it is determined is step S1908 that the data does not satisfy the conditional expressions, layout processing is not executed for that data. The flow advances to step 1911 to acquire the next record.

The number n of records and the variable k are compared (step 1912). If the variable k is smaller than the number n of records, the flow returns to step 1906 to repeat the processing for the kth data. If the variable k is equal to or larger than n, record layout by using the subtemplate is ended. The flow advances to processing for laying out, in the flow area, the record (corresponding to the above-described layout content) laid out in accordance with the subtemplate.

First, the layout editing application 121 acquires the size of the flow area from the attribute information 3402 in FIG. 34 (step 1913). The layout editing application 121 acquires the size of the subtemplate to be laid out from size information 3302 in FIG. 33 (step 1914). The size of the layout content to be laid out in the flow area is calculated (step 1915). In this embodiment, in the layout processing in step 1909, the size of the outer frame of the subtemplate is not changed by the size of the container in the subtemplate. Hence, the outer frame size of the layout content is equal to the outer frame size of the subtemplate. In step 1915, the size of the outer frame of the layout content is increased or decreased in accordance with the number of layout contents to be laid out in the flow area. The number of layout contents to be laid out in the flow area is designated by the variable Num. Enlargement/reduction is executed at the same ratio for each content. In step 1916, the content enlarged/reduced (scaled) in step 1915 is laid out in the flow area, and an image to be output is generated. This also applies to the print mode.

FIGS. 20A and 20B show layout examples of layout contents in the flow area by using subtemplates. FIGS. 20A and 20B show a page margin 2001, fixed containers 2002 and 2003, flow area 2004, and subtemplates 2005 and 2006. Referring to FIG. 20A, four layout contents are laid out in the flow area 2004. The size of each layout content is calculated such that it is appropriately laid out in the flow area. The sizes of the layout contents are calculated such that all of them have the same size. FIG. 20B shows an example in which five layout contents are laid out in the flow area.

Finally, the layout editing application 121 displays the layout result and ends the processing (step 1916). As described above, the size of the flow area is fixed independently of the number of layout contents. When the contents are laid out in the flow area in this way, the number of documents (pages) can be prevented from changing depending on the number of layout contents. This is particularly effective for "postcard" or "direct mail" in which the number of documents is fixed.

In this embodiment, the number of records (variable n) for which layout is to be attempted is designated and used as an end condition of layout processing. That the variable Num has reached a predetermined value may be used as the end condition. In this case, some records cannot completely be laid out. However, the number of subtemplates to be inserted in the flow area can be limited.

Instead of determining the number of records for which layout is to be attempted, the processing may be ended when all records satisfying the conditions are acquired from the database.

(Flow Area Layout Method (when a Plurality of Flow Areas Exist in Document))

Figure 22B:
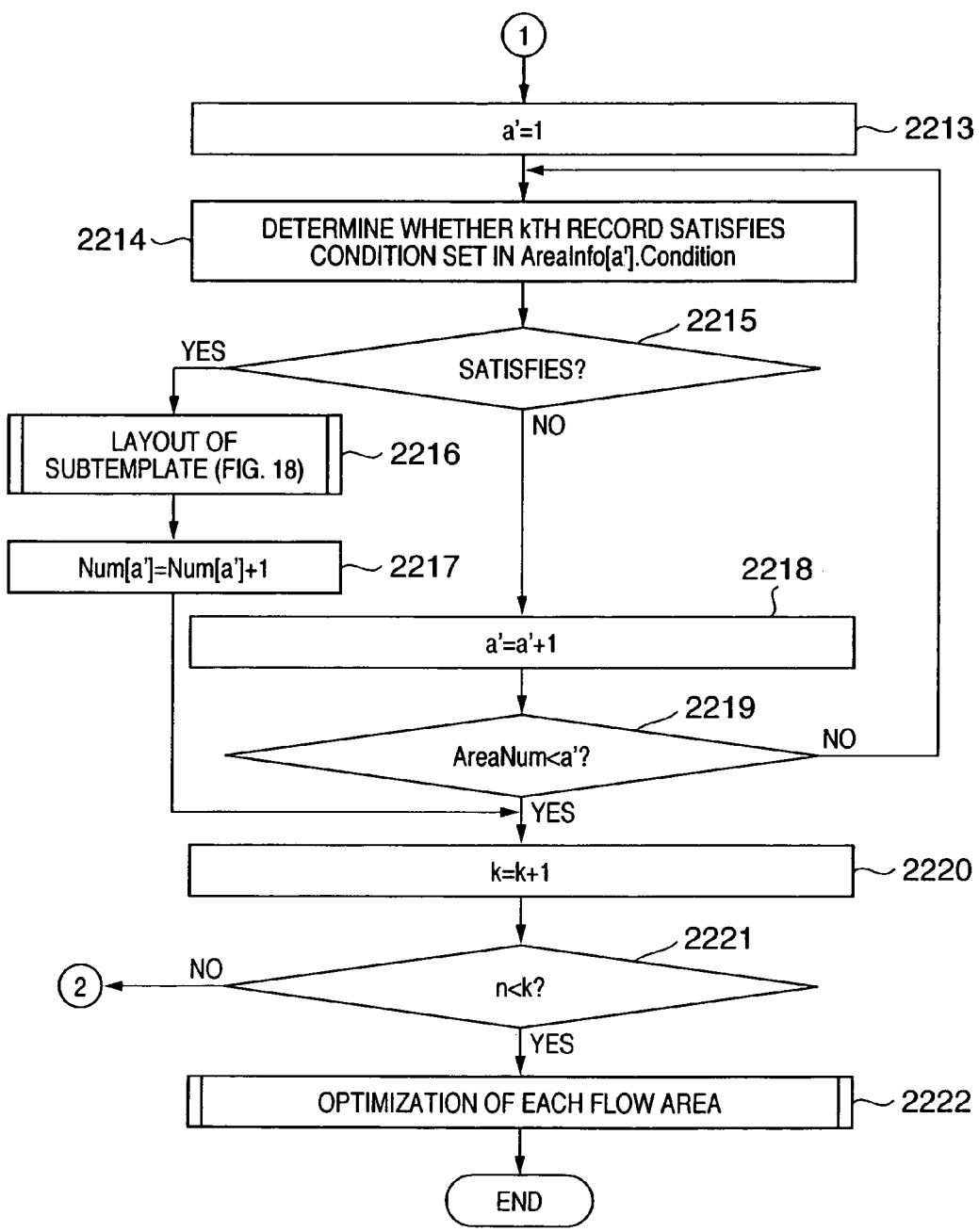
FIG. 22B is a flowchart showing the overall flow of subtemplate layout in a plurality of flow areas according to the first embodiment.
Figure 23:
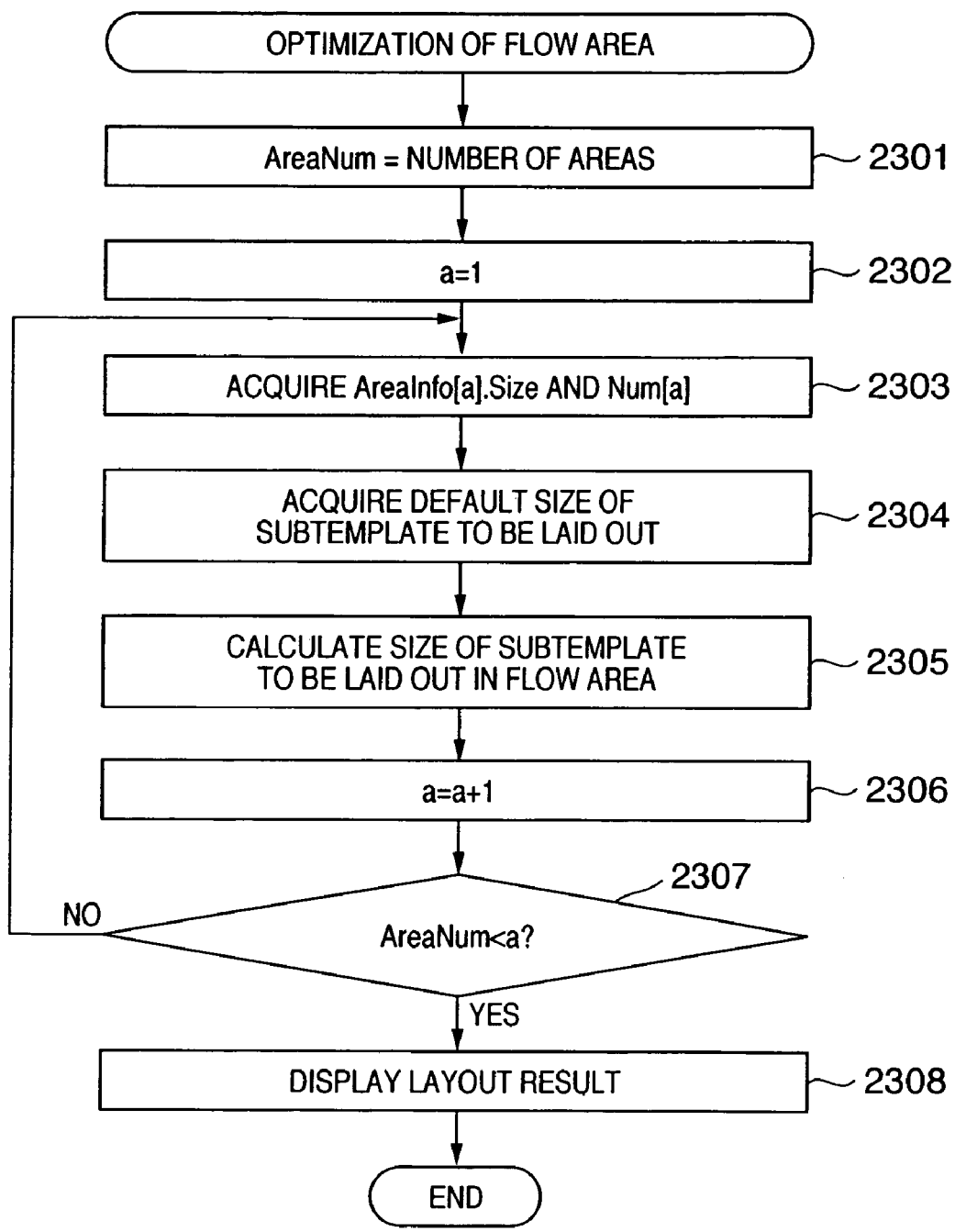
FIG. 23 is a flowchart showing the flow of layout calculation of a subtemplate in a plurality of flow areas according to the first embodiment.

The flow of layout processing when a plurality of flow areas are set in a template will be described next. FIGS. 21A and 21B show examples in which data are extracted for the database and laid out in a plurality of areas in the layout mode. FIGS. 22A and 22B show the flow of layout processing for the plurality of flow areas. FIG. 23 shows the flow of content size adjustment processing in each flow area.

Referring to FIGS. 21A and 21B, a data list 2101 indicates part of the data list of the database. In the example shown in FIGS. 21A and 21B, Name field is set as the key column. Records having the same value in Name field are laid out in one document. Records 2102 of Nos. 1 to 6 have the Name field value "Tom" and are therefore laid out in one document. In addition, a subtemplate having containers to insert ProductName field, Description field, and Image1 field of the data field is created. The subtemplate is associated with flow areas 2106 and 2107.

For the flow area 2106, a condition Category=Camera is set. For the flow area 2107, a condition Category=Printer is set. For this reason, as indicated by 2108 and 2109, contents laid out by the subtemplate are laid out in a flow area corresponding to the conditional expression. The records (Nos. 1, 2, and 5) with "Camera" in Category field are laid out in the flow area 2106. The records (Nos. 3, 4, and 0.6) with "Printer" in Category field are laid out in the flow area 2107. This is the outline of layout processing when a template in which a plurality of flow areas are set is used. FIGS. 22A, 22B, and 23 show the flow of the processing.

Each step shown in FIGS. 22A and 22B will be described. First, the layout editing application 121 acquires the number of data (records) for which layout is to be attempted (step 2201). If the database is, e.g., a sequential file, and condition search is impossible, the number of records is acquired from the database. For, e.g., direct mail, all records found under predetermined conditions may be defined as processing targets, and the number of records may be acquired as the number of data. This also applies to step 1902 in FIG. 19. Referring to FIGS. 21A and 21B, since records of Nos. 1 to 7 are present, 7 is acquired. The acquired number is substituted into the variable n (step 2202).

The value n is checked. If the value n is 0, no data to be laid out is present, and the processing is ended (step 2203). If the value is not 0, 1 is substituted into the variable k (step 2204). The variable k indicates which data is currently being processed. The number of set flow areas is acquired (step 2205). This number is obtained by counting the number of flow area information 3401 contained in the template data shown in FIG. 34 for the template to be used. The acquired number of flow areas is substituted into a variable AreaNum (step 2206).

Next, 1 is substituted into a variable a (step 2207). The variable a indicates which flow area is currently being processed. The flow area indicated by the variable a is called flow area a. The size of the flow area and set condition are acquired and saved in array AreaInfo[1 . . . AreaNum] of the structure (record type data). The structure as an array component of array AreaInfo[1 . . . N] has two fields: Size and Condition. These fields are expressed by AreaInfo[ ].Size and AreaInfo[ ].Condition, respectively. The size of the flow area and set condition are substituted into AreaInfo[a].Size and AreaInfo[a].Condition (step 2208). Array AreaInfo[1 . . . AreaNum] is preferably dynamically ensured on the memory in accordance with the variable AreaNum.

In addition, "0" is substituted into Num[a] (step 2209). The number of contents to be laid out in the flow area a is substituted into Num[a]. The variable is incremented by one (step 2210). It is confirmed whether the value of the variable AreaNum is equal to or smaller than the value a, i.e., processing is executed for all set areas (step 2211). If NO in step 2211, steps 2208 to 2210 is repeated. If YES in step 2211, the kth record is checked (step 2212).

Then, 1 is substituted into a variable a' (step 2213). The variable a' is used to execute comparison of conditional expressions and layout processing for the plurality of areas. It is determined whether the kth record satisfies the condition substituted into AreaInfo[a'].Condition (steps 2214 and 2215). If YES in step 2215, the kth record is laid out in accordance with the subtemplate associated with the flow area a' (step 2216). The number Num[a'] of contents to be laid out in the flow area a' is incremented by one (step 2217).

If NO in step 2215, the value a' is incremented by one to process the next flow area (step 2218). The variable a' is compared with the number AreaNum of flow areas. If AreaNum<a', the processing is repeated for the flow area a' (step 2219). If AreaNum>a', the condition is not satisfied for all flow areas set on the template. The flow branches to step 2220. If the kth record is laid out in one of the flow areas arranged on the template, or the record does not satisfy the condition of any flow area although layout is attempted, the variable k is incremented by one (step 2220) and compared with the number of records for which layout is to be attempted (2221). If trial is not ended for all target records, processing from step 2212 is repeated for the next record. If trial is ended for all records, content size adjustment (flow area optimization) in each flow area is executed (step 2222), and the processing is ended. The processing in step 2222 will be described with reference to FIG. 23.

(Optimization of Flow Area)

FIG. 23 shows the flow of layout processing for the plurality of flow areas. Each step will be described. First, the number of areas is substituted into the variable AreaNum (step 2301). Next, 1 is substituted into the variable a (2302). The variable a indicates which area is currently being processed. AreaInfo[a].Size (size of the flow area a) and Num[a] (number of contents to be laid out in the flow area a) are acquired from the structure array AreaInfo[1 . . . AreaNum] on the memory (step 2303). The default size of the subtemplate designated (to be laid out) in the flow area a is acquired (step 2304). The layout editing application 121 calculates the size of a content to be laid out in the flow area a on the basis of the acquired size AreaInfo[a].Size of the flow area a, the number Num[a] of contents to be laid out in the flow area, and the default size of the template associated with the flow area a (step 2305). This calculation method is the same as that described with reference to FIGS. 20A and 20B. When calculation is ended, the variable a is incremented by one (step 2306). The variable a and variable AreaNum are compared to confirm whether calculation is ended for all areas (step 2307). If NO in step 2307, the processing from step 2303 is repeated. When subtemplate layout is ended for all areas, the content enlarged/reduced (scaled) in step 2305 is laid out in a corresponding flow area, and an image to be output is generated. The layout result is displayed, and the processing is ended (2308).

(Layout Rule Setting)

Figure 24:
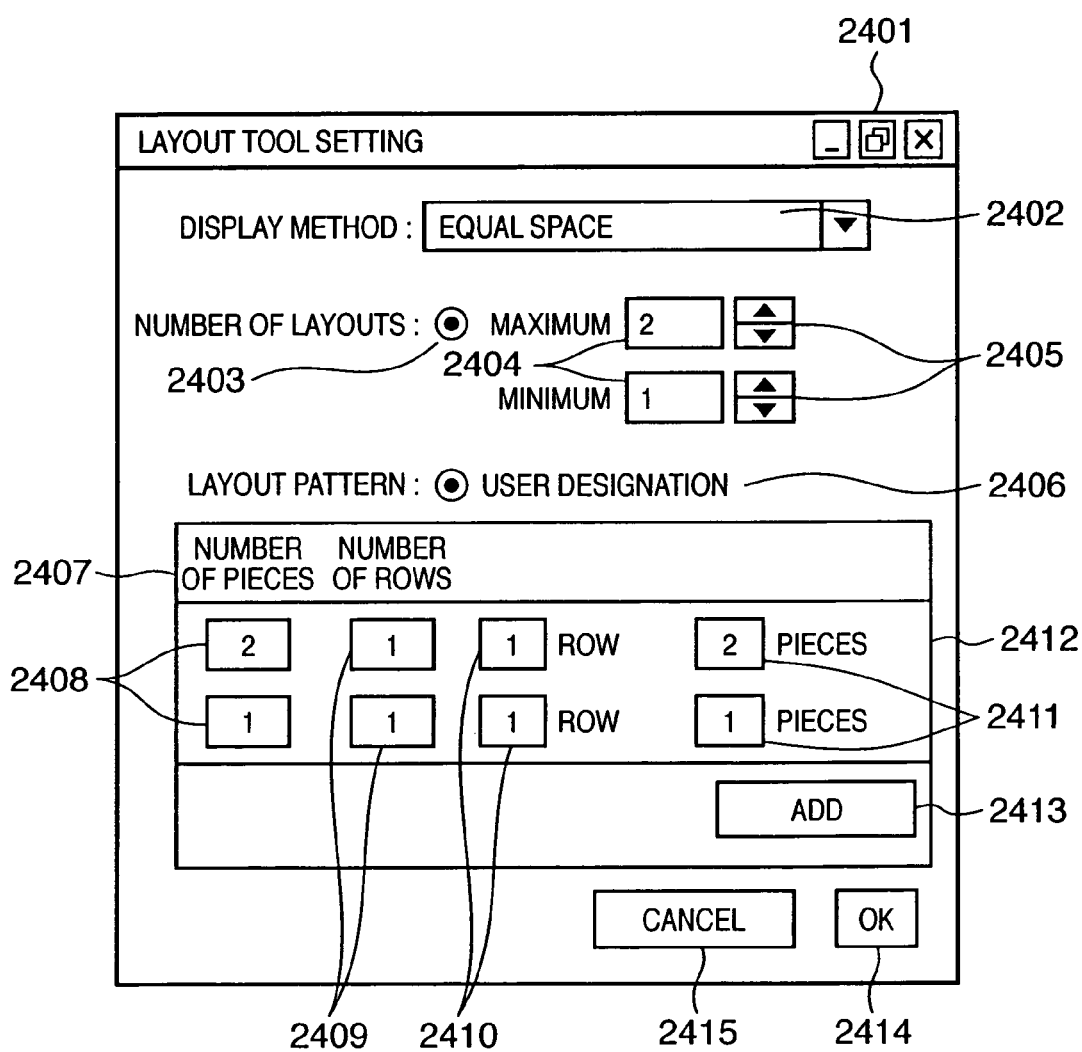
FIG. 24 is a view showing an example of a layout rule setting dialogue according to the first embodiment.
Figure 25:
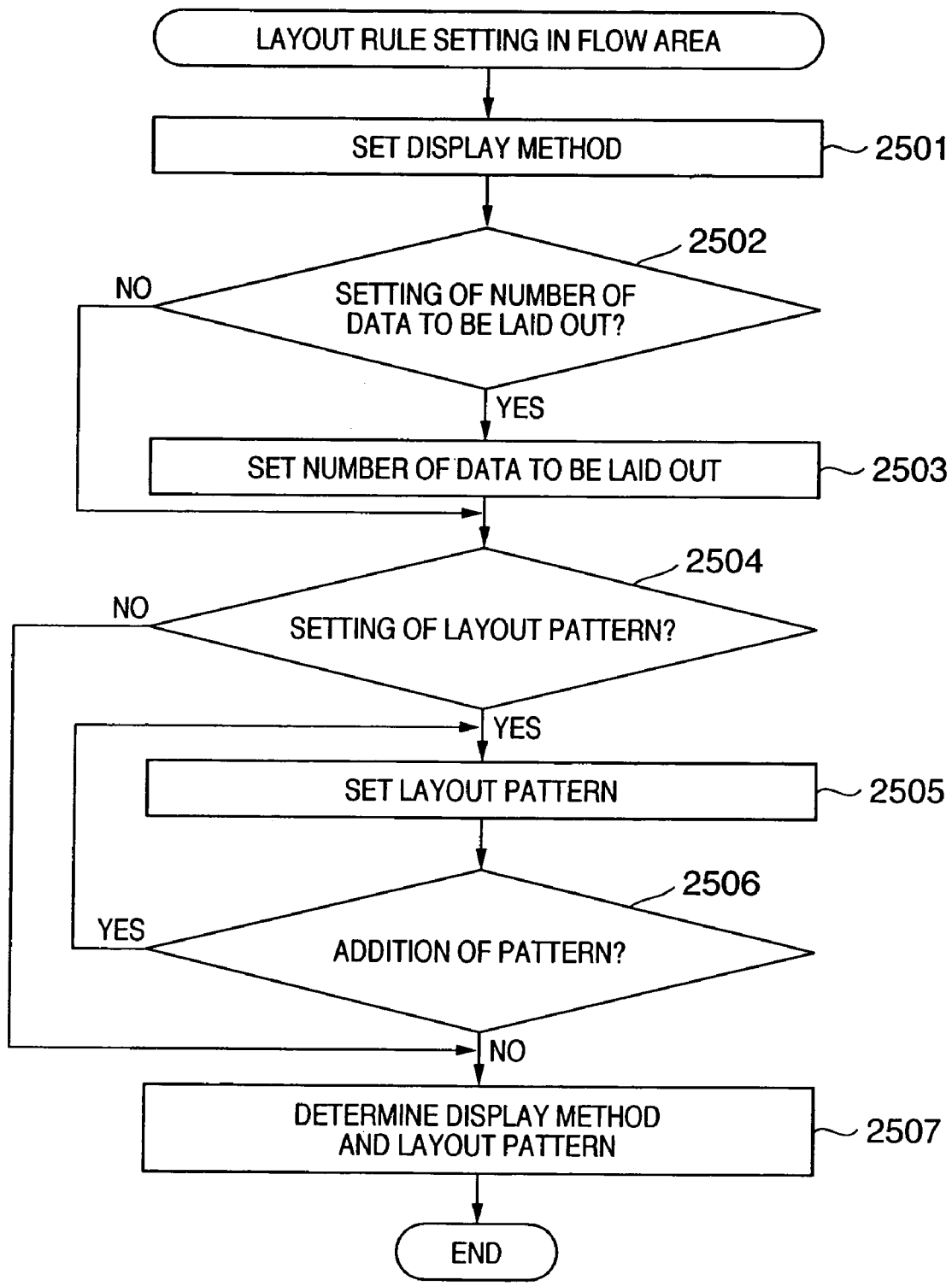
FIG. 25 is a flowchart showing the flow of layout rule setting according to the first embodiment.

FIGS. 24 and 25 show a layout rule setting UI and flow in the flow area. When the processing procedures shown in FIGS. 24 and 25 are executed for each flow area in a created template, existing flow area settings can be changed.

First, a method of displaying layout contents is designated in a text box 2402 shown in FIG. 24 (step 2501). Examples of display methods to be designated are "equal space", "right justification", and "left justification". In this example, "equal space" is designated. When the operator turns on a radio button 2403, it is determined whether the number of layout contents to be laid out in a flow area is designated (step 2502). If YES in step S2502, the UI is changed such that it includes a text box and spin button to set the number of contents (also called the number of layouts). When the operator designates the maximum value and minimum value of the number of layouts in text boxes 2404, the values are saved as the number of layouts (step 2503). The number of layouts may be set by spin buttons 2405 instead of directly inputting it in the text box. When the radio button 2403 is OFF, the text boxes 2402 and spin buttons 2405 are grayed out.

It is determined whether the layout pattern is designated (step 2504). When a radio button 2406 is turned on, it is determined that the change of layout pattern is designated. The user interface is changed to designate the state after change. A region 2407 is a portion to designate the layout pattern. When the radio button 2406 is OFF, this region is grayed out. The region is displayed when the radio button 2406 is turned on so that the layout pattern can be designated. The designated layout pattern is saved in the attribute information 3402 shown in FIG. 34 as the changed layout pattern of the flow area (step 2505).

The layout pattern to be set here can arbitrarily be designated by the user on the basis of the number of contents to be laid out in the flow area, the number of rows of the layout, and the number of contents per row. The number of contents to be laid out in the flow area of interest is input to a box 2408. The number of rows of contents to be laid out is input to a box 2409. The row number is input to a box 2410. The number of contents to be laid out in the row having the number indicated by the box 2410 is designated in a box 2411. In this example, setting is done for "row". Instead, setting may be done for "column". Designation may be done for one or both of row and column.

When the number of contents to be laid out is designated, the number designated in the box 2408 must fall within that range. For example, when the number of contents to be laid out is set to 2 to 4, the number that can be designated is 2, 3, or 4. If a value except them is designated, an error occurs. As the number 2410 of rows, an arbitrary number can be designated by the operator. In accordance with the designated number, the number to be displayed in the box 2411 is determined. In the box 2411, of the number of contents designated in the box 2408, the number of contents to be laid out in that row is designated. Hence, if the designated number of larger than the number designated in the box 2408, an error occurs. For example, assume that 6 is designated in the box 2408, and 2 is designated as the number of rows. In this case, if designation is done to lay out two contents in the first row and five contents in the second row, an error occurs.

To set a plurality of layout patterns such that the number of contents to be laid out is 6, 5, or 4. the operator clicks on an add button 2413. When this operation is executed, a new layout pattern is added (step 2506). A scroll bar 2412 is displayed when the number of patterns designated increases, and all the patterns cannot be displayed in the display region. Finally, an OK button 2415 is clicked on so that the display method and layout pattern designated are determined and saved in the attribute information 3402 of the flow area information 3401 (step 2507). When a cancel button 2414 is clicked on, the display method and layout pattern designated from the start of layout rule setting are canceled.

FIGS. 26A and 26B show layout examples when the layout rules are set. FIG. 26A shows a layout example of a flow area 2601 in which no layout rules other than "left justification" are set. Three contents are laid out in the flow area 2601. The layout contents are laid out in accordance with the layout flow type (Z-type) designated in FIGS. 16A and 16B so that the layout result shown in FIG. 26A is obtained.

FIG. 26B shows a layout example of a flow area 2603 in which a layout rule different from FIG. 26A is set. The layout rule set here is "equal space". When the number of layouts is 3, the number or rows is 2, one content is laid out in the first row, and two contents are laid out in the second row. When three contents are laid out in the area, as in FIG. 26A, one content is laid out in the first row, and two contents are laid but in the second row in accordance with "equal space", as shown in FIG. 26B. When the layout rule is set in this manner, the user can create a layout with a high degree of freedom which cannot be implemented by automatic insertion.

In the above description, printing is also executed in accordance with the same procedures as in preview. In printing, however, data are laid out by using an already created template and subtemplate. For this reason, in the print mode, the processing for creating a template data and subtemplate need not be executed. In printing, instead of creating a template data and subtemplate, a template data and subtemplates are designated. A document is created in accordance with the designated template and subtemplate and printed. This also applies to the second and third embodiments.

As described above, according to the document processing apparatus of this embodiment, a plurality of flow areas can be defined on a document template. Conditions of data to be inserted can be defined for each flow area. Hence, the data layout can be controlled in accordance with the conditions.

In addition, since the layout of component data (corresponding to variable data such as a record of the database laid out on a subtemplate) in each flow area can be defined for each flow area, the component data can be laid out in different layout patterns between the flow areas.

Since the number of component data to be inserted in each flow area can be limited, the inserted data can be prevented from being displayed or printed too small to read.

The number of component data to be inserted in each flow area can be limited. In addition, the size of component data to be inserted in each flow area is determined by the size of the flow area and the number of component data. For this reason, the display (print) size of component data created by using one template can be controlled for each flow area so that, for example, the component data size can be made large in a flow area and small in another flow area.

As described above, the flow area where component data which are equal to each other and are laid out using one subtemplate are to be laid out is designed. The number of component data and the manner they are laid out in the flow area are designated. Accordingly, a document with a layout desired by the user can be obtained and displayed or printed. Hence, information providing corresponding to each customer such as a person can be implemented by direct mail or the like. In addition, a document can be created by using a layout on which the significance of the other party is reflected, and for example, a layout in which important information is laid out at the top to attract attention.

Second Embodiment

The second embodiment of the present invention is directed to a computer program, document processing apparatus, and automatic layout system including a method of laying out a layout content in a flow area and, when overflow from the flow area has occurred, laying out the layout content in another flow area. In this embodiment, template data 3401 shown in FIG. 34 newly contains area link information which defines a link (area link) between flow areas, and processing procedures about the linked flow area are added to data layout processing on a template having a plurality of flow areas. The area link between flow areas is not information which maintains a predetermined distance, unlike a link between containers, but information to designate the destination to which an overflowed content is to be inserted.

<Link of Flow Area>

Figure 27:
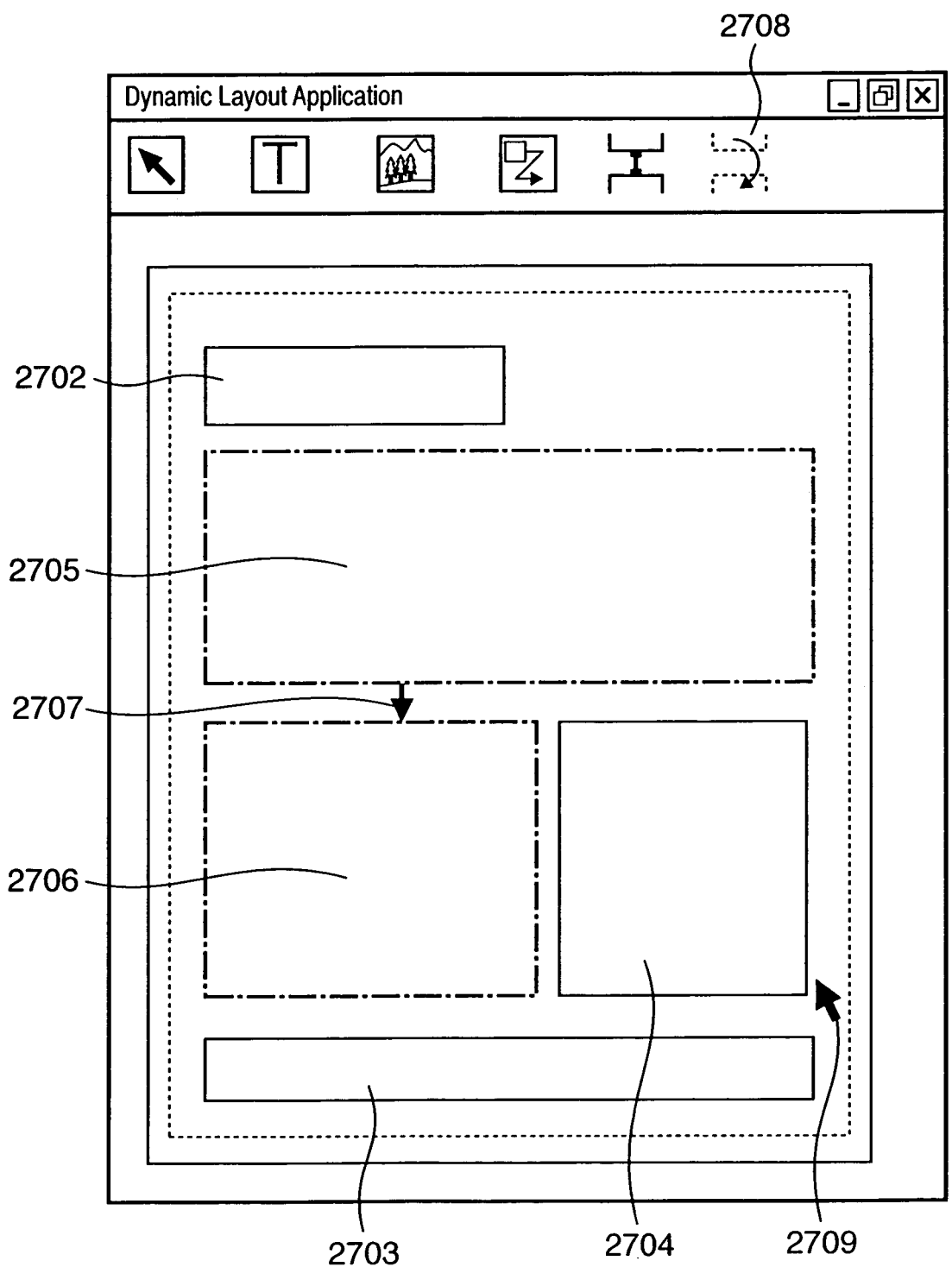
FIG. 27 is a view showing an example of the UI of a link of a flow area according to the second embodiment.
Figure 28:
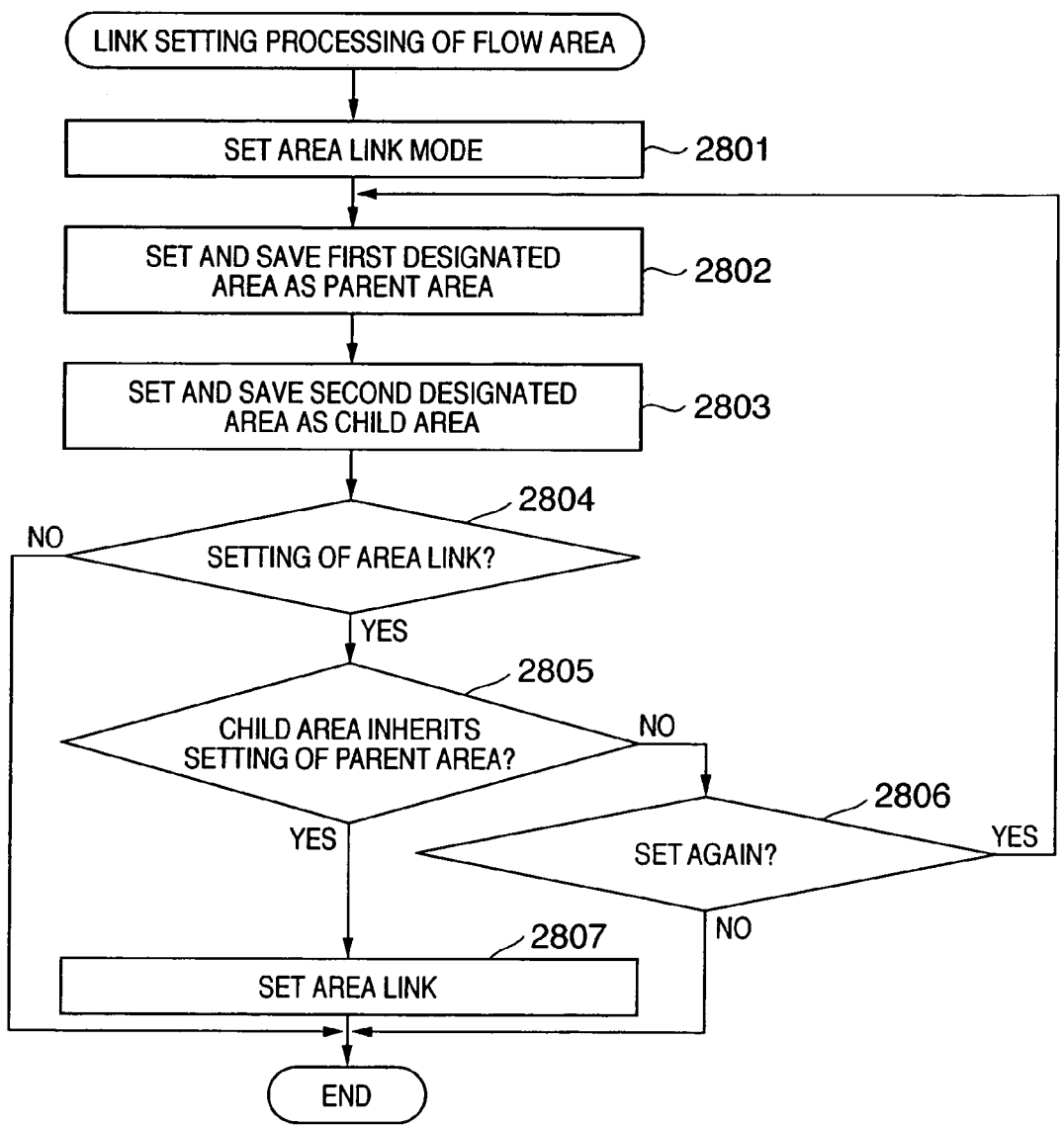
FIG. 28 is a view showing the flow of link setting of the flow area according to the second embodiment.

FIGS. 27 and 28 show a UI and the flow of setting processing of a link of flow areas, respectively. A link of flow areas indicates that when a plurality of flow areas are created, association can be set between two areas. In this case, association indicates that a subtemplate which has overflowed from one associated area is laid out in the other area. Each step of the area link setting flow will be described.

First, an area link mode is set (step 2801). The area link mode is set in accordance with an instruction input when the operator clicks a mouse pointer 2709 on a tool button 2708 shown in FIG. 27. Next, the first flow area contained in the template of interest is selected by the mouse pointer. The first flow area is set as a parent flow area to set an area link, and information representing it is temporarily stored (step 2802).

Next, the second flow area contained in the template of interest is selected by the mouse pointer. The second flow area is set as a child flow area to set the link and temporarily stored (step 2803). The first and second flow areas designated in steps 2802 and 2803 must not be the same. It is determined whether to set a flow link between the two designated flow areas (step 2804). This determination is done on the basis of an input by the operator. If YES in step 2804, it is determined whether to make the child flow area inherit the settings of the parent flow area (step 2805). This determination is also done on the basis of an input by the operator. Since the two linked flow areas substantially function as one flow area divided into two parts, they must have the same settings (e.g., settings set in accordance with the procedures shown in FIG. 15 or 25). Hence, the child flow area inherits the settings of the parent flow area. If NO in step 2805, the flow returns to step 2802 to execute setting again, or link setting is ended (step 2806).

When the operator inputs to confirm that the child flow area inherits the settings of the parent flow area, an area link is set between the parent flow area and the child flow area (step 2807). In terms of data, area link information representing that, e.g., the first flow area is the parent flow area, and the second flow area is the child flow area is added to the template data 3401.

Simultaneously, an arrow 2707 shown in FIG. 27 is displayed to present the link state and parentage of the flow areas to the user. In this example, a flow area 2705 is the parent flow area, and a flow area 2706 is the child flow area.

<Layout of Linked Flow Areas>

Figure 30:
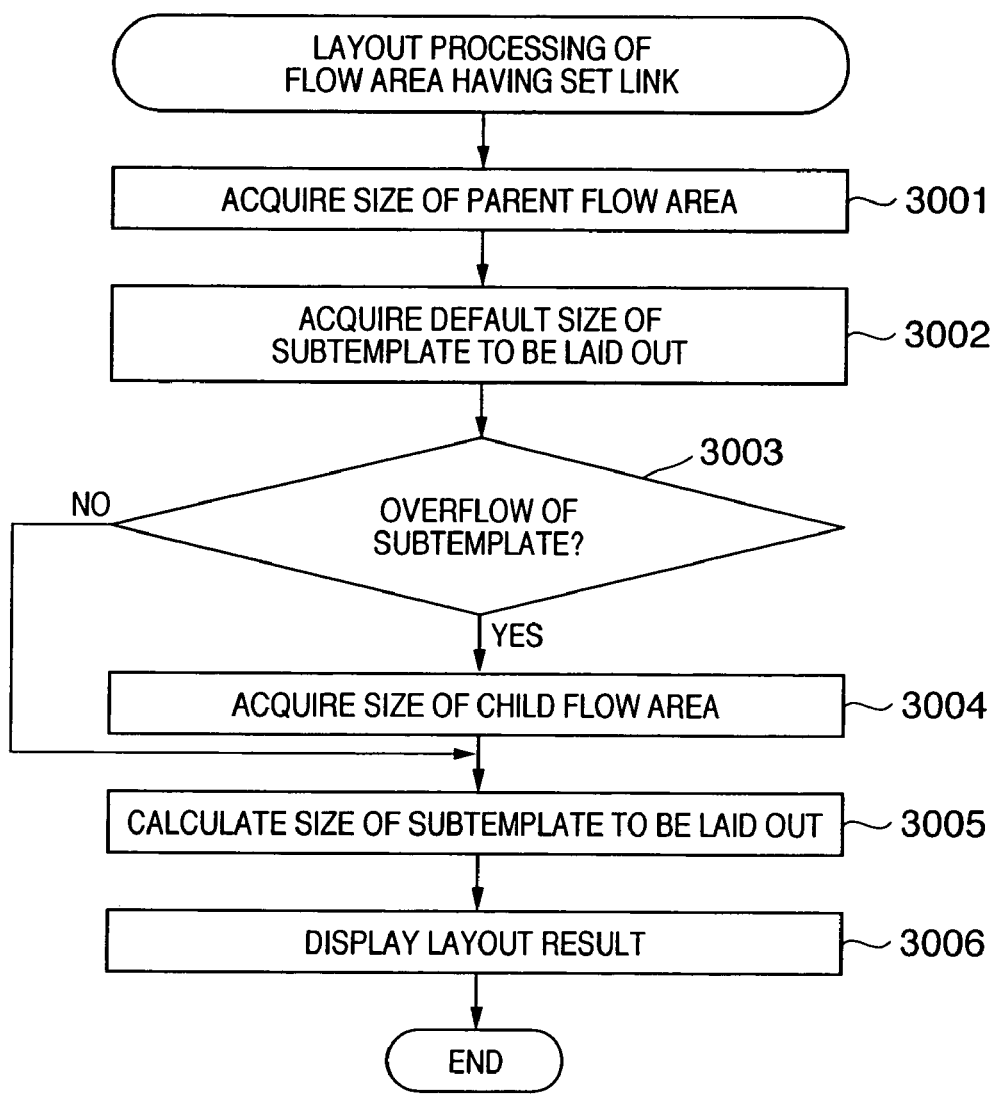
FIG. 30 is a flowchart showing the flow of layout calculation in setting the link of the flow area according to the second embodiment.

The flow of content layout in flow areas for which a link is set in accordance with the procedures shown in FIG. 28 will be described. FIGS. 29 and 30 are views showing a layout example and flow, respectively. This flow corresponds to processing from step 1913 of the layout flow shown in FIG. 19 described in the first embodiment. When an area link is set between flow areas, processing shown in FIG. 30 is executed in place of the processing from step 1913 in FIG. 19. More specifically, in this embodiment, it is determined between steps 1912 and 1913 in FIG. 19 whether an area link is set between flow areas contained in the template in use. If an area link is set, the flow branches to step 3001 in FIG. 30. In determination in step 1411 in FIG. 14, flow areas having an area link set are regarded as one flow area. In addition, immediately before step 2303 in FIG. 23, it is determined whether an area link is set for a flow area a. If an area link is set, steps 3001 to 3005 in FIG. 30 are executed in place of steps 2303 to 2305. After that, both the parent flow area and child flow area are handled as a processed area in the processing shown in FIG. 23.

Referring to FIG. 30, first, the size of the parent flow area is acquired (step 3001). A content to be laid out (i.e., the size of a subtemplate associated with the flow area) is acquired (step 3002). When contents of the subtemplate size are laid out in the parent area in number corresponding to the value of a variable Num (the number of contents to be laid out in a flow area), it is determined whether overflow occurs (step 3003). That is, contents corresponding to Num can tightly be inserted in the document. For example, the maximum number of subtemplates which can be laid out can be obtained in each of the vertical and horizontal directions on the basis of the vertical and horizontal sizes of the subtemplate and the vertical and horizontal sizes of the flow area. When the numbers are multiplied, the maximum number of subtemplates which can be laid out can be obtained. Determination in step 3003 can be done by comparing the value with the variable Num.

If YES in step 3003, the size of the child flow area is acquired (step 3004). The layout size of the subtemplate is calculated including the sizes of the parent flow area and child flow area (step 3005). Since the parent and child flow areas are separate areas, their areas cannot simply be added. First, it is determined whether the contents which cannot be fitted in the parent flow area can be fitted in the child flow area without size reduction. If the contents can be fitted, the reduction ratio is 1. Hence, the size of the contents to be laid out equals the size of the subtemplate.

If the contents cannot be fitted, all contents are reduced at the same scale. The calculation method at this time is the same as that described with reference to the flow shown in FIG. 19 in principle. The reduction ratio is determined such that the number of contents fitted in each of the parent and child flow areas equals the minimum number equal to or more than Num. To do this, the reduction ratio is determined by trial and error so that, for example, the maximum reduction ratio at which the number of contents to be fitted in the flow area is obtained, and even if the contents are reduced at the reduction ratio, the Num contents cannot be fitted yet, the next highest reduction ratio to further increase the number of contents to be fitted in the flow area is obtained.

After calculation, each content is scaled at the determined reduction ratio. The contents are laid out first in the parent flow area. Contents which cannot completely be laid out are scaled at the determined reduction ratio and laid out in the child flow area. Finally, the layout result is displayed, and the processing is ended (step 3006).

FIG. 29 shows an example in which contents are laid out in a linked flow area. Flow areas 2901 and 2902 are linked by an area link 2903. Contents 2904 are laid out in the parent flow area 2901. Contents 2905 are laid out in the child flow area. As shown in FIG. 29, four contents are laid out in the flow area 2901. Overflow occurs in the fourth content. If no area link is set, each content must be reduced to lay out the four subtemplates in the area. However, when a link is set, subtemplates can also be laid out in the flow area 2902. The overflowed content can be laid out in the flow area 2902.

As described above, contents can be laid out without reducing them to a size smaller than that defined by the subtemplate. Even when contents are reduced, the reduction ratio can be made low as compared to a case without any link.

When rectangular flow areas are connected by a link, the degree of freedom of the flow area shape increases.

In this embodiment, two flow areas are associated by an area link. However, when area links are chained, even three or more flow areas can also be regarded as one flow area.

Third Embodiment

In the first embodiment of the present invention, records to be laid out in a flow area are sequentially fetched in the order of storage in the database. In the third embodiment, an automatic layout system which allows a user to sort the database will be described.

The processing of the third embodiment is the same as in the first embodiment except that data sorting processing is executed, and a description thereof will be omitted.

Figure 31:
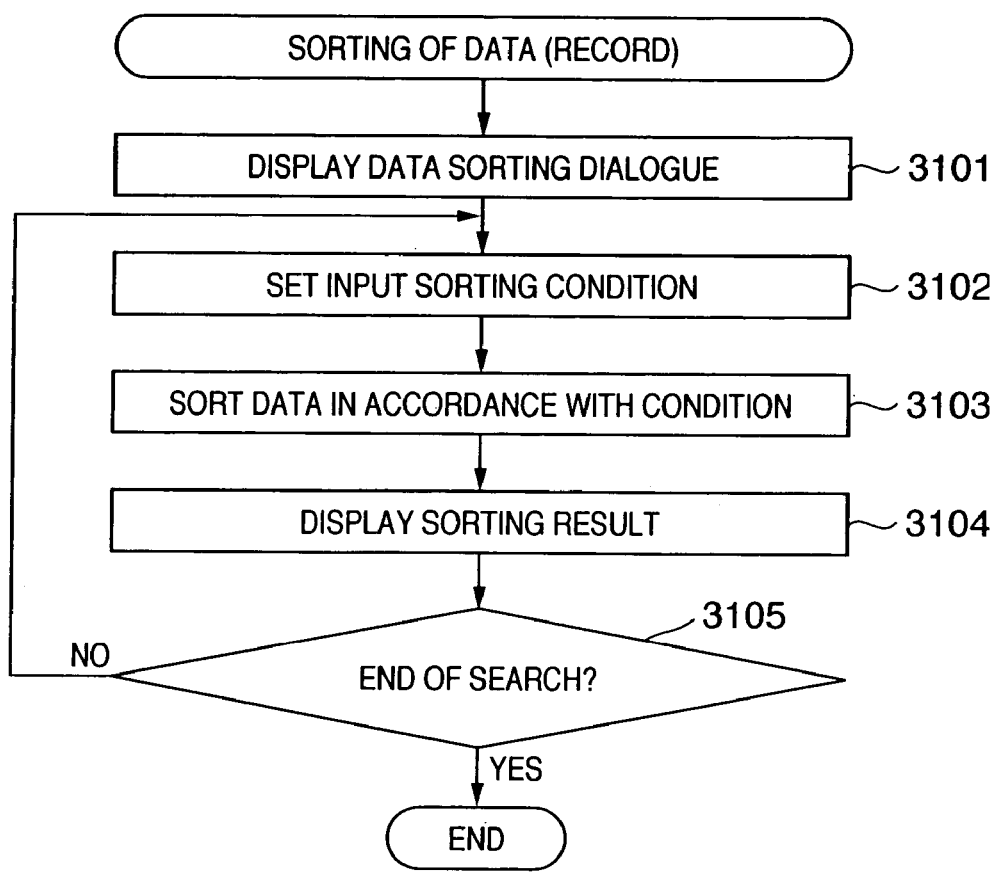
FIG. 31 is a flowchart showing the flow of data sorting according to the third embodiment.

FIGS. 31 and 32 show the flow of data sorting and a dialogue example, respectively. First, a data sorting dialogue is displayed (step 3101). Data are sorted in the dialogue shown in FIG. 32.

Referring to FIG. 32, reference numeral 3201 denotes a dialogue; 3202, a connected data file name; 3203, the number of data in the data file; 3204, a radio button to designate the order of sort; 3205, a list box in which a condition of data sorting is input; 3206, a display area where the sorting result is displayed; 3207, a scroll bar; 3208, a cancel button; and 3209, an OK button. The sorting sequence and sorting condition are set in this dialogue.

The input sorting condition is set (3102), and the database is sorted (step 3103). The sorting result is displayed (step 3104). In the example shown in FIG. 32, the data are sorted in ascending order for a designed sorting key: Price, and the result is displayed. After the user confirms the result, if a re-search instruction is input, the flow returns to step 3102 to repeat the processing. To end search, the user clicks on the OK button. In this case, the sorted database is stored, and the processing is ended. When the user clicks on the cancel button, the processing is ended without reflecting the result (step 3105). When the data are sorted, of the data satisfying the layout conditions, the user can select merchandise items to be preferentially laid out in the area.

Preferably, of the processing shown in FIG. 31, the operation and display of the user interface are executed by the computer shown in FIG. 1A, and sorting processing itself is executed by a database server 117.

Accordingly, records can be laid out in a document in the order of sorting by using a designated field as a key.

Figure 35:
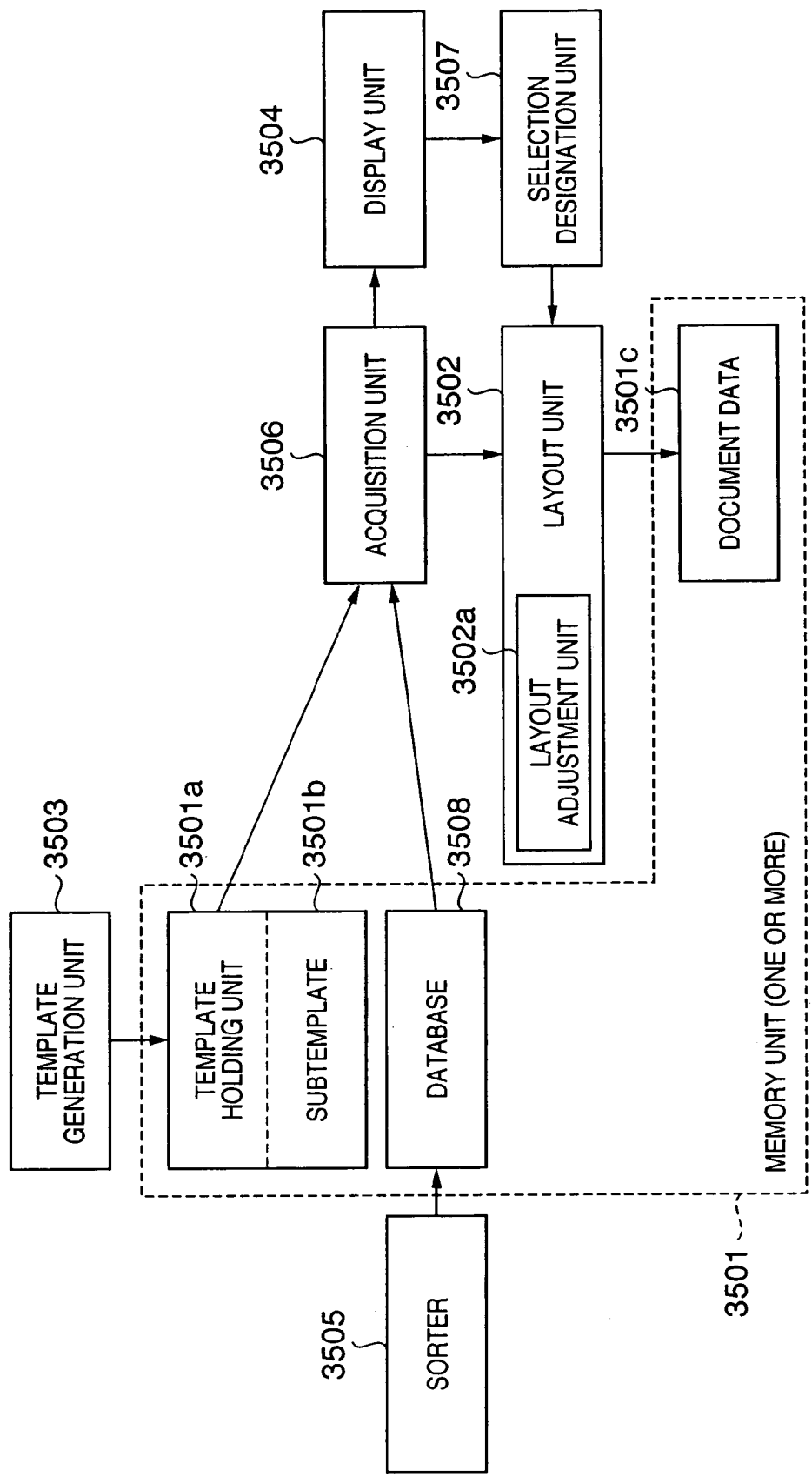
FIG. 35 is a functional block diagram of a document processing apparatus.

FIG. 35 is a functional block diagram of the principal constituent elements of the document processing apparatus according to the present invention. This block diagram shows functional blocks of procedures executed by the computer, which have been described in the above embodiments.

The document processing apparatus shown in FIG. 35, which can change a layout dynamically in accordance with data to be laid out comprises a layout means 3502 for, in accordance with a template held by the template holding means 3501a having a region to lay out the data and a layout condition of the data to be laid out in the region, creating a document 3501c in which of the data to be laid out, data which satisfy the layout condition are obtained by the acquisition unit 3506 and laid out, by the lay out means 3502, in the region with the layout condition designated.

Alternatively, the document processing apparatus capable of changing a layout dynamically in accordance with data to be laid out comprises a template creation means 3503 for creating the template 3501a and/or subtemplate held by the subtemplate holding means 3501b, and a layout means 3502 for, in accordance with the template 3501a, creating a document in which of the data to be laid out, data which satisfy the extraction condition are laid out in the region with the extraction condition designated. The subtemplate is associated with a region to lay out the data and an extraction condition of the data to be laid out in the region.

The display unit 3504 displays candidates of the layout condition to be selected on a display device as the layout flow type shown in FIG. 16. The selection instruction means 3507 is utilized to make a operator designate a layout condition used by the layout means 3502. Preferably, the operator can select the layout condition among the candidates displayed by the display means 3504.

The layout means 3502 creates the data to be laid out by laying out the data acquired from a data source (e.g., the database 3508) in accordance with a separately defined subtemplate 3501b and lays out the acquired data in accordance with the template.

The subtemplate 3501b has a multidata condition as a condition of data to be laid out in a single document, and the layout means 3502 lays out data which satisfy the multidata condition in the single document.

When the data to be laid out in the region cannot be fitted in the region, the layout means 3502 reduces the data at an equal scale and lays out the data in the region.

The template 3501a contains a plurality of regions, and different extraction conditions can be set for the respective regions.

The template 3501a contains a plurality of regions and has link information to associate the plurality of regions, and when the data to be laid out in the region cannot be fitted in one of the plurality of regions, the layout means 3502 lays out the data in another region associated by the link information.

The apparatus further comprises a sorting means 3505 for sorting the data of the data source on the basis of a given key.

The template 3501a has a layout rule of the data to be laid out for each region, and the layout means 3502 lays out the data to be laid out in the region in accordance with the layout rule.

The template holding means 3501a, subtemplate holding means 3501b, database 3508 and document data 3501c can be realized by one or more storage as the database server 117 shown in FIG. 1. The layout means 3502, template creation means 3503, display means 3504, sorter 3505, acquisition means 3506 and the selection instruction means 3507 can be realized by a computer application such as the layout editing application in accordance with the present embodiments.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-024587 filed on Jan. 30, 2004, the entire contents of which are hereby incorporated by reference herein.

What is claimed is:

1. A document processing apparatus having a CPU and a memory unit capable of performing layout processing using content data and a template of one page, comprising:
a first arranging unit which arranges a flow area in the template;
a second arranging unit which arranges a container outside the flow area;
a generating unit which generates at least one subtemplate for the flow area;
a setting unit which sets an extraction condition to extract first content data from a database for the flow area, where the subtemplate includes an area for inserting the first content data;
an acquisition unit which acquires from the database at least one record, composed of a plurality of content data including the first content data, based on the extraction condition set by said setting unit, and which acquires second content data for the container;
a first layout unit which lays out the second content data in the container by performing layout processing once based on the container and the second content data;
a second layout unit which, when the first content data is contained in a plurality of records, lays out the plurality of records in a plurality of subtemplates, respectively, by performing layout processing a number of times corresponding to a number of records which contain the first content data; and an output unit which outputs a layout result in which plurality of records and the second content data are laid out in the template of one page.

2. The apparatus according to claim 1, further comprising a selection unit which selects a layout method from a plurality of layout methods for laying out the first content data in accordance with the number of records which contain the first content data acquired by said acquisition unit.

3. The apparatus according to claim 2, further comprising a display unit which displays candidates of the layout method to lay out the first content data acquired by said acquisition unit.

4. A document processing method capable of performing layout processing using content data and a template of one page, the method comprising:

a first arranging step of arranging a flow area in the template;

a second arranging step of arranging a container outside the flow area;

a generating step of generating at least one subtemplate for the flow area;

a setting step of setting an extraction condition to extract first content data from a database for the flow area, where the subtemplate includes an area for inserting the first content data;

an acquisition step of acquiring from the database at least one record, composed of a plurality of content data including the first content data, based on the extraction condition set in the setting step, and acquiring second content data for the container;

a first layout step of laying out the second content data in the container by performing layout processing once based on the container and the second content data;

a second layout step of, when the first content data is contained in a plurality of records, laying out the plurality of records in a plurality of subtemplates, respectively, by performing layout processing a number of times corresponding to a number of records containing the first content data; and an outputting step of outputting a layout result in which the plurality of records and the second content data are laid out in the template of one page.

5. The method according to claim 4, further comprising a selection step of selecting a layout method from a plurality of layout methods for laying out the first content data in accordance with the number of records which contain the first content data acquired in the acquisition step.

6. The method according to claim 5, further comprising a display step of displaying candidates of the layout method to lay out the first content data acquired in the acquisition step.

7. A document processing program, which is recorded on a recording medium readable by a computer, to perform a document processing method capable of performing layout processing using content data and a template of one page, the method comprising:

a first arranging step of arranging a flow area in the template;

a second arranging step of arranging a container outside the flow area;

a generating step of generating at least one subtemplate for the flow area;

a setting step of setting an extraction condition to extract first content data from a database for the flow area, where the subtemplate includes an area for inserting the first content data;

an acquisition step of acquiring from the database at least one record, composed of a plurality of content data including the first content data, based on the extraction condition set in the setting step, and acquiring second content data for the container;

a first layout step of laying out the second content data in the container by performing layout processing once based on the container and the second content data;

a second layout step of, when the first content data is contained in a plurality of records, laying out the plurality of records in a plurality of subtemplates, respectively, by performing layout processing a number of times corresponding to a number of records containing the first content data; and an outputting step of outputting a layout result in which the plurality of records and the second content data are laid out in the template of one page.

8. The program according to claim 7, further comprising a selection step of selecting a layout method from a plurality of layout methods for laying out the first content data in accordance with the number of records which contain the first content data acquired in the acquisition step.

9. The program according to claim 8, further comprising a display step of displaying candidates of the layout method to lay out the first content data acquired in the acquisition step.

* * * * *